(12) United States Patent
Corrigan et al.

(10) Patent No.: US 12,202,226 B2
(45) Date of Patent: Jan. 21, 2025

(54) TENSION-ACTIVATED, EXPANDING SHEETS

(71) Applicant: 3M INNOVATIVE PROPERTIES COMPANY, St. Paul, MN (US)

(72) Inventors: Thomas R. Corrigan, St. Paul, MN (US); Patrick R. Fleming, Lake Elmo, MN (US); Dylan T. Cosgrove, Oakdale, MN (US); Delony L. Langer-Anderson, Hugo, MN (US); Lisa M. Miller, Spring Valley, WI (US); Manoj Nirmal, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 248 days.

(21) Appl. No.: 17/787,366

(22) PCT Filed: Dec. 16, 2020

(86) PCT No.: PCT/IB2020/062065
§ 371 (c)(1),
(2) Date: Jun. 20, 2022

(87) PCT Pub. No.: WO2021/130616
PCT Pub. Date: Jul. 1, 2021

(65) Prior Publication Data
US 2022/0380107 A1     Dec. 1, 2022

Related U.S. Application Data

(60) Provisional application No. 63/058,116, filed on Jul. 29, 2020, provisional application No. 62/952,778, filed on Dec. 23, 2019.

(51) Int. Cl.
*B31D 5/00* (2017.01)
*B31D 1/00* (2017.01)
(Continued)

(52) U.S. Cl.
CPC ......... *B31D 5/0065* (2013.01); *B31D 1/0031* (2013.01); *B32B 5/04* (2013.01);
(Continued)

(58) Field of Classification Search
CPC ...... B65D 81/03; B65D 81/05; B31D 5/0065; B31D 1/0031; B32B 5/04; B32B 3/266; Y10T 428/24314
See application file for complete search history.

(56) References Cited

U.S. PATENT DOCUMENTS 3,018,205 A    1/1962  Barut
3,040,968 A    6/1962  Long et al.
(Continued)

FOREIGN PATENT DOCUMENTS

CN        2744618 Y     12/2005
DE     202010008483 U1   11/2010
(Continued)

OTHER PUBLICATIONS

Hook Definition, Merriam-Webster, 2006, https://www.merriam-webster.com/dictionary/hook#:~:text=%3A%20something%20curved%20or%20bent%20like%20a%20hook (Year: 2006).*
(Continued)

*Primary Examiner* — Jasper Saberi

(57) ABSTRACT

The present disclosure relates generally to tension-activated, expanding articles, films, and sheets. In some embodiments, these articles, films, and/or sheets are used as cushioning films and/or packaging materials. The present disclosure also relates to methods of making and using these tension-activated, expanding articles, films, and sheets.

20 Claims, 30 Drawing Sheets

(51) Int. Cl.
  B32B 5/04 (2006.01)
  B65B 11/00 (2006.01)
  B65D 81/02 (2006.01)
  B65D 81/03 (2006.01)

(52) U.S. Cl.
  CPC .......... *B65B 11/004* (2013.01); *B65D 81/022* (2013.01); *B65D 81/03* (2013.01); *B31D 2205/0064* (2013.01)

(56) References Cited

U.S. PATENT DOCUMENTS

| | | |
|---|---|---|
| 3,067,039 A | 12/1962 | Crane |
| 3,069,067 A | 12/1962 | Crane |
| 3,109,579 A | 11/1963 | Crane |
| 3,245,606 A | 4/1966 | Crane |
| 3,432,379 A | 3/1969 | Anderson |
| 3,550,842 A | 12/1970 | Scholz |
| 3,603,369 A | 9/1971 | Scholz |
| 3,655,501 A * | 4/1972 | Tesch ............... B32B 27/00 428/137 |
| 3,762,629 A | 10/1973 | Bruno |
| 3,951,730 A | 4/1976 | Wennberg et al. |
| 3,958,751 A | 5/1976 | Bruno |
| 3,992,162 A | 11/1976 | Gewiss |
| 4,012,540 A | 3/1977 | McQueary |
| 4,105,724 A | 8/1978 | Talbot |
| 4,516,891 A | 5/1985 | Wnuk et al. |
| 4,596,541 A * | 6/1986 | Ward, Sr. ............ B31F 1/10 83/881 |
| 5,002,782 A | 3/1991 | Oberle |
| 5,086,924 A | 2/1992 | Oberle |
| 5,092,468 A | 3/1992 | Slocumb |
| 5,139,844 A | 8/1992 | Maus et al. |
| 5,207,020 A | 5/1993 | Aslam et al. |
| 5,334,276 A | 8/1994 | Meier |
| 5,389,059 A | 2/1995 | Corwin |
| 5,431,980 A | 7/1995 | McCarthy |
| 5,573,818 A | 11/1996 | Haywood et al. |
| 5,667,871 A | 9/1997 | Goodrich et al. |
| 5,688,578 A | 11/1997 | Goodrich |
| 5,782,735 A | 7/1998 | Goodrich et al. |
| 6,183,836 B1 | 2/2001 | Pflug |
| 6,372,322 B1 | 4/2002 | Devaguptapu |
| 6,726,974 B1 | 4/2004 | Pflug et al. |
| 6,832,461 B2 | 12/2004 | Crye et al. |
| 6,929,843 B2 | 8/2005 | Kuchar |
| 6,948,618 B2 | 9/2005 | Luu et al. |
| 7,541,085 B2 | 6/2009 | Burdon |
| 7,850,896 B2 | 12/2010 | Endres et al. |
| 8,302,733 B2 | 11/2012 | Peiffer et al. |
| 8,613,993 B2 | 12/2013 | Kuchar |
| 8,708,145 B2 | 4/2014 | Kuo et al. |
| 8,813,339 B2 | 8/2014 | Conner et al. |
| 8,979,014 B2 | 3/2015 | Boock et al. |
| 9,005,096 B2 | 4/2015 | Kling |
| 9,533,809 B2 | 1/2017 | Kuchar et al. |
| 9,550,336 B2 | 1/2017 | Bradford |
| 9,579,866 B2 | 2/2017 | Ros et al. |
| 10,226,907 B2 | 3/2019 | Goodrich |
| 11,066,224 B2 | 7/2021 | Berniard et al. |
| D948,223 S | 4/2022 | Gold et al. |
| 2005/0089675 A1 | 4/2005 | Christiansen |
| 2007/0122590 A1 | 5/2007 | Lalvani |
| 2010/0330330 A1 | 12/2010 | Luca et al. |
| 2011/0108454 A1 | 5/2011 | Weder |
| 2011/0186474 A1 | 8/2011 | Weder |
| 2016/0067938 A1 | 3/2016 | Goodrich |
| 2016/0136877 A1 | 5/2016 | Rogers et al. |
| 2017/0182723 A1 | 6/2017 | Calisch et al. |
| 2018/0127197 A1 | 5/2018 | Goodrich |
| 2018/0370702 A1 | 12/2018 | Goodrich |
| 2019/0187345 A1 | 6/2019 | Gold et al. |
| 2021/0031996 A1* | 2/2021 | Goodrich ............ D21H 27/30 |
| 2022/0009690 A1 | 1/2022 | Nirmal et al. |

FOREIGN PATENT DOCUMENTS

| | | |
|---|---|---|
| EP | 1995052 A1 | 11/2008 |
| EP | 2069131 A1 | 6/2009 |
| EP | 2091725 A1 | 8/2009 |
| EP | 2281942 A1 | 2/2011 |
| EP | 2679383 A1 | 1/2014 |
| EP | 2477809 B1 | 2/2015 |
| EP | 3114032 A1 | 1/2017 * |
| EP | 3178642 A1 | 6/2017 |
| EP | 2991822 B1 | 7/2017 |
| EP | 3221155 A1 | 9/2017 |
| EP | 2376277 B1 | 11/2017 |
| EP | 2774753 B1 | 12/2017 |
| EP | 2292839 B1 | 1/2018 |
| EP | 2847094 B1 | 1/2018 |
| EP | 3431278 A1 | 1/2019 |
| EP | 3368293 B1 | 10/2019 |
| EP | 3041756 B1 | 2/2020 |
| EP | 2619001 B1 | 3/2020 |
| EP | 2882546 B1 | 4/2020 |
| EP | 2581215 B1 | 12/2020 |
| EP | 2047043 B1 | 5/2021 |
| EP | 3297817 B1 | 5/2022 |
| GB | 2545635 A | 6/2017 |
| JP | 2000142804 A | 5/2000 |
| JP | 2003285875 A | 10/2003 |
| JP | 2006290356 A | 10/2006 |
| JP | 104025444 B2 | 12/2007 |
| JP | 2009185422 A | 8/2009 |
| JP | 4347709 B2 | 10/2009 |
| JP | 4707043 B2 | 6/2011 |
| JP | 5133587 B2 | 1/2013 |
| JP | 5294671 B2 | 9/2013 |
| JP | 5357577 B2 | 12/2013 |
| JP | 5580586 B2 | 8/2014 |
| JP | 5886240 B2 | 3/2016 |
| JP | 2017193376 A | 10/2017 |
| JP | 2019099223 A | 6/2019 |
| KR | 200211896 Y1 | 2/2001 |
| KR | 20010109035 A | 12/2001 |
| KR | 200322756 Y1 | 8/2003 |
| NZ | 226699 A | 11/1990 |
| WO | 2011059347 A1 | 5/2011 |
| WO | 2015035335 A1 | 3/2015 |
| WO | 2014170650 A2 | 4/2015 |
| WO | 2017160022 A1 | 9/2017 |
| WO | 2018045316 A1 | 3/2018 |
| WO | 2018191012 A1 | 10/2018 |
| WO | 2019043621 A1 | 3/2019 |
| WO | 2021130612 A1 | 7/2021 |
| WO | 2021130613 A1 | 7/2021 |
| ZA | 955630 B | 2/1996 |

OTHER PUBLICATIONS

Loop Definition, Merriam-Webster, 2009, https://www.merriam-webster.com/dictionary/loop (Year: 2009).*

"AABES © Cushion Pack CP440 Series2 Combi Corrugated Shredders", Machine-Solution.com, Texas, USA, [retrieved from the internet on Aug. 30, 2022], URL, <https://www.machine-solution.com/Cushion-Pack-CP440-Series2-Combi-Corrugated-Shredders>, 6 pages.

Farber, "Consumers Are Now Doing Most of Their Shopping Online", Fortune Magazine, Jun. 8, 2016, [retrieved from the internet on Oct. 9, 2020], URL < https://fortune.com/2016/06/08/online-shopping-increases>, 3 pages.

International Preliminary Report on Patentability Chapter II for PCT Application No. PCT/IB2020/062065, mailed on Mar. 16, 2022, 8 pages.

International Search Report for PCT Application No. PCT/IB2020/062065, mailed on Apr. 21, 2021, 5 pages.

Mcnicoll, "For Every Amazon Package it Delivers, The Postal Service Loses $1.46", [available on internet on Sep. 1, 2017],

(56) References Cited

OTHER PUBLICATIONS

URL:<https://www.washingtonexaminer.com/for-every-amazon-package-it-delivers-the-postal-service-loses-146>, 3 pages.

* cited by examiner

TENSION-ACTIVATED, EXPANDING SHEETS

CROSS REFERENCE TO RELATED APPLICATIONS

This application is a national stage filing under 35 U.S.C. 371 of PCT/IB2020/062065, filed 16 Dec. 2020, which claims the benefit of U.S. Provisional Application No. 62/952,778, filed 23 Dec. 2019, and U.S. Provisional Application No. 63/058,116, filed 29 Jul. 2020, the disclosures of which are incorporated by reference in their entireties herein.

TECHNICAL FIELD

The present disclosure relates generally to tension-activated, expanding articles, films, and sheets. In some embodiments, these articles, films, and/or sheets are used as cushioning films and/or packaging materials. The present disclosure also relates to methods of making and using these tension-activated, expanding articles, films, and sheets.

BACKGROUND

In 2016, consumers bought more products online than in stores. (*Consumers Are Now Doing Most of their Shopping Online*, Fortune Magazine, Jun. 8, 2016). Specifically, consumers made 51% of their purchases online and 49% in brick-and-mortar stores. Id. One result of this change in consumer behavior is the growing number of packages mailed and delivered each day. Over 13.4 billion packages are delivered to homes and businesses around the world each year (about 5.2 billion by the United States Postal Service, about 3.3 billion by Fed Ex, and about 4.9 billion by UPS). While delivery of non-package mail is decreasing annually, package delivery is growing at a rate of about 8% annually. This growth has resulted in 25% of the U.S. Postal Service's business being package delivery. (Washington Examiner, "For every Amazon package it delivers, the Postal Service loses $1.46," Sep. 1, 2017). Amazon ships about 3 million packages a day, and Alibaba ships about 12 million packages a day.

It is not just businesses shipping packages. The growing Maker culture creates opportunities for individuals to ship their handmade products around the world through websites like Etsy™. Further, the increased focus on sustainability causes many consumers to resell used products on sites like eBay™ rather than throwing them into landfills. For example, over 25 million people sell goods on eBay™, and over 171 million people buy these goods.

Individuals and businesses shipping these goods often ship them in shipping containers, typically boxes, including the product to be shipped, cushioning, and air. Boxes have many advantages, including, for example, the box can stand upright, it is lightweight, stored flat, is recyclable, and is relatively low cost. However, boxes come in standard sizes that often do not match the size of the item being shipped, so the user must fill the box with a large amount of filler or cushioning material to try to protect the item being shipped from jostling around in a box that is too large and becoming damaged.

Package cushioning materials protect items during shipment. The effects of vibration and impact shock during shipment and loading/unloading are mitigated by the cushioning materials to reduce the chance of product damage. Cushioning materials are often placed inside the shipping container where they absorb energy by, for example, buckling and deforming, and/or by dampening vibration or transmitting the shock and vibration to the cushioning material rather than to the item being shipped. In other instances, packaging materials are also used for functions other than cushioning, such as to immobilize the item to be shipped in the box and fix it in place. Alternatively, packaging materials are also used to fill a void such as, for example, when a box that is significantly larger than the item to be shipped is used.

Some exemplary packaging materials include plastic Bubble Wrap™, bubble film, cushion wrap, air pillows, shredded paper, crinkle paper, shredded aspen, vermiculite, cradles, and corrugated bubble film. Many of these packaging materials are not recyclable.

One exemplary packaging material is shown in FIGS. 1A-1C. Film 100 is made of a paper sheet including pattern of a plurality of cuts or slits 110 that is often referred to as a "skip slit pattern," a type of single slit pattern. When film 100 is tension-activated (pulled along the tension axis (T), which is substantially perpendicular to cuts or slits 110), a plurality of beams 130 are formed. Beams 130 are regions between adjacent coaxial rows of slits. The beams 130 formed by slits 110 collectively experience some degree of upward and downward movement (see, for example, FIGS. 1B and 1C). This upward and downward movement results in the two-dimensional article (a substantially flat sheet) of FIG. 1A becoming the three-dimensional article of FIGS. 1B and 1C when tension-activated. When this film is used as packaging material, the three-dimensional structure provides some degree of cushioning as compared to a two-dimensional, flat structure.

The cut or slit pattern of film 100 is shown in FIGS. 1A and 1s described in U.S. Pat. No. 4,105,724 (Talbot) and U.S. Pat. No. 5,667,871 (Goodrich et al.). The pattern includes a plurality of substantially parallel rows 112 of multiple individual linear slits 110. Each of the individual linear slits 110 in a given row 112 is out of phase with each of the individual linear slits 110 in the directly adjacent and substantially parallel row 112. In the specific construction of FIGS. 1A-1C, the adjacent rows 112 are out of phase by one half of the vertical (relative to FIG. 1A) spacing. The pattern forms an array of slits 110 and rows 112, and the array has a regular, repeating pattern across the array. Between directly adjacent rows 112 of slits 110 are formed beams 130 of material.

FIG. 2A shows the cut or slit pattern of film 100 of FIG. 1A rotated 90°. Each linear slit 110 has a length (L) that extends between a first terminal end 114 and a second terminal end 116. Each linear slit 110 also has a midpoint 118 that is halfway between the first and second terminal ends 114, 116. Midpoint 118 is shown by a dot on each slit 110 of FIG. 2A. The midpoints 118 of parallel and aligned slits 110 substantially align with one another. In other words, the midpoint 118 of an individual linear slit 110 substantially aligns with the midpoint 118 of an individual linear slit 110 on a directly adjacent beam 130 along the tension axis (T). Such slits 110 are not in directly adjacent slit rows 112; instead, they are on alternating rows 112. Further, the midpoint 118 of an individual slit 110 is between the terminal ends 114, 116 of the directly adjacent slits (or cuts) 110 along the tension axis (T). The distance between the center of two directly adjacent slits 110 in a row 112 of slits 110 is identified as the transverse spacing (H), which is the horizontal spacing relative to FIG. 2A. The thickness of beam 130 or distance between two adjacent rows 112 of adjacent linear slits 110 is identified as the axial spacing (V), which is the vertical spacing relative to FIG. 2A.

More specifically, in the embodiment of FIG. 2A, midpoint 118A of slit 110A aligns axially (in the vertical direction relative to the figure) with midpoint 118B of slit 110B, meaning that the midpoints 118A, 118B align with an axis that extends in the axial direction. Slit 110B is on the beam 130B directly adjacent to beam 130A on which slit 110A lies. Also, midpoint 118A of slit 110A is between terminal end 114C of slit 110C and terminal end 116D of slit 110D. Slits 110C and 110D are directly adjacent to slit 110A axially. FIG. 2A also shows the horizontal pitch (H) between transversely adjacent midpoints 118, the axial pitch (V) or beam 130 height, the slit length (L), and the tension axis (T) along which tension can be provided to cause upward and downward movement of beams 130.

FIG. 2B shows the primary tension lines (e.g., the lines approximating the highest tensile stress path) formed when an article including the slit pattern of FIG. 2A is deployed with tension along the tension axis T. FIG. 2B shows in dotted lines the primary tension lines 140, which are where the greatest tensile stress will occur. Tension lines are imaginary paths through the material that carry the greatest load when tension is applied to the material along the tension axis T. When tension is applied along tension axis T, the primary tension lines 140 move more closely into alignment with the applied tension axis, causing the material or sheet into which the pattern has been formed to distort. When single slit patterns are deployed, the activation of tension along the primary tension lines 140 causes substantially all regions of the pattern to experience some tension or compression (tensile stress or compressing stress) and then buckle and bend out of the plane of the original two-dimensional film. In some embodiments, when the film is fully deployed and/or tension is applied to the desired extent, substantially no regions exist in the film that remain parallel to the original plane of the sheet.

Another exemplary single slit pattern was disclosed in U.S. Pat. No. 8,613,993 (Kuchar) and is shown in FIG. 3. In this single slit pattern 300, slits 310 bend in the center to form a shape called a "tilde."

SUMMARY

The inventors of the present disclosure invented novel slit patterns that move into a position that is orthogonal to the plane of the original sheet when exposed to tension along the tension axis. The present disclosure describes various embodiments in which portions of the material rotate to the z-axis (substantially 90° or orthogonal to the original plane of material in its pretensioned state) when deployed or tension-activated. Additionally, some of these embodiments can withstand exposure to greater loads applied in the normal axis relative to other patterned structures without being crushed. This means that they can provide increased or enhanced protection for things like packages being shipped and other applications.

These slit patterns can be used to form tension-activated, expanding articles. In some embodiments, the articles can be used for shipping and packaging applications. However, the articles and patterns can also be used for a plethora of other uses or applications. So, the present disclosure is not meant to be limited to shipping or packaging material applications, which are merely one exemplary use or application.

BRIEF DESCRIPTION OF DRAWINGS

The disclosure may be more completely understood in consideration of the following detailed description of various embodiments of the disclosure in connection with the accompanying drawings.

FIG. 8H is a nearly side view, and FIG. 8I is a nearly top view.

FIG. 9B is a toper perspective view, FIG. 9C is a nearly top view, and FIG. 9D is a view at a roughly 45 degree angle.

DETAILED DESCRIPTION

In the following detailed description, reference may be made to the accompanying set of drawings that form a part hereof and in which are shown by way of illustration several specific embodiments. It is to be understood that other embodiments are contemplated and may be made without departing from the scope or spirit of the present disclosure.

Various embodiments of the present disclosure relate to single slit patterns and to articles including single slit patterns. A "slit" is defined herein as a narrow cut through the article forming at least one line, which may be straight or curved, having at least two terminal ends. Slits described herein are discrete, meaning that individuals slits do not intersect other slits. A slit is generally not a cut-out, where a "cut-out" is defined as a surface area of the sheet that is removed from the sheet when a slit intersects itself. However, in practice, many forming techniques result in the removal of some surface area of the sheet that is not considered a "cut-out" for the purposes of the present application. In particular, many cutting technologies produce a "kerf", or a cut having some physical width. For example, a laser cutter will ablate some surface area of the sheet to create the slit, a router will cut away some surface area of the material to create the slit, and even crush cutting creates some deformation on the edges of the material that forms a physical gap across the surface area of the material. Furthermore, molding techniques require material between opposing faces of the slit, creating a gap or kerf at the slit. In various embodiments, the gap or kerf of the slit will be less than or equal to the thickness of the material. For example, a slit pattern cut into paper that is 0.007" thick might have slits with a gap that is approximately 0.007" or less. However, it is understood that the width of the slit could be increased to a factor that is many times larger than the thickness of the material and be consistent with the technology disclosed herein.

As used herein, the term "single slit pattern" refers to a pattern of individual slits that form individual rows each extending across the sheet transversely, where the rows form a repeating pattern of individual rows along the axial length of the sheet, and the pattern of slits in each row is different than the pattern of slits in the directly adjacent rows. For example, the slits in one row may be axially offset or out of phase with the slits in the directly adjacent rows. In some embodiments, the slit, flap and/or folding wall shapes described herein amplify the out-of-plane motion of the materials or articles as compared to the prior art slit shapes of FIGS. 1A and 1B.

Figure 1A:
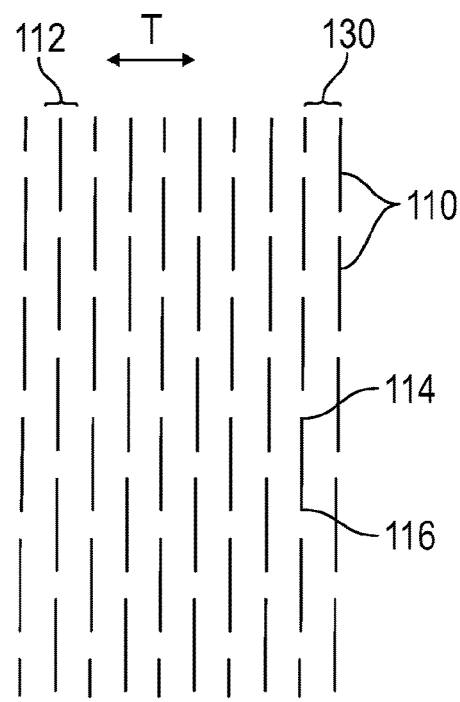
FIG. 1A is a top view line drawing of the slit pattern used to form a packaging material of FIGS. 1B and 1C.
Figure 1B:
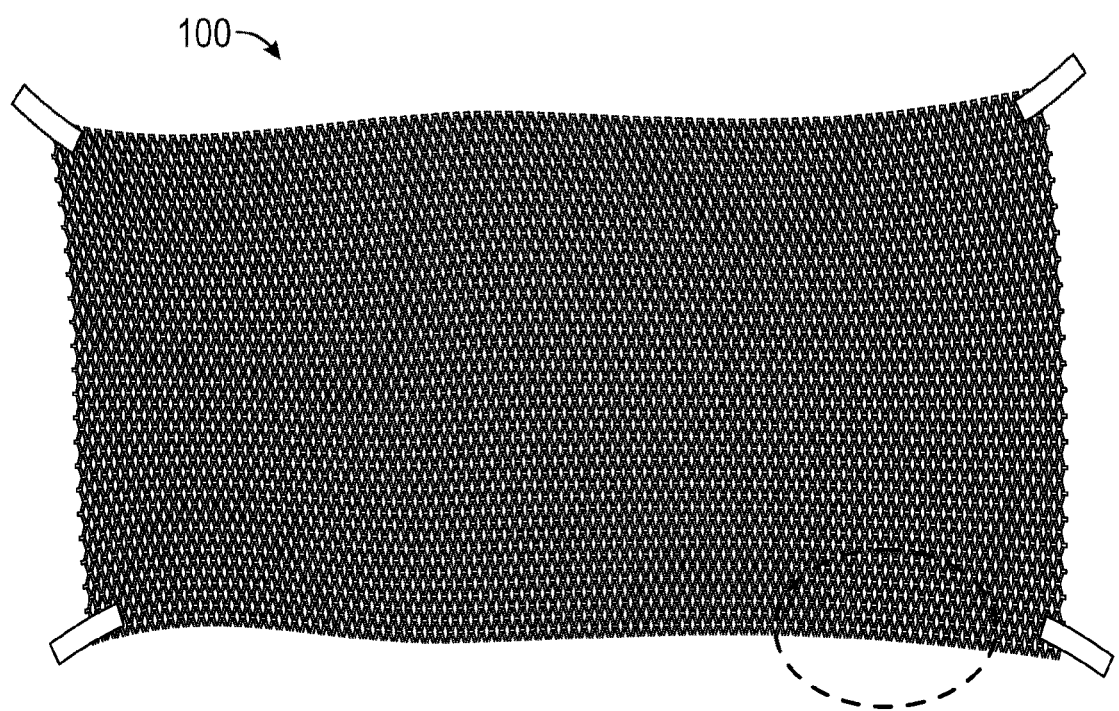
FIG. 1B is top view of a prior art packaging material.
Figure 1C:
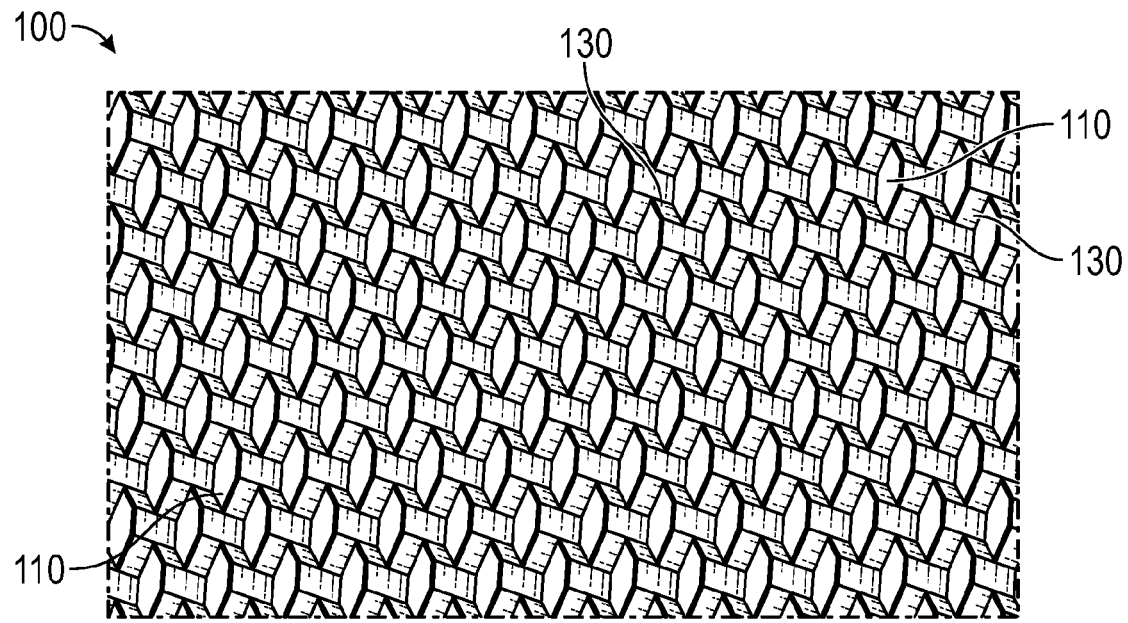
FIG. 1C is a magnified view of a portion of FIG. 1B.

The enhanced rotation of the material out of the plane of the sheet of material compared to the prior art slit/flap shapes of FIGS. 1A and 1B advantageously creates interlocking features. Whether a material is interlocking can be determined by the following test method.

A sample measuring 36-inches (0.91 m) long and 7.5-inches (19 cm) wide was obtained. The sample was fully deployed without tearing, and was then placed directly adjacent to a smooth PVC pipe having an outer diameter (OD) of 3.15 inches (8 cm) and a length of 23 inches (58.4 cm), ensuring that the sample remained fully deployed during rolling. The sample was wrapped over the pipe ensuring that each successive layer was placed directly over the previous layer and that the sample was placed at the center (along the length) of the pipe. The sample was wrapped around the pipe a minimum of two times. After the sample was wrapped around the pipe, the sample was released and whether the sample unfolded/unwrapped was observed. If the sample did not unfold/unwrap after a 1-minute wait, the sample was slid off the pipe onto a smooth surface such as a table top. The sample was then lifted by the trailing edge to see if it unrolled/unwrapped or held its shape.

If the sample opened/unwrapped within a minute of being released, during sliding it off the pipe, or when lifted by the trailing edge, the sample was deemed "not interlocking". If the sample held its tubular shape during and after sliding it off the pipe and when lifted by the trailing edge, then it was deemed interlocking. The test was repeated 10 times for each sample.

Figure 4A:
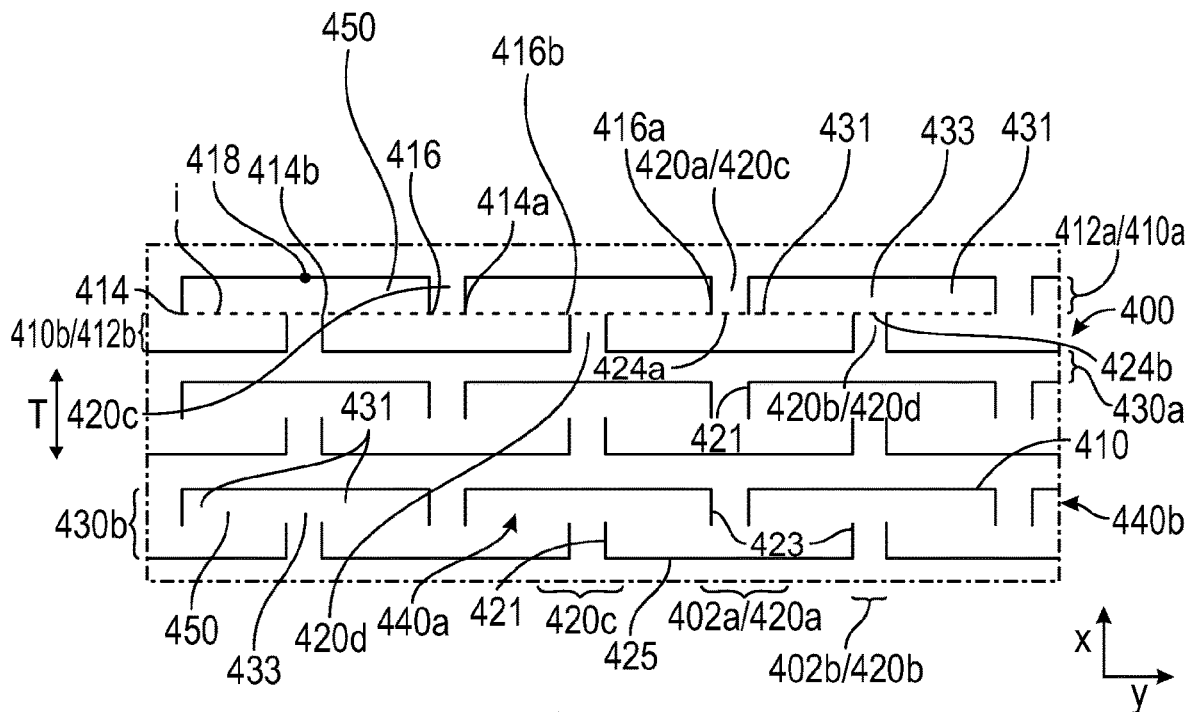
FIG. 4A is a top view schematic drawing of an exemplary single slit pattern.

An exemplary embodiment of a single slit pattern in a material 400 is shown schematically in FIG. 4A. The material 400 is a sheet defining a plane having an axial direction x (which is the vertical direction relative to the figure) that is parallel to a tension axis T and a transverse direction y (which is the horizontal direction relative to the figure) that is orthogonal to the axial direction x. The material 400 defines the x-y plane in a pretensioned state; that is to say, prior to application of tension along the tension axis T. The single-slit pattern of FIG. 4A includes a first set of rows 412*a* that include a first plurality of slits 410*a* extending across the sheet in the transverse direction y, where the first plurality of slits 410*a* have a first shape and position. The first plurality of slits 410*a* is a repeating pattern of slits. The first set of rows 412*a* alternate with a second set of rows 412*b* along the axial length of the sheet. Each of the second set of rows 412*b* is defined by a second plurality of slits 410*b* extending across the sheet in the transverse direction y. The second plurality of slits 410*b* is a repeating pattern of slits. The second set of rows 412*b* includes slits having the same slit shape but the slits 410 are positioned differently (in this case, inverted and axially offset). Slits 410 each include a first terminal end 414, a second terminal end 416, and a midpoint 418.

The first terminal end 414a of each slit in the first plurality of slits 410a is defined by a first terminal end segment 421 (that is a first axial portion 421, in the current example). The first terminal end segment 421 of each slit in the first plurality of slits 410a intersects an imaginary line i connecting the terminal ends 414b, 416b of a first slit in the second plurality of slits 410b. The first terminal end 414a of each slit in the first plurality of slits 410a is between the terminal ends 414b, 416b of a first slit in the second plurality of slits 410b in each of the axial and transverse directions. In this particular example, the first terminal end 414a of each slit in the first plurality of slits 410a is aligned with the imaginary line i. Stated differently, the first terminal end 414a of each slit in the first plurality of slits 410a is aligned with the terminal ends 414b, 416b of the first slit in the second plurality of slits 410b along an axis (overlapping with imaginary line i) extending in the transverse direction y.

The second terminal end 416a of each slit in the first plurality of slits 410a is defined by a second terminal end segment 423 (that is a second axial portion 423, in the current example). The second terminal end segment 423 of each of the slits in the first plurality of slits 410a is aligned with an imaginary line i connecting the terminal ends 414b, 416b of a second slit in the second plurality of slits 410b. In this example, the second terminal end 416a of each of the slits in the first plurality of slits 410a is between the terminal ends 414b, 416b of a slit in the second plurality of slits 410b in each of the axial and transverse directions. In particular, the second terminal end 416a of each slit in the first plurality of slits 410a is aligned with the terminal ends 414b, 416b of a slit in the second plurality of slits 410b in each of the axial and transverse directions. In various embodiments, the first slit and the second slit in the second plurality of slits 410b are adjacent slits.

Figure 2A:
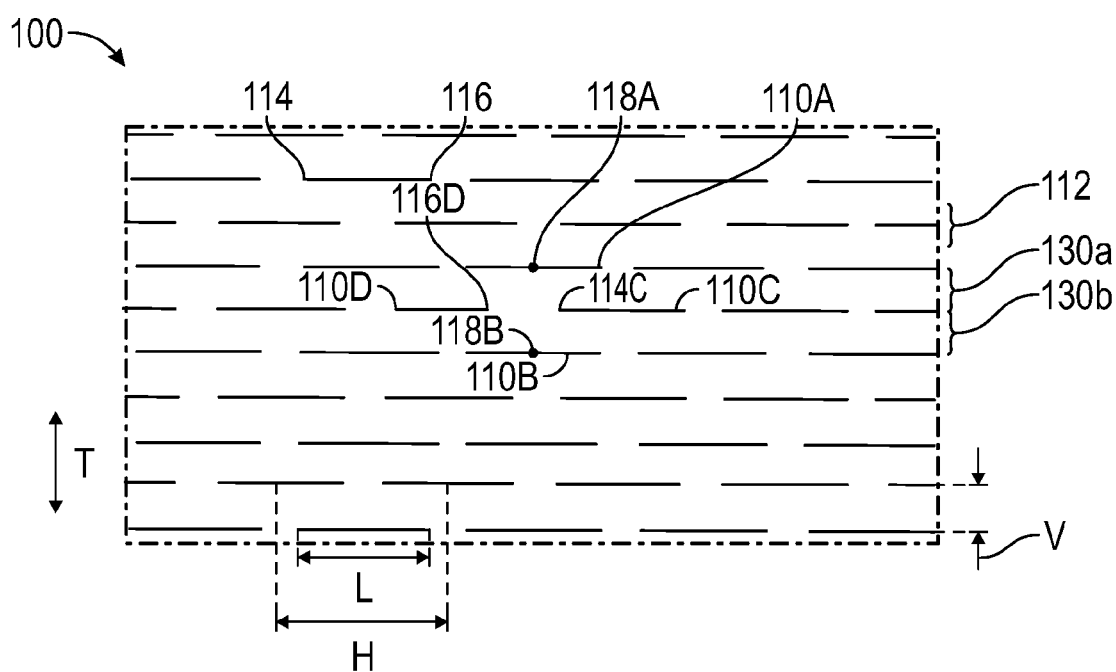
FIG. 2A is a top view line drawing of the slit pattern used to form the packaging material of FIGS. 1A and 1B rotated 90 degrees.
Figure 2B:
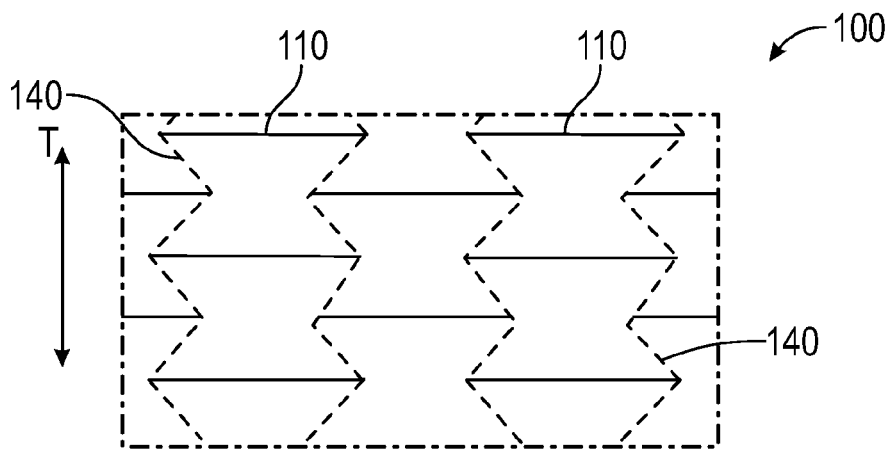
FIG. 2B shows the primary tension lines of the slit pattern shown in FIG. 2A.
Figure 3:
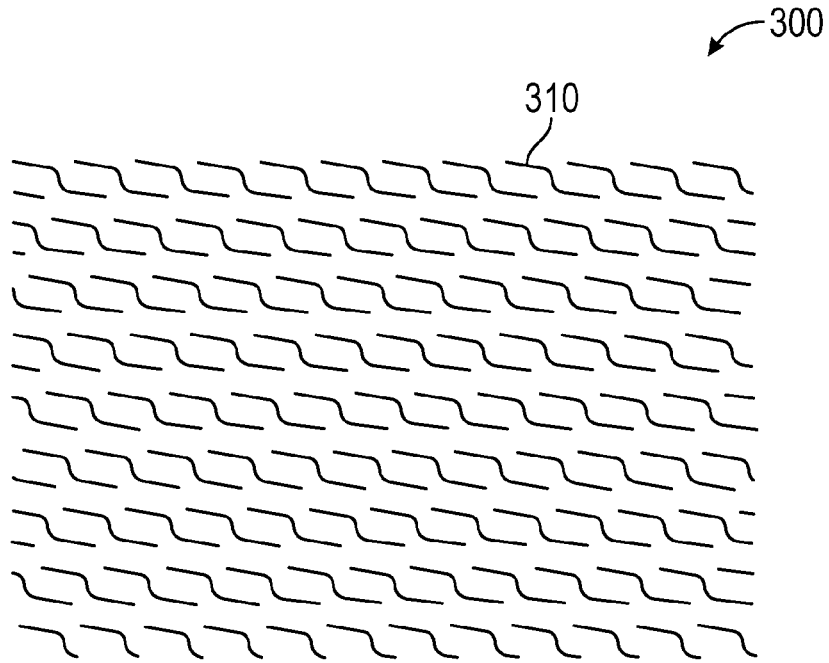
FIG. 3 is a prior art top view line drawing of another single slit pattern.

A plurality of individual slits 410 are aligned to form rows 412 that are generally perpendicular to the tension axis T. "Generally perpendicular" is defined herein as encompassing angles within a 5-degree margin of error or within a 3-degree margin of error. Material 420 is present between adjacent slits 410 in a row 412 forming beams 420 that extend generally axially. The material between directly adjacent rows 412 of slits 410 forms transverse beams 430a and folding wall regions 430b. Each axial beam 420 extends axially through each transverse beam 430a that intersects the axial beam 420. Slits 410 are not straight lines (like slits 110 of the slit pattern of FIGS. 1A and 2A) but instead include two generally axial portions 421, 423 that are generally parallel to the tension axis T and are connected to a generally transverse portion 425 that is generally perpendicular to the tension axis T. The first terminal end 414 is along a first axial portion 421 and the second terminal end 416 is along a second axial portion 423. Slits 410 are generally u-shaped with a generally perpendicular intersection angle between the two generally axial portions 421, 423 and the generally transverse portion 425. A folding wall 450 is generally the area enclosed by the path of slit 410 and the imaginary line i between the terminal ends 414 and 416. While in the current example, each of the axial portions 421, 423 and the transverse portion 425 are straight line segments, in various embodiments one or more of such portions can be curved lines, zig-zagged, and the like.

When the slits 410 are inverted relative to one another in directly adjacent rows, this creates the opportunity for them to align with one another such that one or more of the terminal ends 414, 416 of a slit 410 align along a transverse axis i (which is colinear with the imaginary line i) with the terminal ends 414, 416 of a slit 410 in a directly adjacent row. These unique patterns create unique beam widths, sizes, and shapes. Because the terminal ends 414, 416 of slits 410 in directly adjacent rows 412a and 412b align to approximate an imaginary, essentially straight, single line perpendicular to the tension axis T, the size and shape of beams varies from the embodiments previously described herein. The continuous transverse region between the generally transverse portions (which are substantially perpendicular to the tension axis) forms a first beam 430a. This beam only occurs once between every two sets of transversely aligned, directly adjacent rows 412a and 412b. Transversely aligned, directly adjacent rows 412a and 412b are arranged such that there is no continuous transverse region between the terminal ends 414, 416 of slits 410 in the directly adjacent, transversely aligned row. The area of material 400 into which the slits 410 with transversely aligned terminal ends 414, 416 extend define a folding wall region 430b that has a plurality of folding walls 450 extending across the sheet to form a row in the transverse direction y. The folding wall region 430b can be further described as having two generally rectangular regions 431 that are each bound by (1) a directly adjacent generally transverse portions 425 of opposing slits 410 which is perpendicular to the tension axis T and (2) adjacent axial portions 421 and 423 on directly adjacent, opposing slits 410. Material forming axially extending beams 420 is present between adjacent slits 410 in a single row 412. Directly adjacent the beam 420 is a region 433 which is the remaining material in the folding wall region 430b bounded in the axial direction by the beam 420 and the generally transverse portion 425, and bounded in the transverse direction by the two generally rectangular regions 431.

The plurality of slits 410 through the sheet 400 define a plurality of axially extending beams 420 arranged in columns across the axial length of the sheet. Due to having an extension parallel to the tension axis T of the material, the axially extending beams 420 are generally configured to transmit tension upon application of tension to the sheet of material 400 along the tension axis T. While each of the plurality of beams 420 are depicted in the current examples as generally rectangular in shape, in various embodiments some or all of the plurality of beams can have an alternate shape. In some embodiments, each of a plurality of beams have an irregular shape.

The plurality of slits 410 form a first plurality of axial beams 420a forming a first column 402a. Between each beam 420a in the axial direction x is a transverse portion 425 of a slit of the plurality of slits 410. Such a configuration advantageously allows axial expansion of the material 400 when tension is applied along the tension axis T. Tension is transmitted through the axial beams 420 and around each slit 410 between adjacent axial beams 420, causing axial expansion of each of the slits 410.

In various embodiments, the plurality of slits has a first group of slits 440a, each having a transverse portion 425a that is axially between each beam in the first plurality of beams 420a. The plurality of slits 410 define a second plurality of beams 420b extending in the axial direction x. The second plurality of beams 420b form a second column 402b extending across the sheet 400 in the axial direction x. The second plurality of beams 420b are spaced from the first plurality of beams 420a in the transverse direction y. Between each beam 420b in the axial direction x is a transverse portion 425 of a slit in a second group of slits

440b of the plurality of slits 410. The plurality of slits 410 can similarly define a third plurality of beams 420c, a fourth plurality of beams, and so on.

In the current example, the first plurality of beams 420a and the second plurality of beams 420b are staggered in the axial and transverse directions. However, each beam of the first plurality of beams 420a has a terminus 424a that is aligned along a transverse axis i with a terminus 424b of a beam of the second plurality of beams 420b. The "terminus" of a beam is the end of the beam defined by terminal ends of the adjacent slits that define the beam. In some alternate embodiments, each beam of the first plurality of beams 420a extends through an axis defined by a terminus 424b of a beam of the second plurality of beams 420b. In the current example, each slit in the first group of slits 440a has an axial portion 421 (the second axial portion 423) that defines a beam in the second plurality of beams 420b. Each slit in the second group of slits 440b of the plurality of slits 410 has an axial portion 423 (the first axial portion 421) that defines a beam in the first plurality of beams 420a.

In the current example, the first plurality of slits 410a forms a beam 420a/c in the first plurality of beams 420a. In particular, the beam 420a/c is defined by the material between adjacent slits in the first row. Indeed, the first plurality of slits 410a defines a plurality of beams across the first row 412a, which can be referred to as a third plurality of beams 420c. Each of the third plurality of beams 420c extend in the axial direction x. Each beam in the third plurality of beams 420c is defined by material between adjacent slits 410a in the first row.

Also, in the current example, the second plurality of slits 410b forms a beam 420b/d in the second plurality of beams 420b. In particular, the beam 420b/d is defined by the material between adjacent slits 410b in the second row 412b. Furthermore, the second plurality of slits define a fourth plurality of beams 420d across the second row 412b, where each of the beams extend in the axial direction x. Each beam in the fourth plurality of beams 420d is defined by material between adjacent slits 410b in the second row 412b.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a row are approximately colinear.

Those of skill in the art will appreciate that many changes may be made to the pattern while still falling within the scope of the present disclosure. Those of skill in the art will appreciate that the shape and slit length can vary. Alternatively, the slit length, row size or shape, and beam size or shape can vary. Further, the pattern can alternate in 2 rows, 3 rows, 4 rows, etc. Alternatively, the row size or shape, and beam size or shape can vary. Further, the degrees of offset or phase offset can vary from what is shown. Even further, many of the examples herein depict and describe slits that have axial portions intersecting a transverse portion at about a 90° angle to form a corner. In various embodiments, however the axial portions of slits may intersect a transverse portion to form a rounded corner. In some other embodiments, there is no discernible transition between the axial portions and the transverse portion, such as where the slit defines a semi-circle.

Figure 4B:
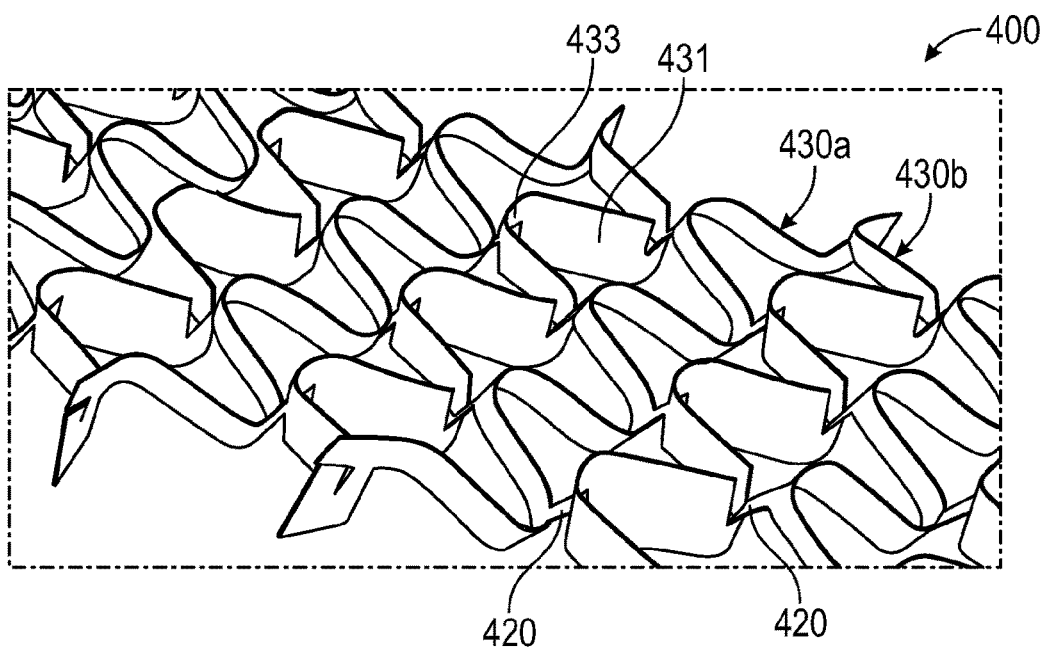
FIG. 4B is a perspective view of the pattern shown in FIG. 4A formed in a paper sheet and exposed to tension along the tension axis.
Figure 4C:
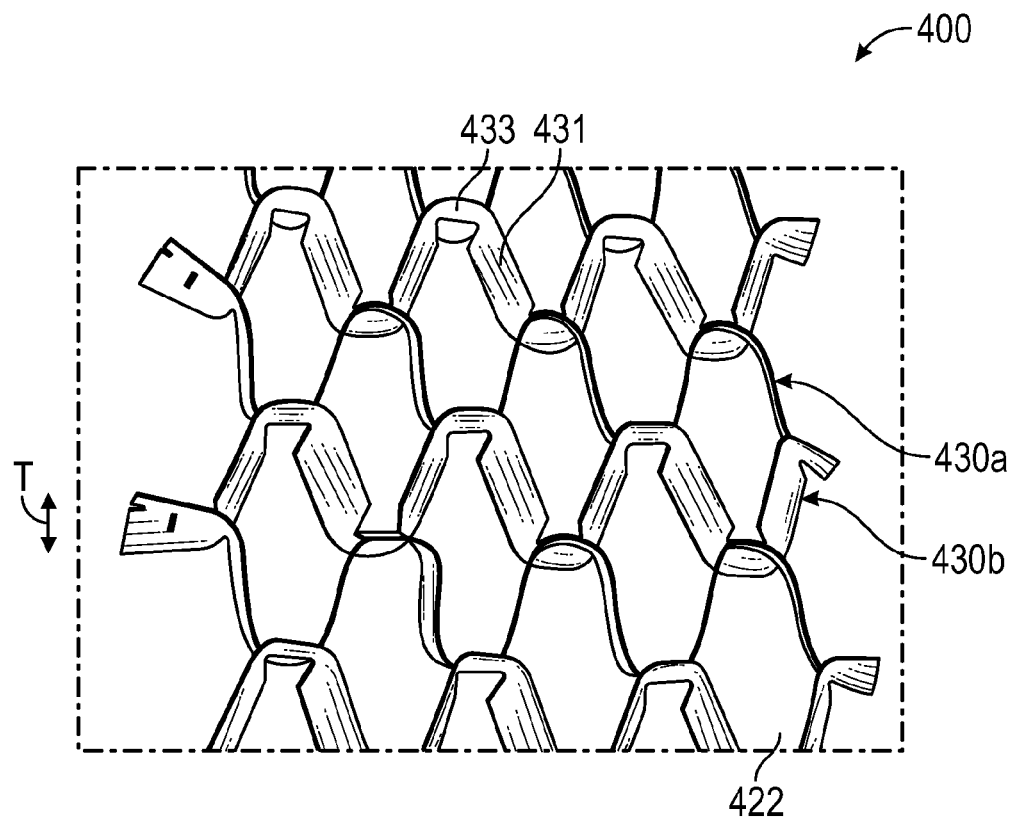
FIG. 4C is a nearly top view of the article of FIG. 4B when exposed to tension along the tension axis.
Figure 4D:
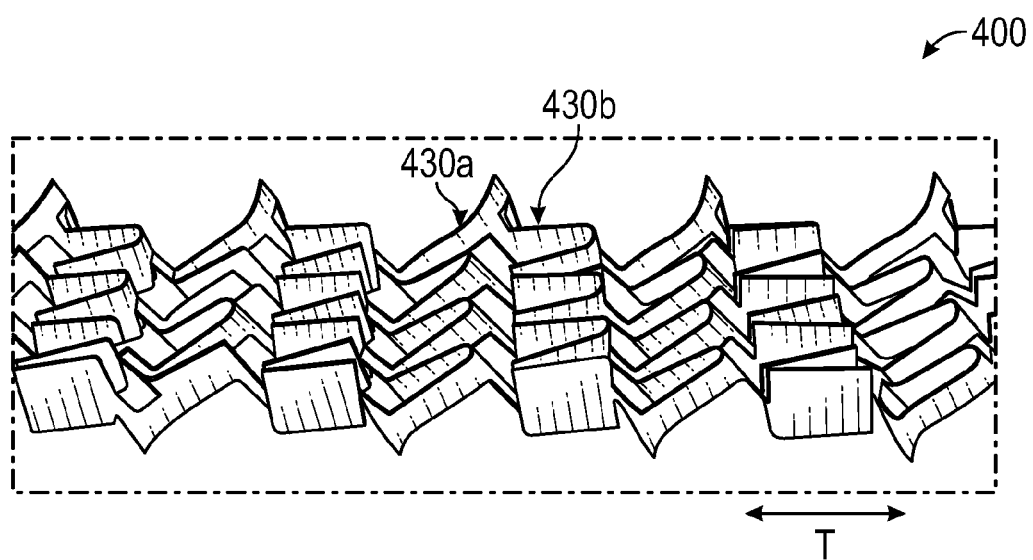
FIG. 4D is an elevated side view of the article shown in FIG. 4B.

FIGS. 4B-4D show the pattern of FIG. 4A formed in a sheet of paper and exposed to tension along the tension axis T. When material 400 is tension activated or deployed along tension axis T, portions of material 400 experiences tension and/or compression that causes the material to move out of the original plane of material 400 in its non-tensioned format. When exposed to tension along the tension axis, two things to happen to the transverse beams 430a and folding wall regions 430b. The transverse beam 430a bends into a shape that undulates to bring the beam 420 between adjacent slits closer in the transverse direction y to the adjacent beam 420 in the same row, while keeping the terminal ends 414 and 416 approximately in a single plane that is parallel to the original plane of material 400 in its pretensioned state. The folding wall region 430b rotates and folds into an accordion-like shape such that all of the two generally rectangular regions 431 and region 433 are nominally flat, have folds between all adjacent generally rectangular regions 431 and regions 433, and all flat surfaces are nominally orthogonal to the original plane of material 400 in its pretensioned state. Axial beams 420 between adjacent slits 410 in a row 412 primarily experiences tension aligned with tension axis T, so this region or area tends to bend with first beam 430a. These movements in material 400 form two distinct regions, the folded wall region 430b which is orthogonal to the tension axis and the original plane of material 400 in its pretensioned state, as seen in FIG. 4D. The other region is the transverse beam 430a which undulates and is tilted at an angle relative to the original plane of material 400 in its pretensioned state, as show in FIG. 4D.

Embodiments like the specific implementation of FIGS. 4A-4D have unique benefits. For example, FIGS. 4A-4D exemplify one set of embodiments in which portions of the material rotate to the normal axis (substantially 90° or orthogonal to the original plane of material 400 in its pretensioned state) when deployed or tension-activated. Additionally, some of these embodiments can withstand exposure to greater loads applied in the normal axis relative to other single slit patterned structures without being crushed. This means that they can provide increased or enhanced protection for things like packages being shipped and other applications. Another advantage to single slit patterns like the specific implementation shown in FIGS. 4A-4D is that, in some embodiments, once the construction is in its deployed (via application of tension) position, the construction substantially remains in its extended/tensioned position even once the tension is no longer applied. This feature can provide a more stable construction. Some of these benefits are a result of the increased strength of the folded wall geometry. The folded wall, or accordion shaped wall, or rotating/folding beam has a large area moment of inertia (also called moment of area or second moment of inertia) in the deployed article (deployed via the application of tension or force) where the area moment of inertia is in the plane of the original sheet. The area moment of inertia is increased relative to a straight vertical wall without folds.

When the tension-activated material 400 is wrapped around an article or placed directly adjacent to itself, the accordion folded folding wall regions 430b or the undulating first beams 430a can interlock with one another and/or opening portions 422, to create an interlocking structure. Interlocking can be measured as stated in the interlocking test articulated above.

Figure 5A:
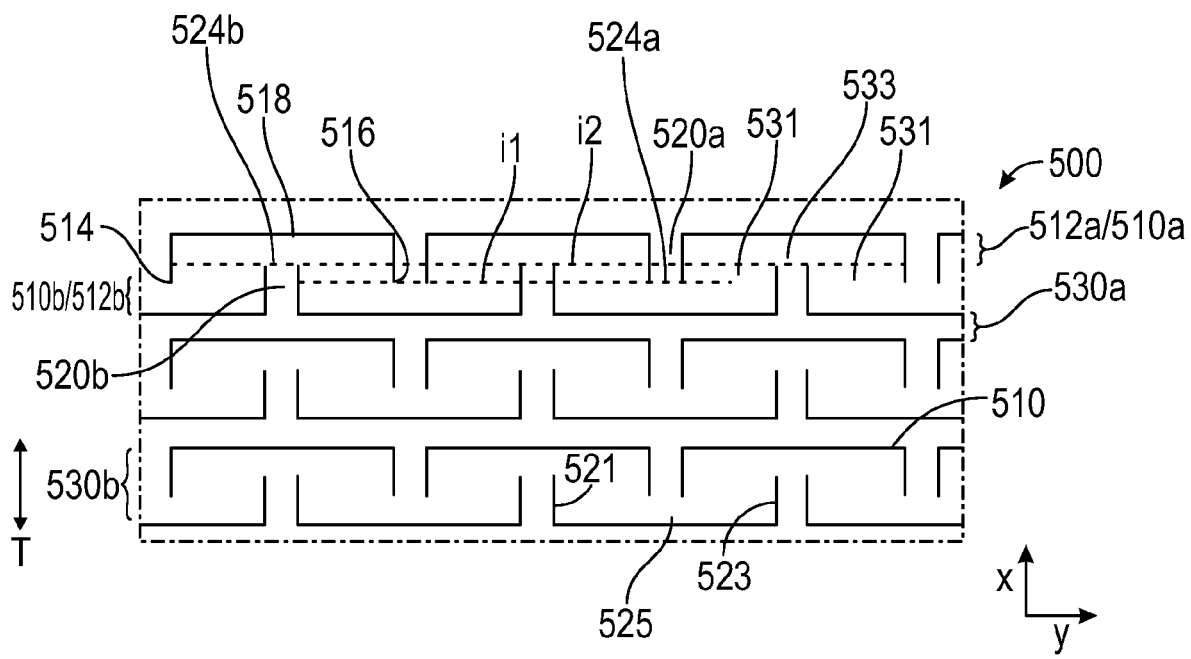
FIG. 5A is a top view schematic drawing of an exemplary single slit pattern.

Another exemplary embodiment of a single slit pattern in a sheet of material 500 is shown schematically in FIG. 5A. The pattern of FIG. 5A is similar to the pattern of FIGS. 4A-4D and, as such, the description of FIGS. 4A-4D generally apply to the current description, except that in FIG. 4A directly adjacent rows align with one another such that one or more of the terminal ends of a slit align with the terminal ends of a slit in a directly adjacent row along a transverse axis i. In contrast, in FIG. 5A, the slits in adjacent rows nest together or overlap, meaning that a first terminal end segment of a slit in one row extends through an imaginary line connecting the terminal ends of a first slit in a second, adjacent row. Similarly, a second terminal end segment of the slit extends through an imaginary line connecting the terminal ends of a second slit in the second, adjacent row. This configuration affects the beam width, size, and shape of the material upon application of a threshold amount of tension along the tension axis T.

More specifically, the single-slit pattern of FIG. 5A includes a first set of rows 512$a$ that include a first plurality of slits 510$a$ having a first shape and position and a second set of rows 512$b$ with a second plurality of slits 510$b$ that include the same slit shape but the slits are positioned differently (in this case, inverted). The first plurality of slits 510$a$ define a first plurality of axial beams 520$a$ that is the material between the slits 510$a$. The second plurality of slits 510$b$ define a second plurality of axial beams 520$b$ between the slits 510$b$. The slit shape, general configurations, and possible alternatives in both the first set of rows 512$a$ and the second set of rows 512$b$ is similar to that of FIG. 4A, whose description above is repeated herein.

In the current example, however, the second plurality of slits 510$b$ nest or overlap with another slit 510 in a directly adjacent row, specifically with the first plurality of slits 510$a$ in the current example. Each of the slits in the second plurality of slits 510$b$ extend through a first imaginary line i1 that connects the terminal ends of a slit in the first plurality of slits 510$a$. Similarly, each of the slits in the first plurality of slits 510$a$ extend through a second imaginary line i2 that connects the terminal ends of a slit in the second plurality of slits 510$b$. Furthermore, each beam 520 in the first plurality of beams 520$a$ has a terminus 524$a$ that extends through a transverse axis (overlapping with the second imaginary line i2) defined by a terminus 524$b$ of a beam of the second plurality of beams 520$b$. Similarly, each beam 520 in the second plurality of beams 520$b$ has a terminus 524$b$ that extends through a transverse axis (overlapping with the first imaginary line i1) defined by a terminus 524$a$ of a beam of the first plurality of beams 520$a$. This nesting or overlap creates the opportunity to create unique beam width, size, and shape.

Because the terminal ends 514, 516 of slits 510 in directly adjacent rows 512$a$ and 512$b$ overlap, such that a single line (nominally transverse) will pass through a portion of all of the axial portions 521 and 523 of all slits 510 in the overlapped rows 512$a$ and 512$b$, the size and shape of beams varies from the embodiments previously described herein. The continuous transverse region between the generally transverse portions (which are substantially perpendicular to the tension axis T) forms a first beam 530$a$. This beam only occurs once between every two sets of overlapped rows 512$a$ and 512$b$. Overlapped rows 512$a$ and 512$b$ are arranged such that there is no continuous transverse region between the terminal ends 514, 516 of slits 510 in the directly adjacent, overlapped, row. The overlapped row of slits 512$a$ and 512$b$ comprises a folding wall region 530$b$. The folding wall region can be further described as having two generally rectangular regions 531 that are bounded in the axial direction by adjacent generally transverse portions 525 on opposing sides of the folding wall region 530$b$ and bounded in the transverse direction by adjacent axial portions 521 and 523 on opposing sides of the folding wall region 530$b$. The axial beam 520 (for example axial beam 520$a$ and 520$b$) is present between adjacent slits 510 in a single row 512. Directly adjacent the beam 520 is a region 533 which is the remaining material in the folding wall region 530$b$ bounded in the axial direction by the beam 520 and the generally transverse portion 525 and bounded in the transverse direction by the two adjacent generally rectangular regions 531, more specifically by the axial extensions of the adjacent axial portions 521 and 523.

Similar to the discussion of FIGS. 4A-4D, above, in the current example the axial beams 520 are arranged in columns extending the axial length of the sheet of material 500. The axial beams 520 extend axially through an adjacent portion of each transverse beam 530$a$ that intersects the axial beam 520. Transverse portions 525 of slits 510 are generally arranged between each of the axial beams 520 in each respective column such that the axial beams 520 within a column are separated from each other by a transverse portion 525 of a slit.

Those of skill in the art will appreciate that many changes may be made to the pattern while still falling within the scope of the present disclosure. Those of skill in the art will appreciate that the shape and slit length can vary. For example, in some embodiments, the shape is u-shaped with more rounded edges than is shown in FIG. 5A. Alternatively, the slit length, row size or shape, and beam size or shape can vary. Further, the pattern can alternate in 2 rows, 3 rows, 4 rows, etc. Alternatively, the row size or shape, and beam size or shape can vary. Further, the degrees of offset or phase offset can vary from what is shown.

Figure 5B:
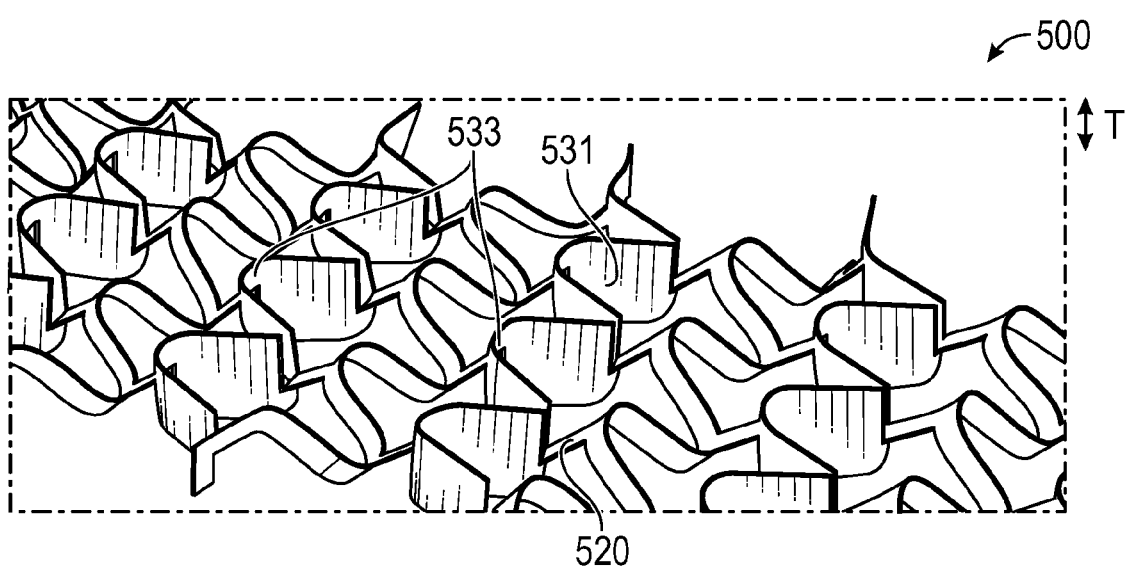
FIG. 5B is a perspective view of the pattern shown in FIG. 5A formed in a paper sheet and exposed to tension along the tension axis.
Figure 5C:
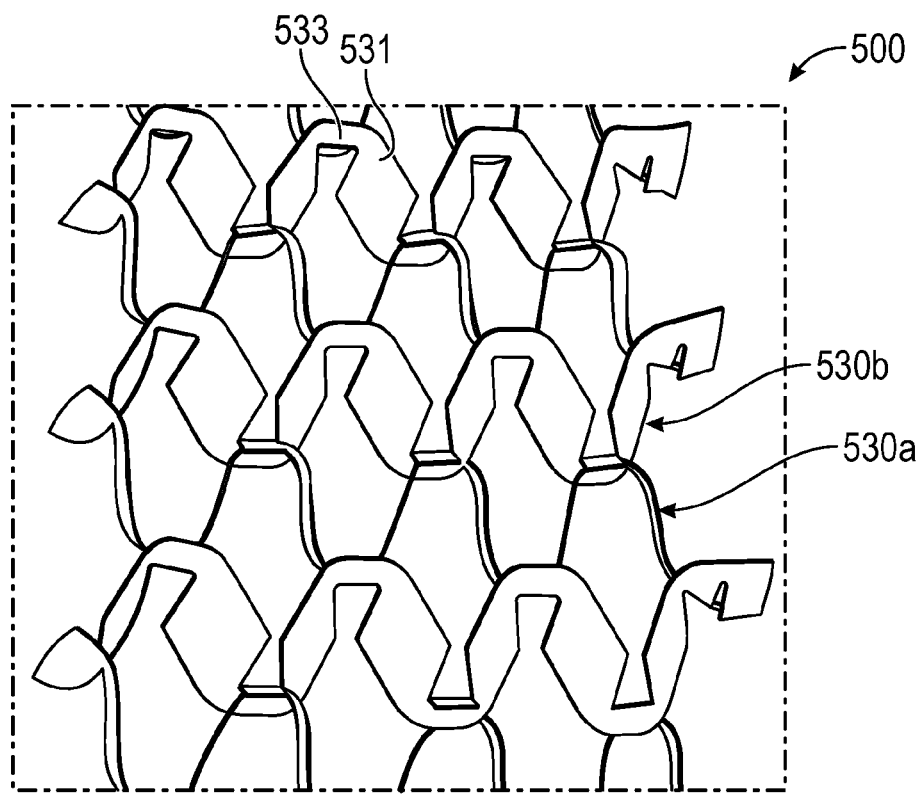
FIG. 5C is a nearly top view of the article of FIG. 5B when exposed to tension along the tension axis.
Figure 5D:
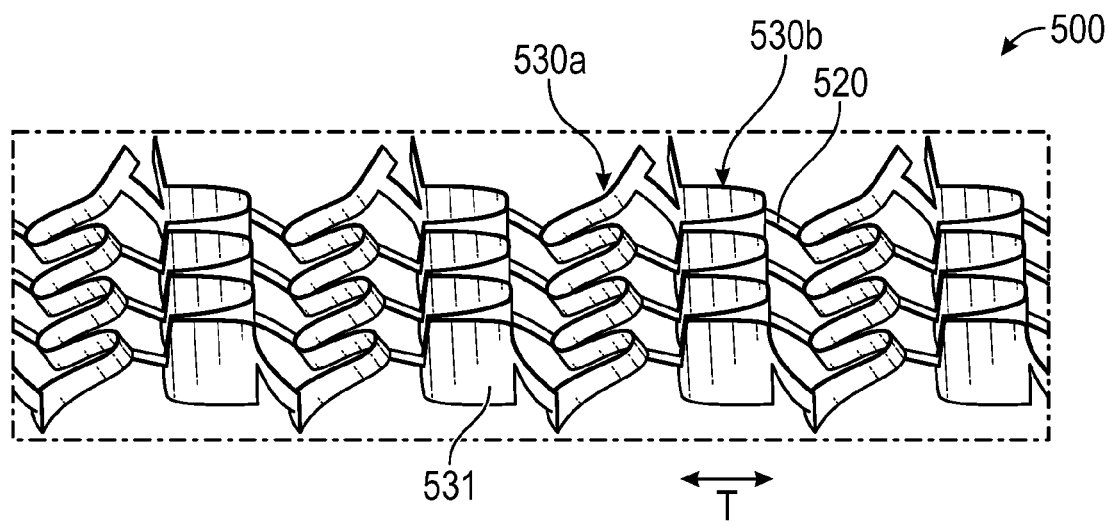
FIG. 5D is an elevated side view of the article shown in FIG. 4B.

FIGS. 5B-5D show the pattern of FIG. 5A formed in a sheet of paper and exposed to tension along the tension axis T. When material 500 is tension activated or deployed along tension axis T, portions of material 500 experiences tension and/or compression that causes the material to move out of the original plane of material 500 in its non-tensioned format. When exposed to tension along the tension axis, two things to happen to the two different types of beams 530$a$ and 530$b$. The first beam 530$a$ bends into a shape that undulates to bring the axial beam 520 between adjacent slits 510 closer to the adjacent beam 520 in the same row, while keeping the terminal ends 514 and 516 approximately in a single plane that is parallel to the original plane of material 500 in its pretensioned state. The folding wall region 530$b$ rotates and folds into an accordion-like shape such that all of the generally rectangular regions 531 and regions 533 are nominally flat, have folds between two generally rectangular regions 531 and regions 533, and have a single common axis (that in the flat state was the axial axis) that rotates at least 90 degrees from the original plane of the material 500 in its pretensioned state. The rotation of the common axis can also be understood and even calculated when it is considered as an additional consequence of all the terminal ends 514 and 516 being pulled into the same plane. These movements in material 500 form a series of two distinct folded beams one of which rotated at least orthogonal to the tension axis and the original plane of material 500 in its pretensioned state, as seen in FIG. 5D.

Embodiments like the specific implementation of FIGS. 5A-5D have unique benefits. For example, FIGS. 5A-5D exemplify one set of embodiments in which portions of the material rotate to or beyond the normal axis, or substantially 90° or orthogonal to the original plane of material 500 in its pretensioned state when deployed or tension-activated. Additionally, some of these embodiments can withstand exposure to greater loads applied in the normal axis relative to other single slit patterned structures without being crushed. This means that they can provide increased or enhanced protection for things like packages being shipped and other applications. Another advantage to single slit patterns like the specific implementation shown in FIGS. 5A-5D is that, in various embodiments, once the construction is in its deployed (via application of tension) position, the construction substantially remains in its deployed/extended/tensioned position even once the tension is no longer applied. This feature can provide a more stable construction.

Because the implementation of FIGS. 5A-5D rotates beyond 90 degrees, it creates additional stress in some of the folds that tends to plastically deform (or crease) the material making it even more likely to stay in its deployed position even once the tension is no longer applied than the implementation of FIGS. 4A-4D. Some of these benefits are a result of the increased strength of the folded wall geometry. The folded wall, or accordion shaped wall, or rotating/folding beam has a large area moment of inertia (also called moment of area or second moment of inertia) in the deployed article (deployed via the application of tension or force) where the area moment of inertia is in the plane of the original sheet. The area moment of inertia is increased relative to a straight vertical wall without folds.

When the tension-activated material 500 is wrapped around an article or placed directly adjacent to itself, the accordion folded folding wall regions 530b, or the undulating first beams 530a can interlock with one another and/or opening portions 522, to create an interlocking structure. Interlocking can be measured by the "interlocking test method" described below.

Additional single slit patterns are shown in, for example, U.S. Patent Application No. 62/952,789, assigned to the present assignee, the entirety of which is incorporated herein.

Multi-Slit Patterns

Various embodiments of the present disclosure relate to multi-slit patterns and to articles including these multi-slit patterns. The term "multi-slit pattern" is defined herein as a pattern of individual slits that form a first set of adjacent rows across the transverse direction y of the sheet, where the individual slits within the first set of adjacent rows are aligned in the transverse direction y. In a multi-slit pattern, the first set of adjacent rows form a repeating pattern with at least a second row along the axial length of the sheet, where the slits in the first set of adjacent identical rows are offset from the slits in the second row in the transverse direction y. The term "multi-slit pattern" includes double slit patterns, triple slit patterns, quadruple slit patterns, etc. A double slit pattern is where the slits form a set of two identical rows that are repeated in the pattern of rows along the axial length of the sheet, a triple slit pattern is where the slits form three identical rows that are repeated in the pattern of rows, and so on. Substantial alignment of the terminal ends of aligned multi-slits means that if you draw an imaginary line between two terminal ends of slits in adjacent rows, the angle of that imaginary line relative to the alignment axis (the axis that is perpendicular to the row(s) in the plane of the sheet) is no greater than +/−20 degrees. In some embodiments, the length of each slit that forms a multi-slit differs by no more than +/−20% of the total length of the longest or shortest slit. In some embodiments, where the slits are linear, they are substantially parallel to one another. In some embodiments where the slits are not linear, the aligned multi-slits are all substantially aligned parallel to the tension axis within +/−20 degrees.

As used herein, the term "double slit pattern" refers to a pattern of a plurality of individual slits. Each slit in the plurality can be formed by a single continuous cut that does not crossover or intersect itself. The pattern includes a plurality of rows of slits and the individual slits in a first row are substantially aligned with the individual slits in a directly adjacent, second row. A double slit is comprised of a slit in a first row that is substantially aligned with a slit in a second row. Together, these two substantially aligned slits form a double slit.

Double, triple, quadruple, or multi-slit patterns create significantly more out of plane undulation than single slit patterns when exposed to tension along a tension axis. This out of plane undulation of the material has great value for many applications. For example, these out of plane undulation areas create out of plane material or loops that can interlock with other areas of out of plane material or loops when portions of the material are placed adjacent to one another or wrapped together. As such, multi-slit patterns inherently interlock and/or include interlocking features. Once tension-activated, these features and patterns interlock and hold the material substantially in place. Interlocking can be measured as described above.

The undulations also create structures that can absorb energy in a spring-like fashion without significant plastic deformation. When double slit patterns are cut into a two-dimensional article (such as, for example, paper) and tension is applied to the article along the tension axis T, portions of the two-dimensional article undulate or move into the z-axis (the axis perpendicular to the original pretensioned plane of the two dimensional article), resulting in the formation of a three-dimensional article. In some embodiments, the slit or folding wall shapes described herein amplify the out-of-plane motion of the materials or articles as compared to the prior art slits or flap shapes and/or orientations of FIGS. 1A-2B. In some embodiments, the materials into which the double slit patterns are formed are substantially non-extensible. In some embodiments, the double slit patterns continue through and are truncated by at least one edge of the material without stopping or changing. The resulting materials and/or articles offer a wide variety of advantages.

Figure 6A:
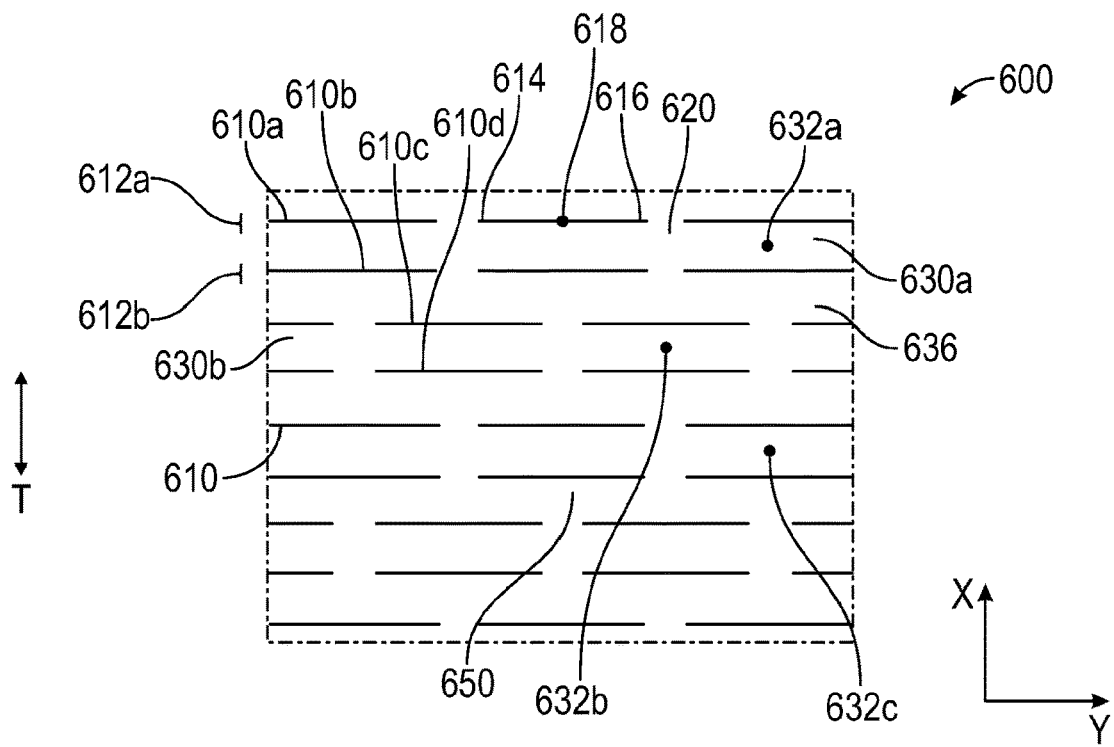
FIG. 6A is a top view schematic drawing of an exemplary double slit pattern.

FIG. 6A is a schematic drawing of an exemplary double slit pattern. The pattern 600 includes a plurality of slits 610 in rows of slits 612. Each slit 610 includes a midpoint 618 between a first terminal end 614 and a second terminal end 616. A first row 612a of slits 610 and a second row 612b of slits 610 each include a plurality of slits 610 that are spaced from one another. The space between directly adjacent slits 610 in a row 612 can be referred to as the material 620 between adjacent slits 610 in a row 612. A straight, imaginary line extends between and connects terminal ends 614, 616. In this exemplary embodiment, the straight, imaginary line extending between and connecting the terminal ends of a first slit is substantially colinear with the straight, imaginary line extending between and connecting the terminal ends of a directly adjacent second slit in the same row. In this exemplary embodiment, all of the straight, imaginary lines extending between and connecting the slit terminal ends in a single row are approximately colinear.

Together, rows 612a, 612b of slits 610 form a transverse beam 630. Transverse beam 630 is bound transversely by slits 610. An overlap beam 636 is directly adjacent to and, in this embodiment, on both sides of each transverse beam 630a, 630b. Overlap beam 636 is bound by non-aligned slits. The slits in each directly adjacent row 612a, 612b that forms an edge or side of transverse beam 630 are substantially aligned with one another such that they are substantially parallel and their terminal ends 614, 616 are substantially aligned perpendicular to the axis of the row and equidistant to one another. In some embodiments, the slits that are aligned have substantially the same slit length and pitch (pitch being relative to the tension axis).

More specifically, material 600 includes slits 610a, 610b, 610c, 610d. Together, slits 610a and 610b form a double slit. Also, together, slits 610c and 610d form another double slit. Slits 610a and 610b form sides or edges of a portion of a first transverse beam 630a. Slits 610b and 610c form sides or edges of a portion of overlap beam 636 Slits 610c and 610d form sides or edges of a portion of a second transverse beam 630b. Transverse beam 630a is directly adjacent to overlap beam 636. Overlap beam 636 is directly adjacent to transverse beam 630b. Slits 610a and 610b are substantially aligned with one another. Slits 610c and 610d substantially aligned with one another. Slits 610b and 610c are not aligned with one another. Instead, slits 610b and 610c are phase separated or spaced from one another. In the embodiment of FIG. 6A, slits 610 are substantially perpendicular to the tension axis T.

Each section of transverse beam 630 bordered by two parallel and substantially aligned slits 610 includes a midpoint 632 that is (1) at the midpoint (transversely) between first terminal end 614 and a second terminal end 616 of the slits 610 that form the sides of transverse beam 630 and (2) at the midpoint (axially) between the two slits 610 that form the sides of transverse beam 630. A midpoint 632a of a first section of transverse beam 630a is out of phase with a midpoint 632b of the directly adjacent section of the directly adjacent transverse beam 630b. In the embodiment of FIG. 6A, the midpoint 632a of a first section of transverse beam 630a substantially aligns axially with midpoint 632c of a first section of transverse beam 630c, which is the second directly adjacent transverse beam from transverse beam 630a.

FIG. 6A also shows the tension axis (T) which is substantially parallel to the axial direction x and substantially perpendicular to the transverse direction y, and the direction of the rows of slits, in the embodiment of FIG. 6A. The tension axis (T) is an axis along which tension can be provided to deploy the material into which the pattern 600 has been formed, which creates the upward and downward movement of transverse beams 630 and rotation of overlap beams 636.

Figure 6B:
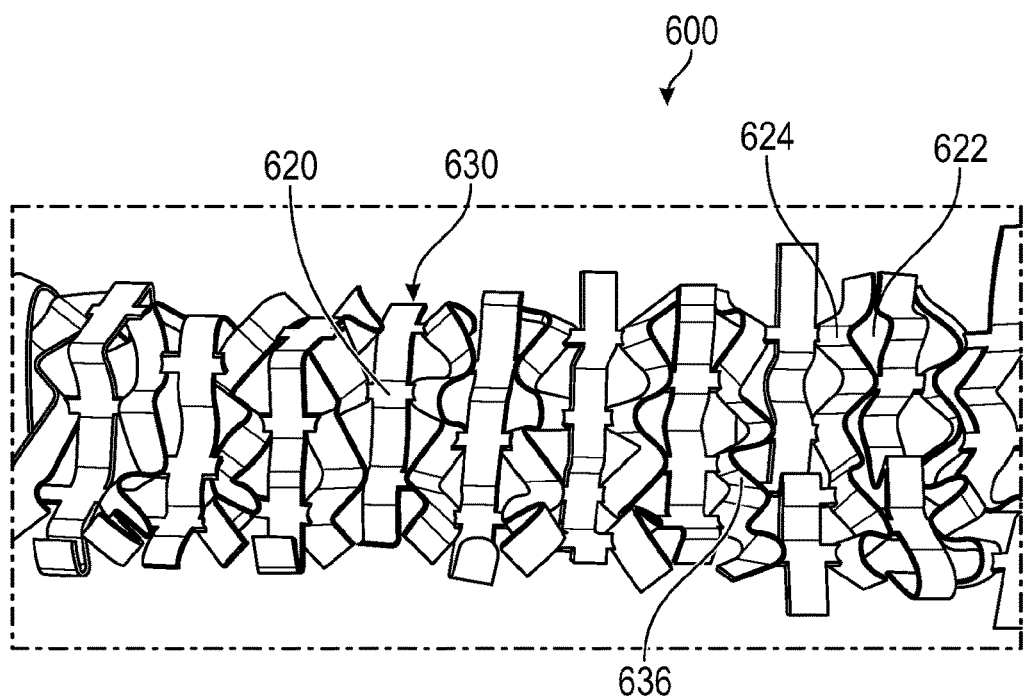
FIG. 6B is a nearly top view of the double slit pattern of FIG. 6A formed in a paper sheet and exposed to tension along the tension axis.
Figure 6C:
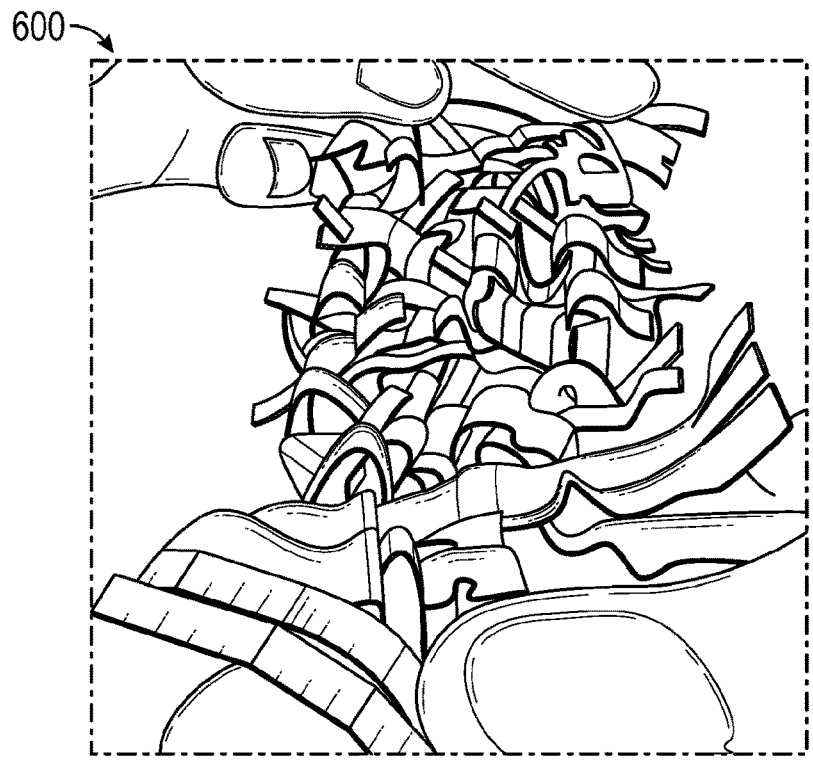
FIG. 6C is a nearly side of view of the double slit pattern of FIG. 6A formed in a paper sheet and exposed to tension along the tension axis.

FIGS. 6B and 6C show a material including the slit pattern of FIG. 6A when exposed to tension along tension axis T. When material 600 is tension activated or deployed along tension axis T, portions of material 600 experience tension and/or compression that causes material 600 to move out of the original plane of material 600 in its non-tensioned format. When exposed to tension along the tension axis, terminal ends 614, 616 experience compression and are drawn toward one another, causing a flap region 650 of the material 600 to move or buckle upward relative to the horizontal plane of the material 600 in its pretensioned state (FIG. 6A), creating a flap 624. Portions of transverse beams 630 undulate out of the original plane of the material 600 in its pretensioned state (FIG. 6A) forming loops, while staying nominally parallel to the tension axis. The material 620 between adjacent slits 610 in a row 612 stays substantially parallel to the original plane of material 600 in its pretensioned state (FIG. 6A). Overlap beams 636 buckle and rotate out of the plane of the original material or sheet. The motion of the flap region 650 in combination with the undulation of the transverse beams 630 creates open portions 622.

Those of skill in the art will appreciate that many changes may be made to the pattern and material while still falling within the scope of the present disclosure. For example, in some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. Further, the degrees of offset or phase offset can vary from what is shown. The slit, row, or beam pitch can vary. The angle between the tension axis and slits can vary. Many of these changes could change the deployment pattern.

When the tension-activated material 600 is wrapped around an article or placed directly adjacent to itself, the transverse beams 630 and/or flaps 624 interlock with one another and/or opening portions 622, to create an interlocking structure. Interlocking can be measured as stated in the interlocking test articulated above.

Figure 7A:
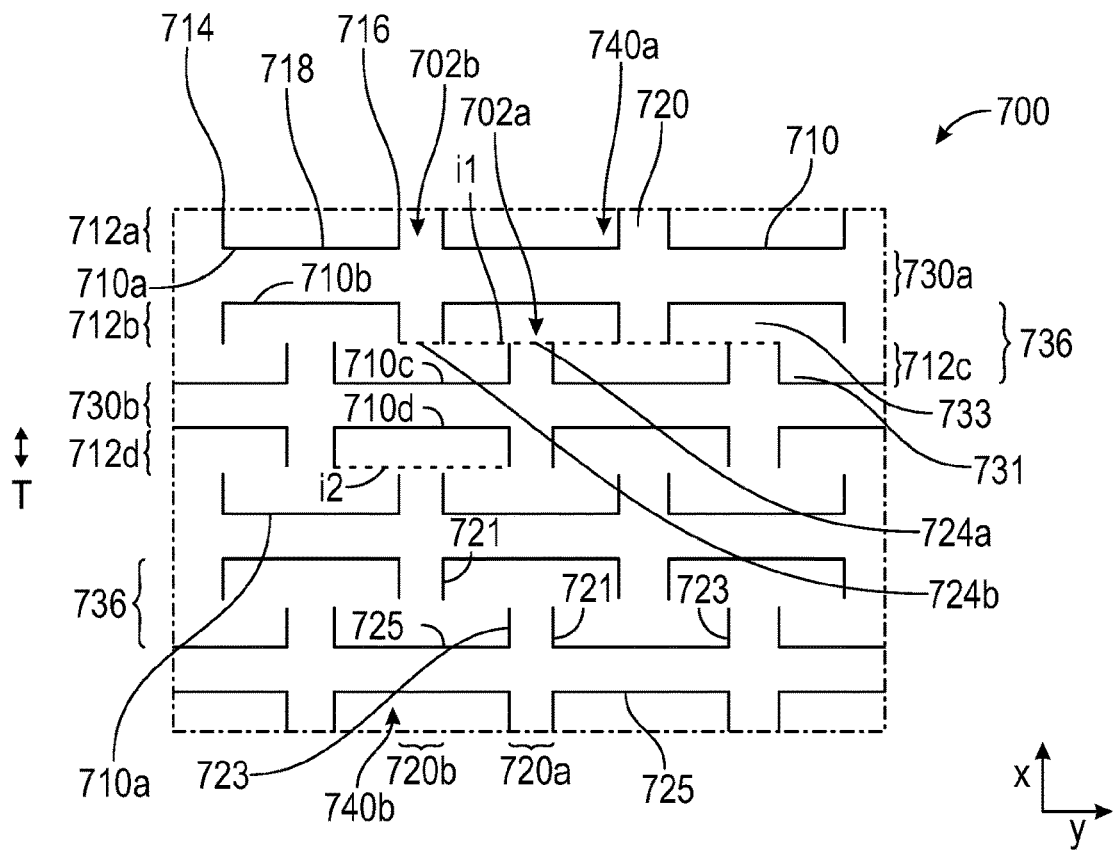
FIG. 7A is a top view schematic drawing of an exemplary double slit pattern.

One exemplary embodiment of another double slit pattern in a sheet of material 700 is shown schematically in FIG. 7A. The sheet of material 700 defines an axial direction x and a transverse direction y, where the axial direction is parallel to the tension axis T. The slit pattern of FIG. 7A shows that differing rows can have differently positioned slits. With specific reference to the implementation of this general concept into an example, the single-slit pattern of FIG. 7A includes a first set of rows 712a that include slits 710 of a first shape and position and a second set of rows 712b that includes the same slit shape but the slits 710 are positioned differently (in this case, inverted) and offset in the axial direction x. The slit shape in both the first set of rows 712a and the second set of rows 712b is substantially the same except for the inversion. In addition to being positioned differently, the slits of FIG. 7A are nested such that the terminal ends of the slits 710 in adjacent rows are aligned along a transverse axis, or the slits 710 in one row extend past an axis defined by the terminal ends of the slits 710 in an adjacent row creating a nested arrangement.

The double-slit pattern is formed in material 700 and includes a plurality of slits 710 that each include a first terminal end 714, a second terminal end 716, and a midpoint 718. A plurality of individual slits 710 are aligned to form rows 712 that are generally perpendicular to tension axis T. Material forming an axial beam 720 is present between adjacent slits 710 in a row 712. The axial beam 720 extends through an adjacent transverse beam 730a, 730b. In the exemplary embodiment of FIG. 7A, slits 710 are not discrete straight lines (like slits 610 of the slit pattern of FIG. 6A) but instead include two generally axial portions 721, 723 that are generally parallel to the tension axis T and that are connected to a generally transverse portion 725 that is generally perpendicular to the tension axis T. In this embodiment, slits 710 are generally u-shaped and the intersection points of axial portions 721, 723 and generally transverse portion 725 are generally perpendicular to one another.

The plurality of slits 710 through the sheet 700 define a plurality of axially extending beams 720 arranged in columns along the axial length of the sheet. The plurality of slits 710 form a first plurality of axial beams 720a forming a first column 702a. A transverse portion 725 of a slit of the plurality of slits 710 is disposed axially between beams 720a. Unlike previously described examples, in this example each beam is not separated by a transverse portion 725 of a slit 710. Rather, each series of two beams 720a in the first column 702a alternates with a series of two transverse portions 725 of corresponding slits 710 in the column. As such, the first column 702a has a first group of slits 740a each having a transverse portion 725a that is axially between beams in the first plurality of beams 720a.

The plurality of slits 710 also define a second plurality of beams 720b extending in the axial direction x. The second plurality of beams 720b form a second column 702b extending across the sheet 700 in the axial direction x. The second plurality of beams 720b are spaced from the first plurality of beams 720a in the transverse direction y. Between beams 720b in the axial direction x is a transverse portion 725 of a slit in a second group of slits 740b of the plurality of slits 710. Similar to the first column 702a, in this example in the second column 702b there is a series of two consecutive beams 720b alternating with two consecutive transverse portions 725 of slits along the length of the column 702b.

The first plurality of beams 720a and the second plurality of beams 720b are staggered in the axial and transverse directions. In the current example, each slit in the first group of slits 740a has an axial portion 721 (the first axial portion 721) that defines a beam in the second plurality of beams 720b. Each slit in the second group of slits 740b of the plurality of slits 710 has an axial portion 723 (the second axial portion 723) that defines a beam in the first plurality of beams 720a. Each beam of the first plurality of beams 720a is aligned with axis (i1, as an example) defined by a terminus 724b of a beam of the second plurality of beams 720b.

In the current embodiment, the sheet of material 700 defines a plurality of slits 710 that define a first plurality of beams 720a in a first column 702a and a second plurality of beams 720b in a second column 702b. The first column 702a and the second column 702b alternate across the width of the sheet in the transverse direction y. In other words, the first plurality of beams 720a and the second plurality of beams 720b form a repeating pattern of beams across the transverse width of the sheet of material 700. In some embodiments, the plurality of slits 710 can similarly define a third plurality of beams defining a third column that alternates with the first column 702a and the second column 702b across the width of the sheet. In some embodiments, the plurality of slits 710 can similarly define a fourth plurality of beams defining a fourth column that alternates with the first column 702a, the second column 702b, and the third column across the width of the sheet.

Material 700 includes first slits 710a, second slits 710b, third slits 710c, and fourth slits 710d, each forming a corresponding first row 712a, second row 712b, third row 712c and fourth row 712d, respectively. Each row of slits extends across the width of the sheet of material 700 in the transverse direction y. The first row 712a, second row 712b, third row 712c and fourth row 712d form a repeating pattern of rows along the axial length of the sheet of material 700. In the current example, the second slits 710b are nested with the third slits 710c and the first slits 710a are nested with the fourth slits 710d. As such, a first terminal end segment (corresponding to the first axial portion 721) defining the first terminal end 714 of each slit in the second plurality of slits 710b intersects an imaginary line i1 connecting the terminal ends 714, 716 of a slit in the third plurality of slits 710c. More particularly, a first terminal end 714 of each slit in the second plurality of slits 710b is aligned with the imaginary line i1 connecting the terminal ends 714, 716 of a slit in the third plurality of slits 710c. Similarly, a first terminal end segment (corresponding to the first axial portion 721) defining the first terminal end 714 of each slit in the first plurality of slits 710a intersects an imaginary line i2 connecting the terminal ends 714, 716 of a slit in the fourth plurality of slits 710d. In particular, a first terminal end 714 of each slit in the first plurality of slits 710a is aligned with the imaginary line i2 connecting the terminal ends 714, 716 of a slit in the fourth plurality of slits 710d.

First slits 710a and second slits 710b form transverse sides or edges of a portion of a first transverse beam 730a. The first transverse beam 730a extends across the transverse width of the material 700. The length of the first transverse beam 730a across the width of the material is uninterrupted by intervening slits. The second slits 710b and the third slits 710c form a folding wall region 736. The third slits 710c and the fourth slits 710d form transverse sides or edges of a portion of a second transverse beam 730b. The transverse beam 730a is directly adjacent to folding wall region 736. The folding wall region 736 is directly adjacent to the second transverse beam 730b. The folding wall region generally includes all the area enclosed by the second slits 710b and the third slits 710b, which excludes the axial beams 720 between adjacent slits 710b,710c. The transverse beams 730a and 730b are directly adjacent folding wall region 736. In particular, the folding wall region 736 is between the first transverse beam 730a and the second transverse beam 730b. Slits 710a and 710b are substantially aligned with one another. Slits 710c and 710d substantially aligned with one another. Slits 710b and 710c are not aligned with one another. Instead, slits 710b and 710c are phase separated or spaced from one another. In the embodiment of FIG. 7A, slits 710 are substantially perpendicular to the tension axis T.

When the slits 710 are inverted relative to one another in directly adjacent rows, this creates the opportunity for them to align with or move past one another such that one or more of the terminal ends 714, 716 of a slit 710 align along a transverse axis T with the terminal ends 714, 716 of a slit 710 in a directly adjacent row. These unique patterns create unique beam widths, sizes, and shapes. Because the terminal ends 714, 716 of slits 710 in directly adjacent rows 712a and 712b align transversely to approximate an imaginary, essentially straight, single line perpendicular to the tension axis T, the size and shape of beams varies from the embodiments previously described herein. The continuous transverse region between the generally transverse portions 725 (which are substantially perpendicular to the tension axis T) forms a transverse beam 730. This beam only occurs once between every two sets of transversely aligned, directly adjacent rows 712a and 712b. Transversely aligned, directly adjacent rows 712a and 712b are arranged such that there is no continuous transverse region between the terminal ends 714, 716 of slits 710 in the directly adjacent, transversely aligned row. The area of material 700 into which the slits 710 with transversely aligned terminal ends 714, 716 extend, subtracting the axial beam 720 between adjacent slits 710, comprises a folding wall region 736. The folding wall region 736 can be further described as having two generally rectangular regions 731 and 733, where rectangular region 731 is bound by (1) directly adjacent generally transverse portions 725 of slits 710 which are perpendicular to the tension axis and (2) adjacent axial portions 721 and 723 on directly adjacent, opposing slits 710. The axial beam 720 is present between adjacent slits 710 in a single row 712. Directly adjacent the axial beam 720 is a region 733 which is the remaining material in the folding wall region 736 bounded in the axial direction x by the beam 720 and the generally transverse portion 725 and bounded in the transverse direction y by the two generally rectangular regions 731, more specifically by the axial extensions of the adjacent axial portions 721 and 723.

In this exemplary embodiment, the slits have two terminal ends. A straight, imaginary line extends between and connects these terminal ends. In this embodiment, the straight, imaginary line extending between and connecting the terminal ends of a first slit is substantially colinear with the straight, imaginary line extending between and connecting the terminal ends of a directly adjacent slit. In this exemplary embodiment, all of the straight, imaginary lines extending between and connecting the slit terminal ends in a single row are approximately colinear.

Figure 7B:
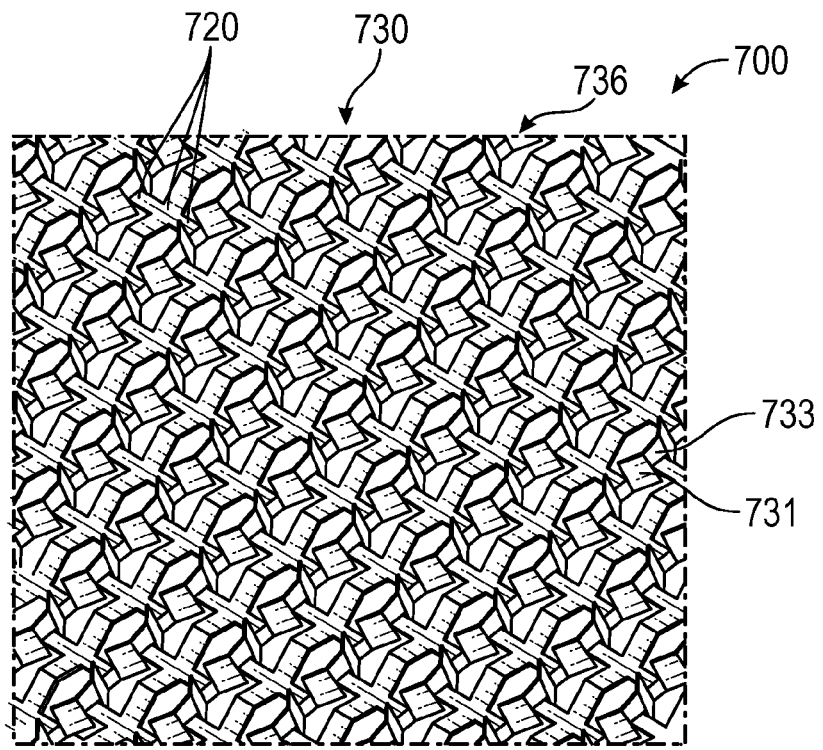
FIG. 7B is a perspective view of the pattern shown in FIG. 7A formed in a paper sheet and exposed to tension along the tension axis.
Figure 7C:
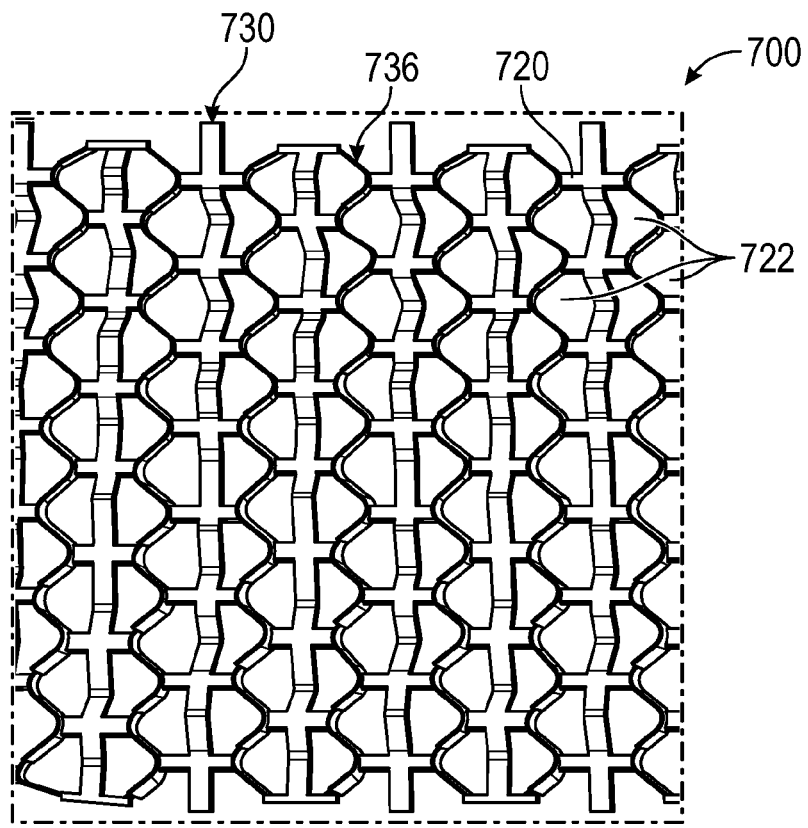
FIG. 7C is a nearly top view of the double slit pattern of FIG. 7A formed in a paper sheet and exposed to tension along the tension axis.
Figure 7D:
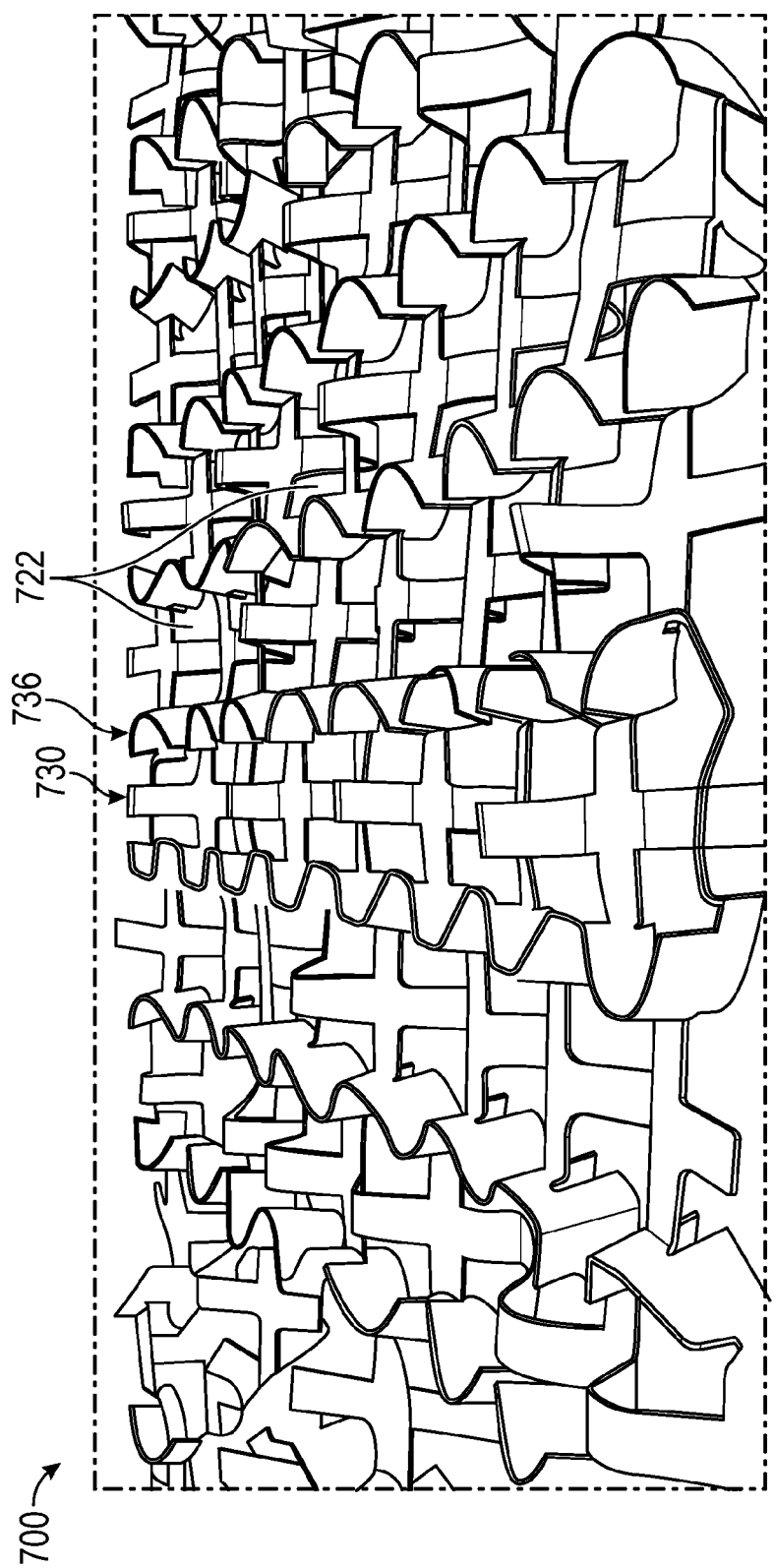
FIG. 7D is a nearly side of view of the double slit pattern of FIG. 7A formed in a paper sheet and exposed to tension along the tension axis.

FIGS. 7B-7D show a material including the slit pattern of FIG. 7A when exposed to tension along tension axis T. When material 700 is tension activated or deployed along tension axis T, portions of material 700 experiences tension and/or compression that causes the material to move out of the original plane of material 700 in its non-tensioned format. When exposed to tension along the tension axis, the transverse beams 730 bend into a shape that undulates to bring the axial beam 720 between adjacent slits closer to the adjacent beam 720 in the same row, while keeping the terminal ends 714 and 716 approximately in a single plane that is parallel to the original plane of material 700 in its pretensioned state. The undulating transverse beam 730 is parallel to the tension axis, specifically any line drawn parallel to the tension axis on the transverse beam 730 in the pretensioned state will still be substantially parallel to the tension axis in the tensioned state. In other words, each undulating slit surface is substantially a single curved line that was extended along the tension axis. The folding wall region 736 rotates and folds into an accordion-like shape such that all of the two generally rectangular regions 731 and region 733 are nominally flat, have folds between all adjacent generally rectangular regions 731 and regions 733, and all flat surfaces are nominally orthogonal to the original plane of material 700 in its pretensioned state. The axial beam 720 between adjacent slits 710 in a row 712 primarily experiences tension aligned with tension axis T, this tension is balanced by the adjacent beam 720 that adjoins the same transverse beam 730 so this region or area tends to stay flat and parallel to the original plane of material 700 in its pretensioned state. These movements in material 700 form two distinct folded beams, 1) undulating beams 730 that are parallel to the tension axis, and 2) folded beams 736 that are orthogonal to the original plane of material 700 in its pretensioned state, as seen in FIG. 7D.

Embodiments like the specific implementation of FIGS. 7A-7D have unique benefits. For example, FIGS. 7A-7D exemplify one set of embodiments in which portions of the material rotate to the normal axis (substantially 90° or orthogonal to the original plane of material 700 in its pretensioned state) when deployed or tension-activated. Additionally, some of these embodiments can withstand exposure to greater loads applied in the normal axis relative to other multi-slit patterned structures without being crushed. This means that they can provide increased or enhanced protection for things like packages being shipped and other applications. Another advantage to multi-slit patterns like the specific implementation shown in FIGS. 7A-7D is that once the construction is in its deployed (via application of tension) position, the construction substantially remains in its extended/tensioned position even once the tension is no longer applied. This feature can provide a more stable construction. Some of these benefits are a result of the increased strength of the folded wall geometry. The folded wall, or accordion shaped wall, or rotating/folding beam has a large area moment of inertia (also called moment of area or second moment of inertia) in the deployed article (deployed via the application of tension or force) where the area moment of inertia is in the plane of the original sheet. The area moment of inertia is increased relative to a straight vertical wall without folds.

Those of skill in the art will appreciate that many changes may be made to the pattern and material while still falling within the scope of the present disclosure. For example, the terminal ends of one row of slits instead of being colinear with the terminal ends of an adjacent row of slits could move past the terminal ends of the adjacent row of slits creating a nested or overlapping pattern of slits. In some embodiments, multi-slit pattern will be a triple slit, quadruple slit, or other multi-slit instead of a double slit pattern. Alternatively, the slit length, slit size, slit thickness, slit shape, row size or shape, transverse beam size or shape, and/or overlap beam size or shape can vary. The degree of curvature and slit length can vary. Further, the degrees of offset or phase offset can vary from what is shown. The slit, row, or beam pitch can vary. Further, the pattern can alternate in 2 rows, 3 rows, 4 rows, etc. The angle between the tension axis and slits can vary. Many of these changes could change the deployment pattern.

When the tension-activated material 700 is wrapped around an article or placed directly adjacent to itself, undulating beams 730 and/or folding wall regions 736 interlock with one another and/or opening portions 722, to create an interlocking structure. Interlocking can be measured as stated in the interlocking test articulated above.

Additional multi-slit patterns are shown in, for example, U.S. Patent Application Nos. 62/952,815 and 62/058,084, assigned to the present assignee, the entirety of which is incorporated herein.

Compound Slit Patterns

Figure 8A:
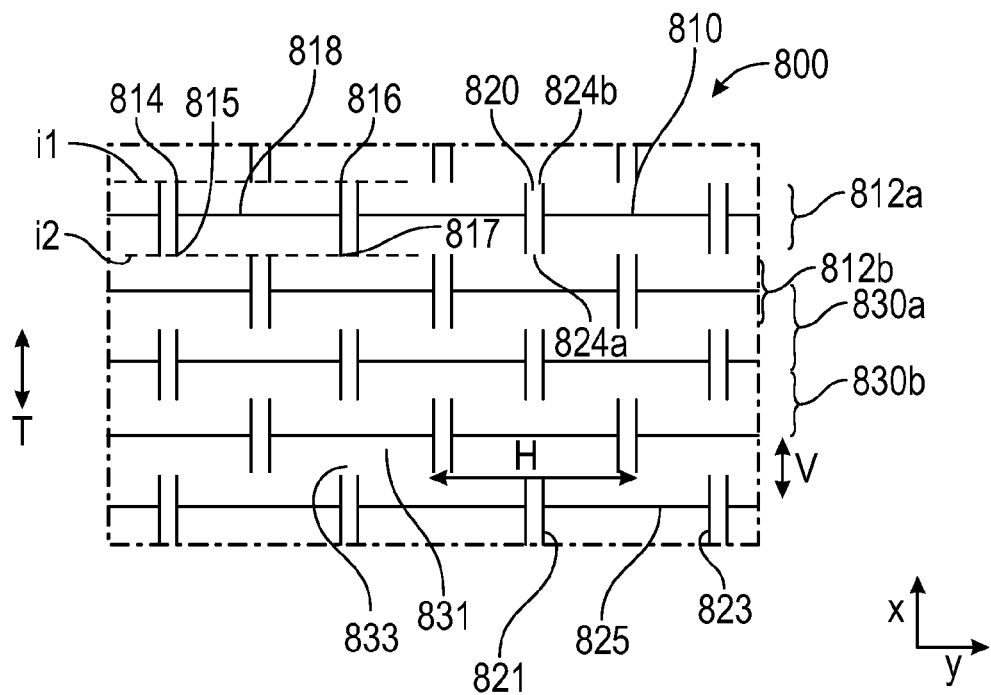
FIG. 8A is a top view schematic drawing of an exemplary compound slit pattern.

FIG. 8A is a top view schematic drawing of an exemplary compound slit pattern 800. A "compound slit" is defined herein as a slit that has more than two terminal ends, which is contrasted with a "simple slit," which is defined herein as a slit with exactly two terminal ends. Compound slit patterns can be consistent with single-slit patterns or multi-slit patterns. In this example, the pattern 800 includes a plurality of slits 810 in rows of slits 812. Each slit 810 includes a first axial portion 821, a second axial portion 823 that is spaced from and generally parallel to first axial portion 821, and a generally transverse portion 825 that connects first and second axial portions 821, 823. Each slit 810 includes four terminal ends: a first terminal end 814, a second terminal end 815, a third terminal end 816, and a fourth terminal end 817. Each slit 810 has a midpoint 818.

The first terminal end 814 and the second terminal end 815 are opposite terminal ends of a first axial portion 821 of the slit 810. The third terminal end 816 and the fourth terminal end 817 are opposite terminal ends of second axial portion 823 of the slit 810. The first terminal end 814 is aligned with the second terminal end 815 along an axis in the axial direction x (which is parallel to the first axial portion 821 in the current example) and the third terminal end 816 is aligned with the fourth terminal 817 end along an axis in the axial direction (which is parallel to the second axial portion 823 in the current example). The first terminal end 814 is aligned with the third terminal end 816 along an axis i1 in the transverse direction y and the second terminal end 815 is aligned with the fourth terminal 817 end along an axis i2 in the traverse direction. The space between directly adjacent slits 810 in a row 812a, 812b can be referred to an axial beam 820. When exposed to tension, the axial beam 820 between adjacent slits 810 in a row 812a, 812b becomes a non-rotating beam 820 (visible in FIGS. 8C-8E and 8G).

The space bounded by the generally transverse portions 825 subtracting the non-rotating beams 820 defines a folding wall regions 830a, 830b.

The folding wall regions 830a, 830b can be further described as having two generally rectangular regions 831 and 833, where rectangular region 831 is bound by (1) directly adjacent generally transverse portions 825 of slits 810 which are perpendicular to the tension axis and (2) adjacent axial portions 821 and 823 on directly adjacent, opposing slits 810. Axial beams 820 are between adjacent slits 810 in a single row 812a, 812b, more specifically, between the adjacent axial portions 821 and 823. Directly adjacent the beam 820 is a region 833 which is the remaining material in the folding wall region 830a, 830b bounded in the axial direction by the beam 820 and the generally transverse portion 825 and bounded in the transverse direction by the two generally rectangular regions 831, more specifically by the axial extensions of the adjacent axial portions 821 and 823. Directly adjacent rows of slits 810 are phase offset from one another.

In the embodiment of FIG. 8A, the tension axis T is substantially parallel to the axial direction x and substantially perpendicular to the transverse direction y. The tension axis T is generally perpendicular to the direction of the rows 812a, 812b of slits 810. The tension axis T is an axis along which tension can be provided to deploy the material into which the pattern 800 has been formed, which creates the rotation and upward and downward movement of portions of the material.

In the current example, unlike previous examples, there are no transverse beams extending across the width of the sheet of material in the transverse direction y. Rather, in the current example, there are folding wall regions 830a, 830b defined across the transverse width of the material 800 that alternate along the axial length of the sheet of material 800. Similar to some previous examples, in the current example the pattern of slits in the sheet of material defines a first row 812a and a second row 812b that alternate along the axial length of the sheet of material 800. The plurality of slits 810 in the sheet of material define columns of beams and rows of beams similar to that which has already been discussed. However, in the current example, each of the axial beams 820 extend from a first folding wall region 830a to an adjacent second folding wall region 830b. Furthermore, each of the axial beams 820 define two termini 824a, 824b corresponding to the terminal ends of adjacent slits in a row.

Figure 8B:
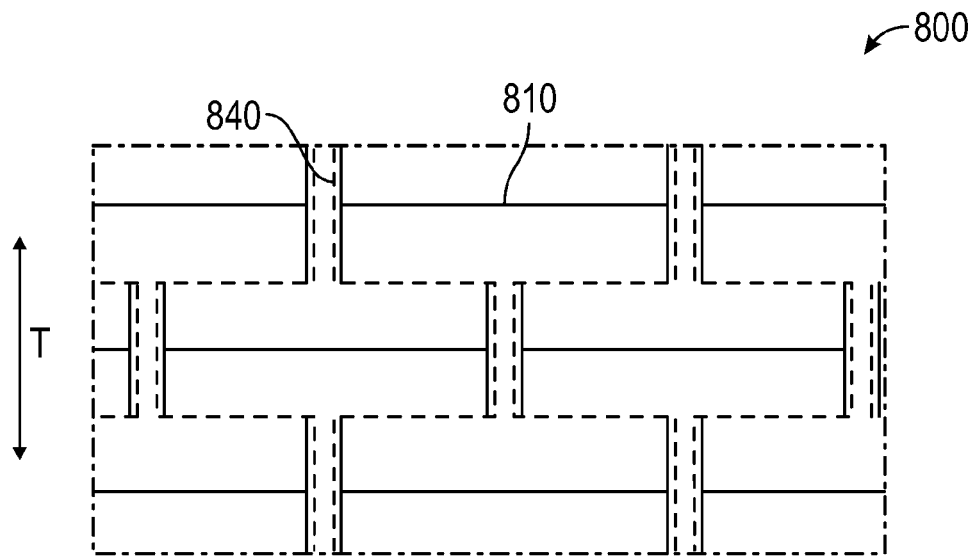
FIG. 8B shows the primary tension lines in the compound slit pattern of FIG. 8A when it is exposed to tension.

FIG. 8B shows the primary tension lines 840 (e.g., the lines approximating the highest tensile stress path) formed when an article including the slit pattern of FIG. 8A is deployed with tension along the tension axis T. FIG. 8B shows in dotted lines the primary tension lines 840, which are where the greatest tensile stress will occur. Tension lines are imaginary paths through the material that carry the greatest load when tension is applied to the material along the tension axis. When tension is applied along tension axis (T), the primary tension lines 840 move more closely into alignment with the applied tension axis, causing the sheet to distort. Tension lines 840 are focused in the axial beams 820 between adjacent slits in the same row. When exposed to tension, these beams 820 become non-rotating beams 820. In the embodiment of FIG. 8A, these beam 820 or non-rotating beams 820 are generally parallel to the tension axis. In the embodiment of FIG. 8A, these beams 820 or non-rotating beams 820 are generally axial. When tension is applied along the tension axis T (which in this embodiment is an axis nominally parallel to the non-rotating beams), then the tension (or the highest concentration of stress caused by that tension) exists on all the non-rotating beams 820 somewhat uniformly, but across sections of the folding wall region 830a, 830b as shown by the dotted lines.

Figure 8C:
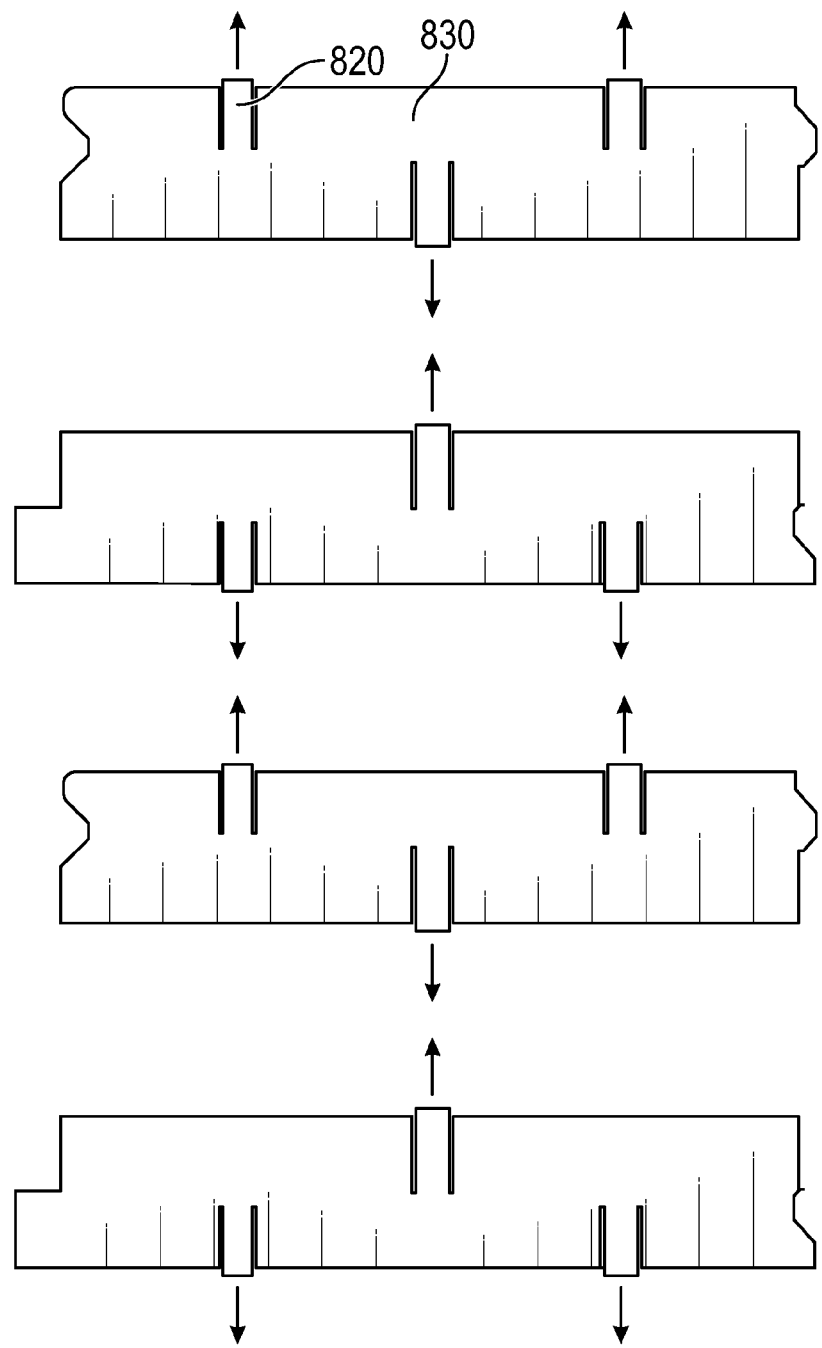
FIGS. 8C-8E are top view schematic drawings showing the movement of the material into which the slit pattern of FIG. 8A has been formed when the material is exposed to tension.
Figure 8D:
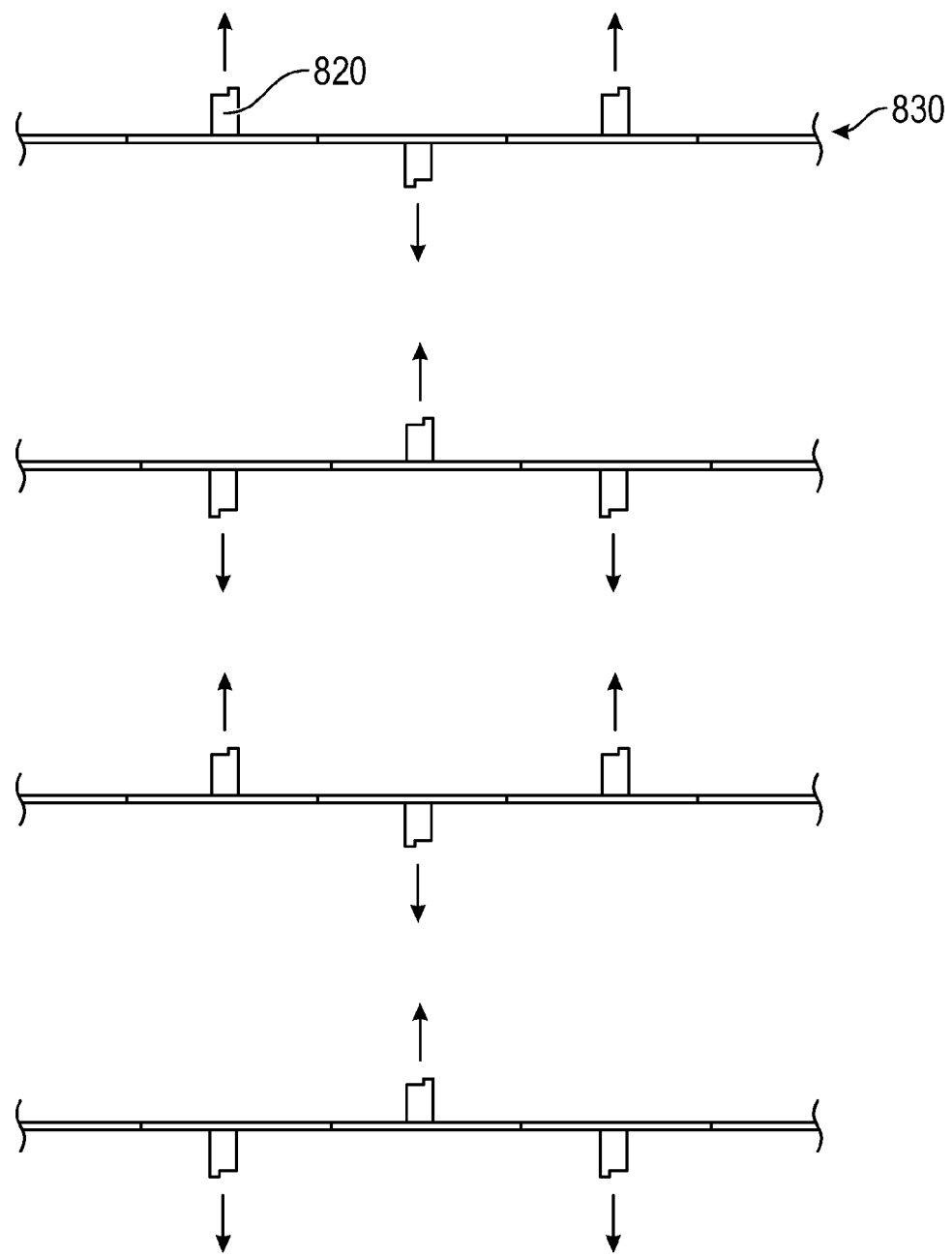
Figure 8E:
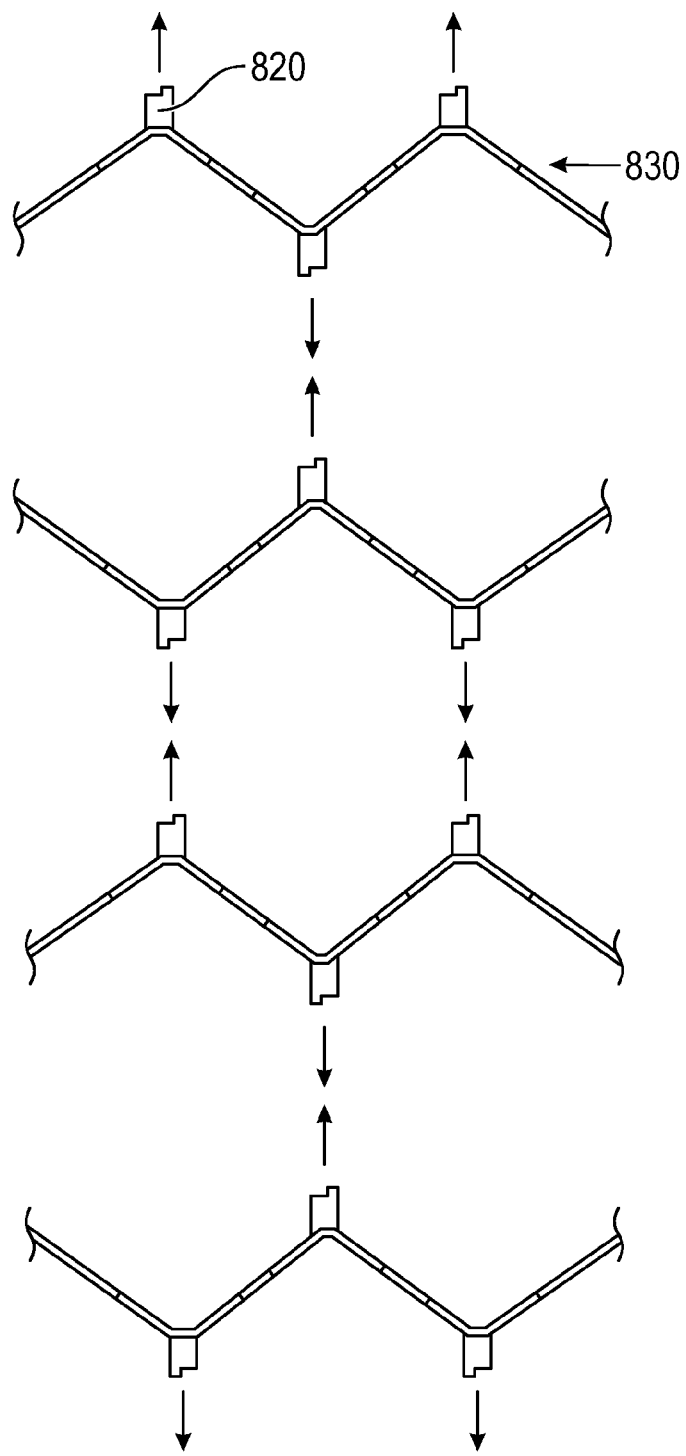
Figure 8F:
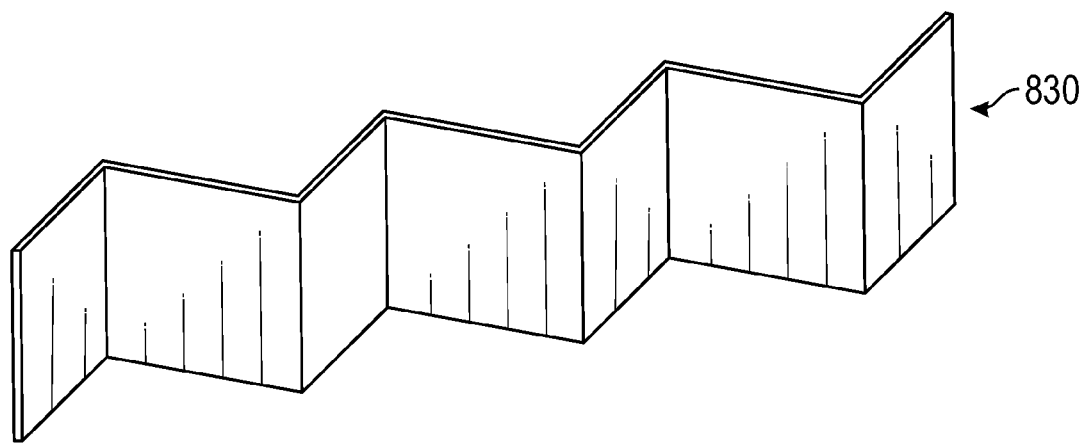
FIG. 8F is a perspective side view schematic drawing of a portion of the material into which the slit pattern of FIG. 8A has been formed when the material is exposed to tension.
Figure 8G:
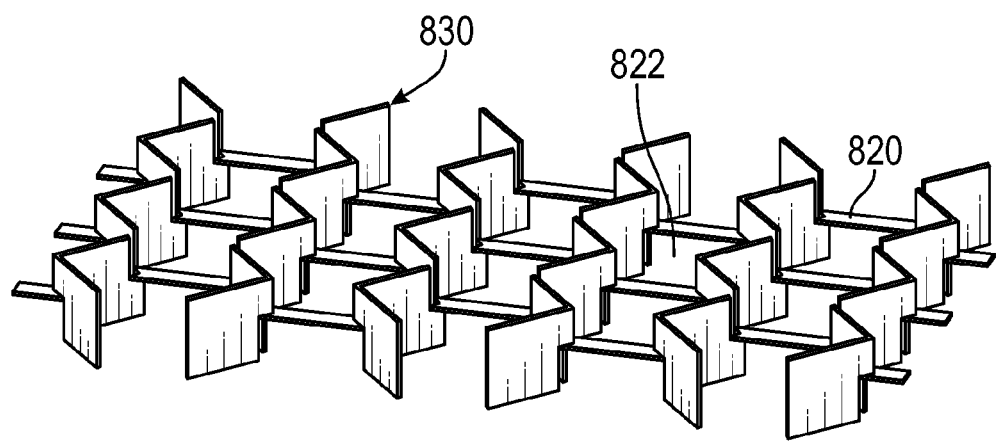
FIG. 8G is a perspective side view schematic drawing of the material into which the slit pattern of FIG. 8A has been formed when the material is exposed to tension.

FIGS. 8C-8G are top view schematic drawings showing how a material including the slit pattern of FIG. 8A moves in space when tension is applied along the tension axis T. When compound slit patterns are deployed, the activation of tension along the primary tension lines 840 causes substantially all regions of the pattern to experience some tension or compression (tensile stress or compressing stress) and some of the regions rotate and/or and bend out of the plane of the original two-dimensional film. The tension running through the folding wall region 830a, 830b causes the beams to rotate and fold at the same time to move the non-rotating beams 820 closer together to become more aligned with the tension axis T. In FIG. 8C-8E, the non-rotating beams 820 are represented as being broken and connected with force vectors (arrows). This helps visualize the interaction of forces in different regions to clarify the motion of the material. Because the material 800 experiencing the forces is relatively thin, folding wall region 830a, 830b will rotate out of plane and fold at the base of the non-rotating beams 820 in response to the application of tension forces. Specifically, FIG. 8C shows non-rotating beams 820 with force vectors acting on the folding wall region 830a, 830b. This action causes the material 800 to move into the position shown schematically in FIG. 8D, in which the folding wall region 830a, 830b have rotated as a consequence of the force vectors shown in FIG. 8D. As shown in FIG. 8E, the folding wall regions 830a, 830b also fold or bend in response to the force vectors shown in FIG. 8C-8E. The degree of fold or bend will vary depending on many factors including, for example, the stiffness or modulus of the material, the magnitude of the tension forces, the dimensions and scale of the elements, the width of non-rotating beams, the span between non-rotating beams, etc.

FIG. 8D is a top view schematic drawing of folding wall region 830a, 830b showing only the rotation from a top view perspective in FIG. 8C. FIG. 8E is a schematic drawing showing a top view of the rotating beams that are both rotated and bent when fully tensioned and deployed. From a top view, folding wall region 830a, 830b, once rotated, form accordion folded vertical walls that can resist significant compressive force in the Z-axis (orthogonal to the x-y plane). The energy it takes to buckle the folded walls is the energy that can be absorbed by the structure to prevent damage to an object that it is wrapped around. Non-rotating beams 820 connect the folding wall regions 830a, 830b. The compound slit pattern of FIG. 8A results in the non-rotating beams 820 being staggered, which further contributes to the strength of the material when deployed. The motion of the non-rotating beams 820 and folding wall regions 830a, 830b produces open regions 822, which is visible in FIGS. 8G-8J.

Returning to FIG. 8A, the generally rectangular region 833 has a width, or transverse dimension, that is equal to the width, or transverse dimension, of the non-rotating beam 820. In some embodiments, it is preferred to have this width be small relative to the width, or transverse dimension, of the rectangular region 831. When the transverse width of the rectangular region 833 is small relative to the transverse width of the rectangular region 831, then the rectangular region 833 will substantially crease when deployed and not be clearly independently distinguishable from the remainder of the folding wall regions 830 as approximated by the drawing of FIG. 8F, and as is visible in FIGS. 8G and 8H. In particular, in the facing view (top or bottom) of the material of FIG. 8I the shape of the openings 822 appear to be generally hexagonal, as compared to the model view in FIG. 8J where it is more clearly visible in the facing view that the shape of the openings 822 are octagonal. If the rectangular region 833 is wide enough, then another flat vertical section will exist at the folds of the rotating/folding beam shown in FIG. 8J. Visually, this would make the hexagons look like octagons.

Figure 8H:
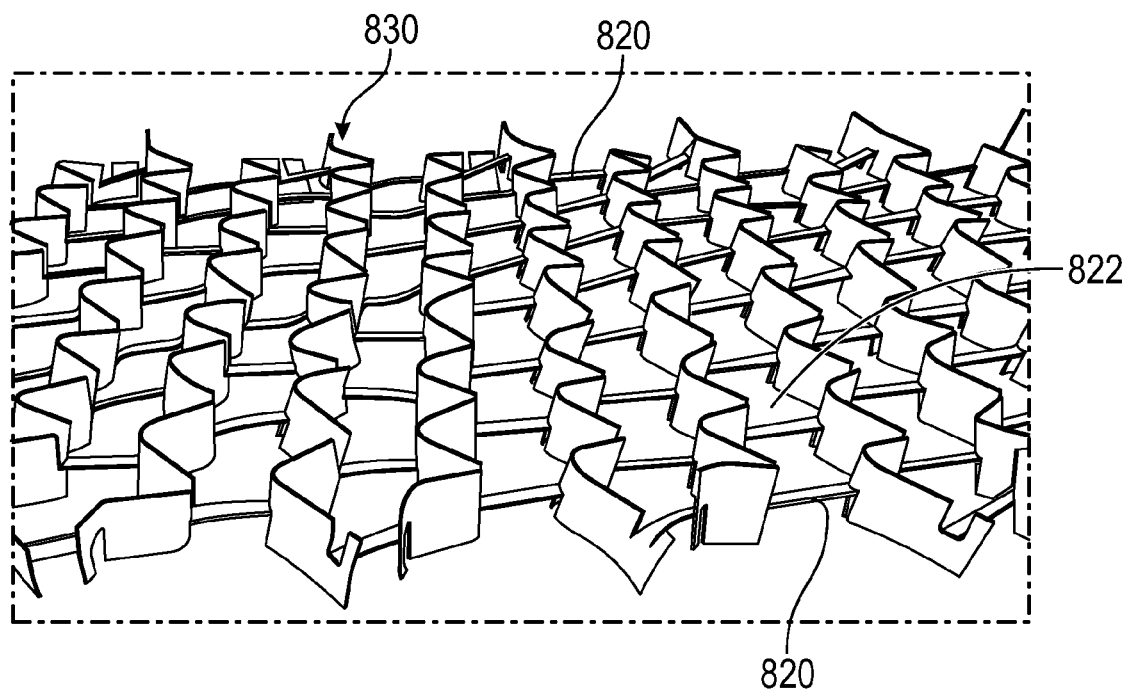
FIGS. 8H and 8I are the compound slit pattern of FIG. 8A formed in a paper sheet and exposed to tension along the tension axis.
Figure 8I:
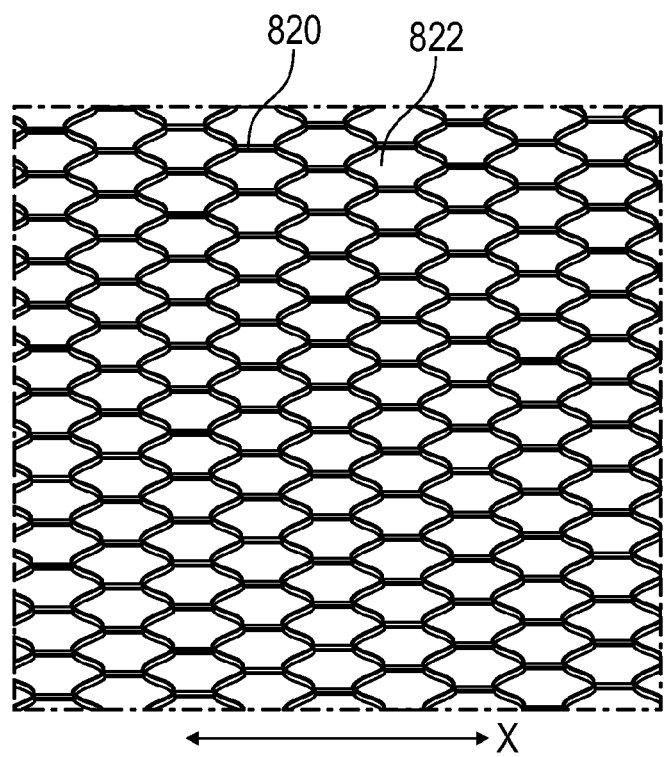
Figure 8J:
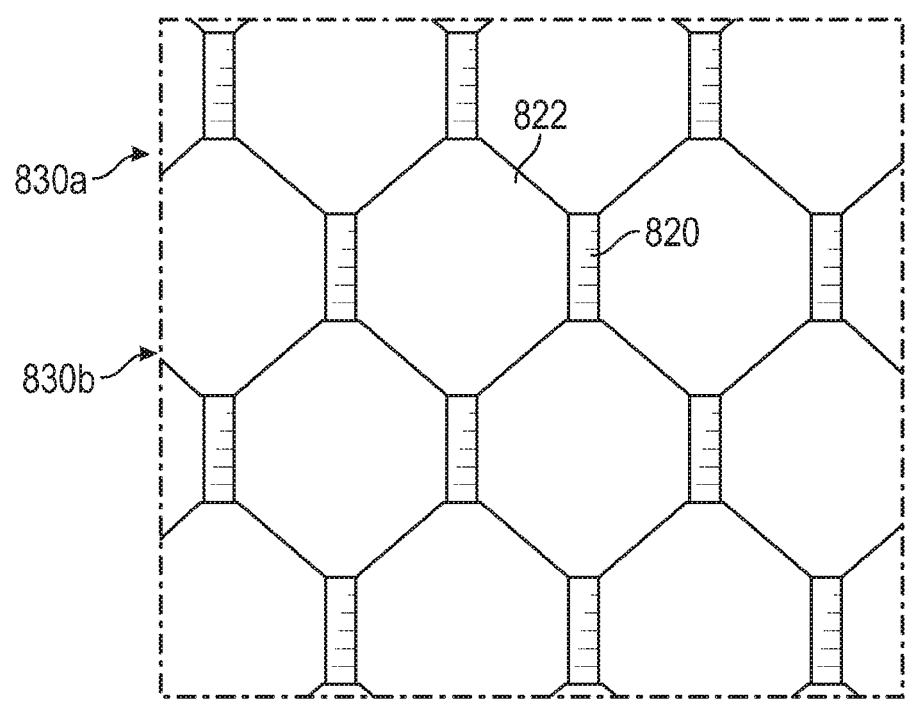
FIG. 8J is a facing view corresponding to FIG. 8I.

FIGS. 8H and 8I are line drawings from photographs of the compound slit pattern of FIG. 8A formed in a paper sheet and exposed to tension along the tension axis. FIG. 8H is a perspective side view, and FIG. 8I is a nearly top view, and FIG. 8J is a schematic drawing corresponding to FIG. 8I.

Figure 9A:
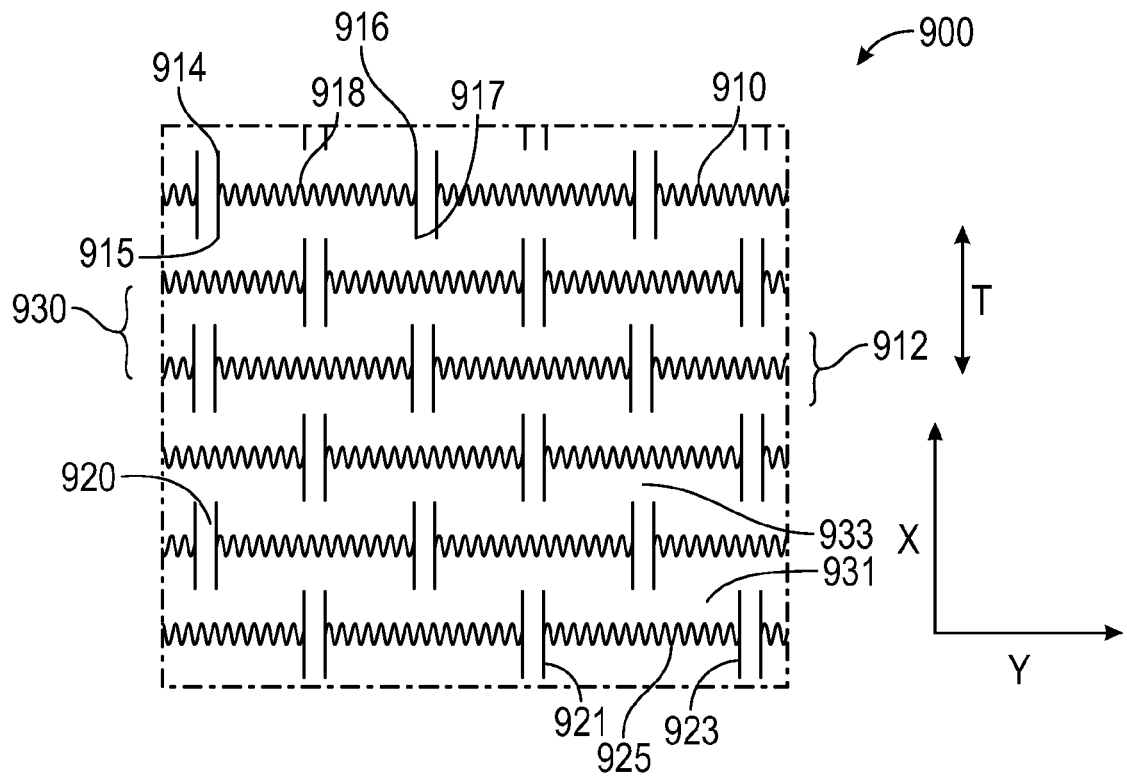
FIG. 9A is a top view schematic drawing of an exemplary compound slit pattern.
Figure 9B:
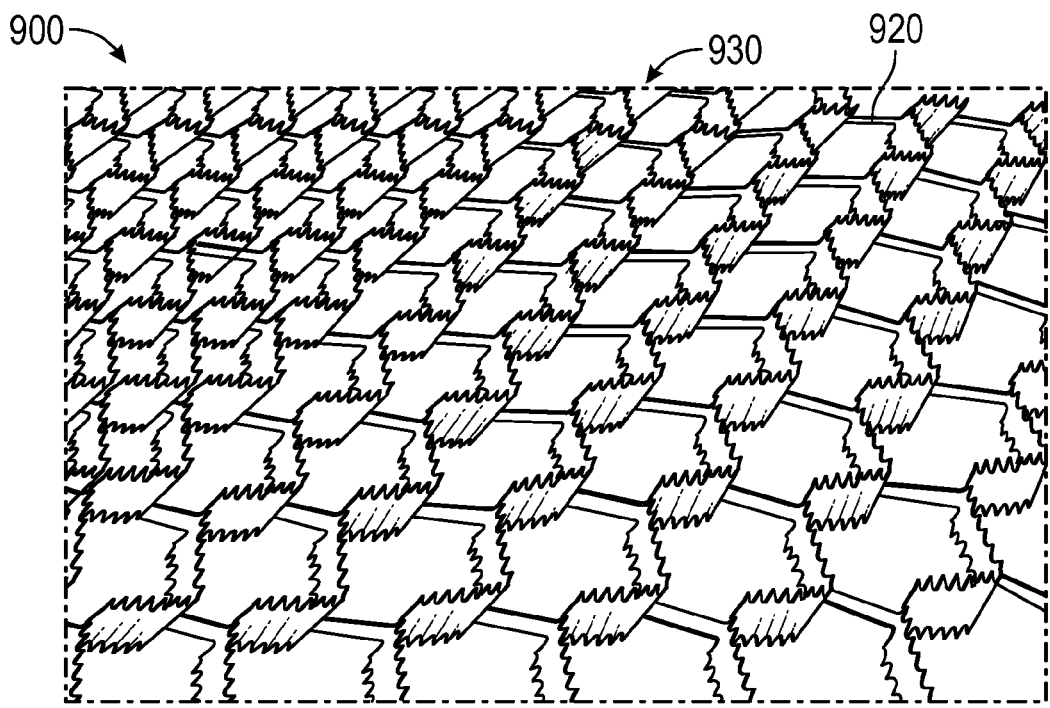
FIGS. 9B-9D are depict a material into which the compound slit pattern of FIG. 9A has been cut and which have been deployed by application of tension along the tension axis.
Figure 9C:
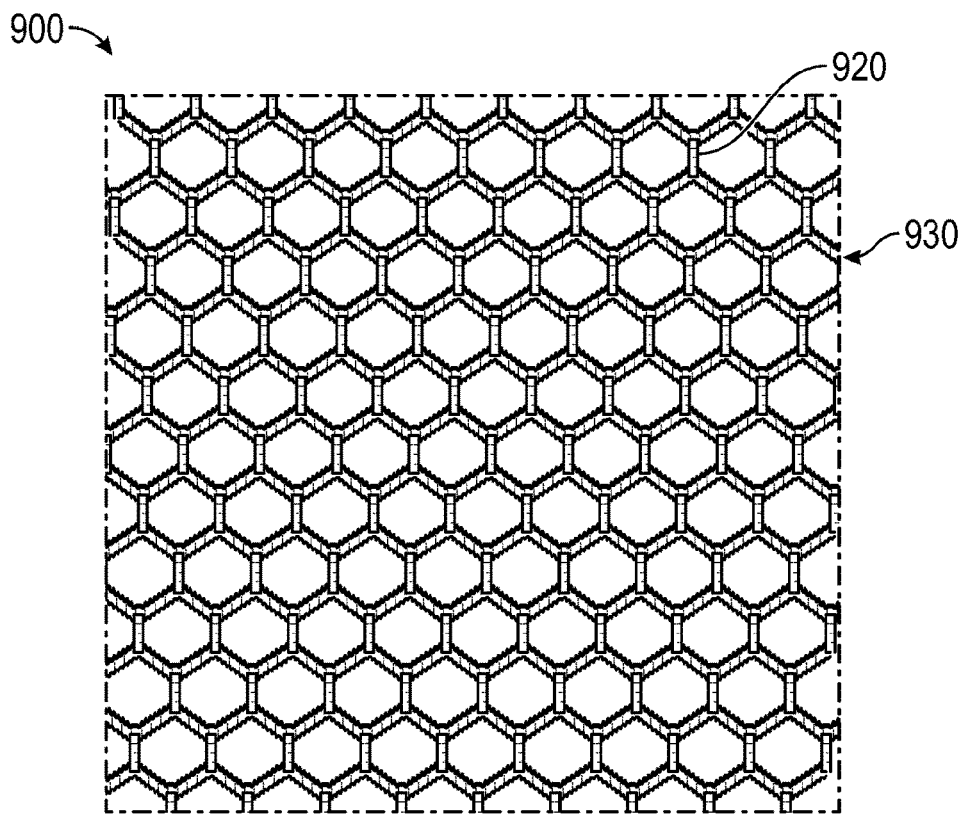
Figure 9D:
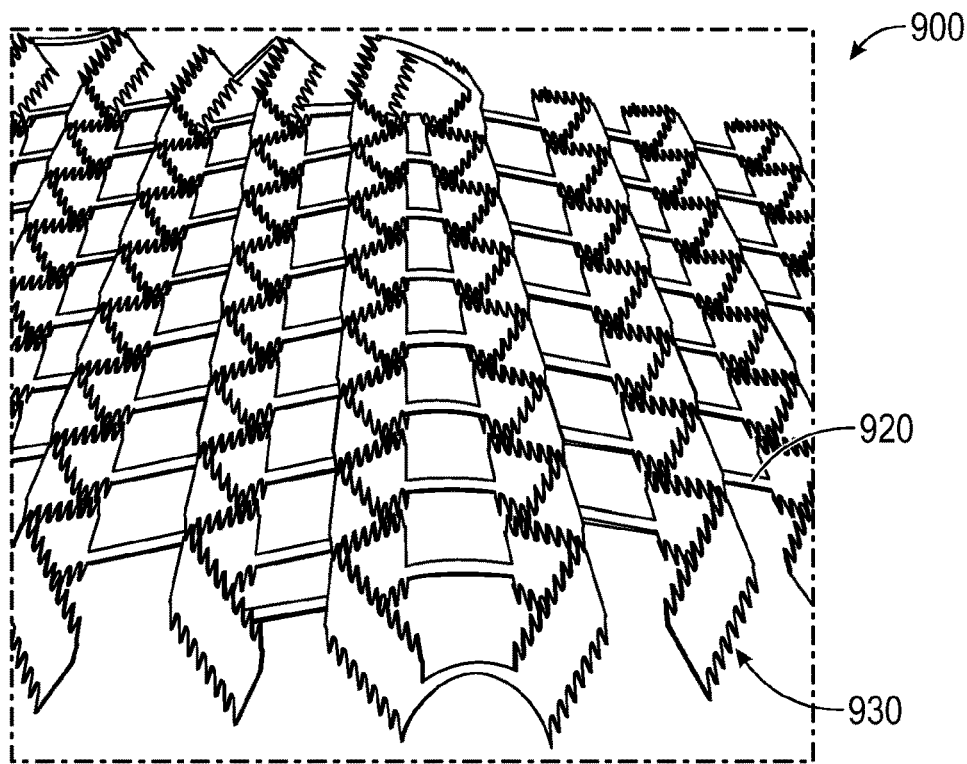

FIG. 9A is an exemplary compound slit pattern that is substantially the same as the compound slit pattern of FIG. 8A except that generally transverse portion 925 is a zig-zag pattern. The zig-zag pattern may advantageously improve the interlocking function of the material 900. These features can increase the interlocking of the material when it is placed adjacent to another layer of the material and/or when it is wrapped around an item. Further, these features may advantageously soften the edges of the material. In FIG. 9A, the generally transverse portion 925 has a wavy or v-wave shape. The "v" portions of the wave increase the interlocking features. The tension axis (T) is substantially parallel to the axial direction x and substantially perpendicular to the transverse direction y and to the direction of the rows of slits. The tension axis T is an axis along which tension can be provided to deploy the material into which the pattern 900 has been formed, which creates the rotation and upward and downward movement of portions of the material. The material deploys substantially as described above with respect to FIGS. 8A-8I, as shown in FIGS. 9B-9D. When multiple layers of the material are in contact, such as when wrapped around an object, then the interlocking features allow the layers to interlock with each other more strongly and/or in different ways.

Figure 20A:
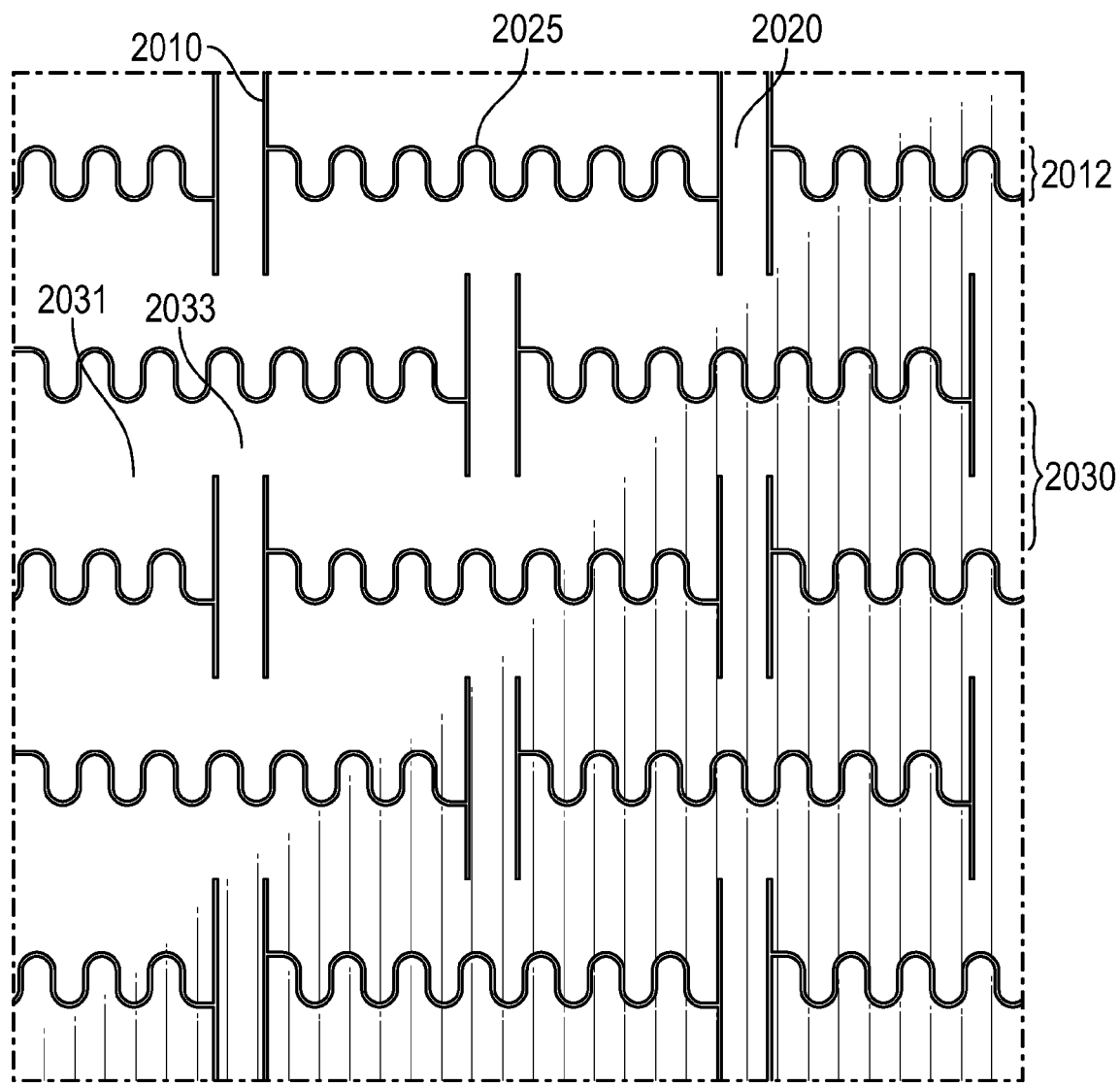
FIGS. 20A and 20B are top and three-quarter, respectively, view schematic drawings of an exemplary compound slit pattern.
Figure 20B:
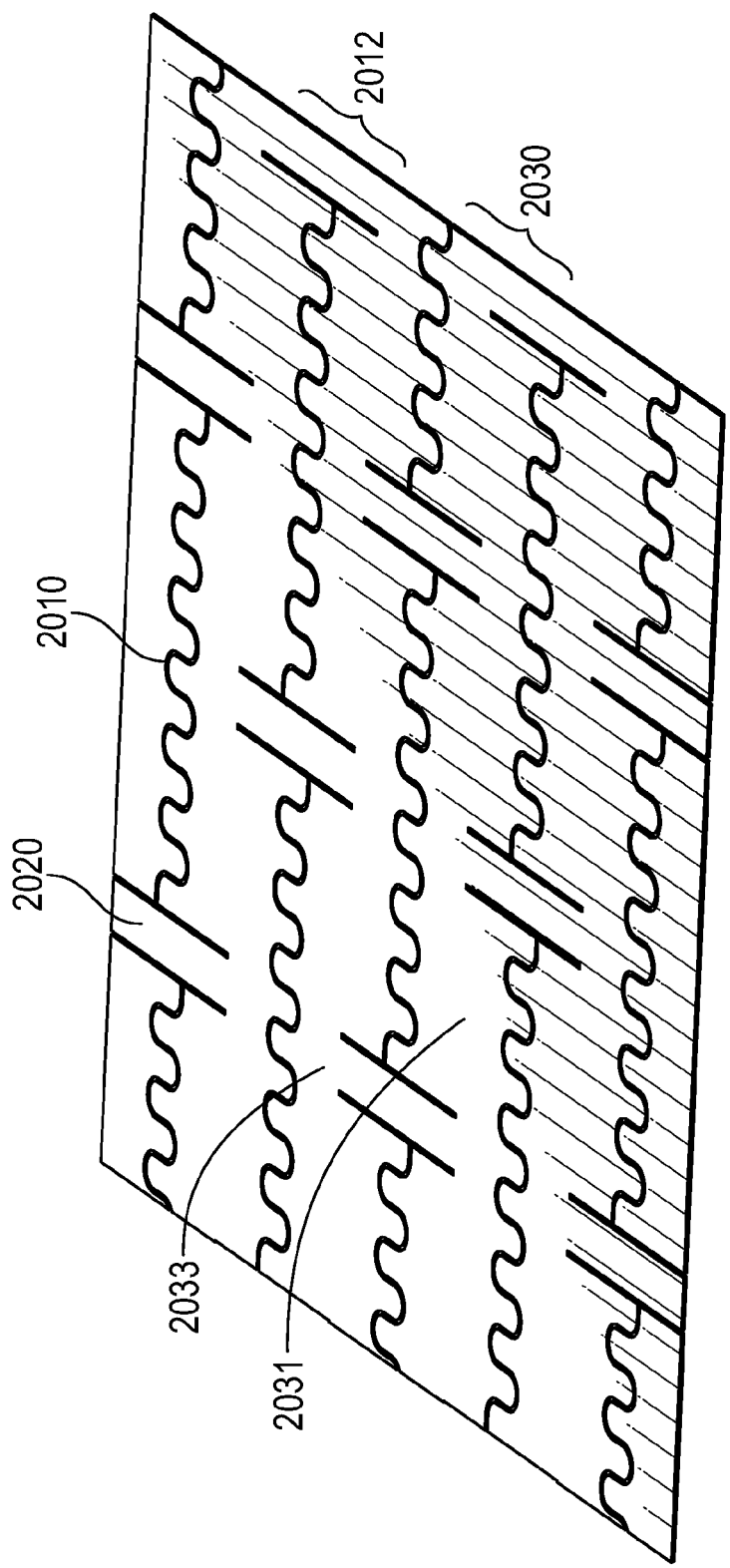
Figure 20C:
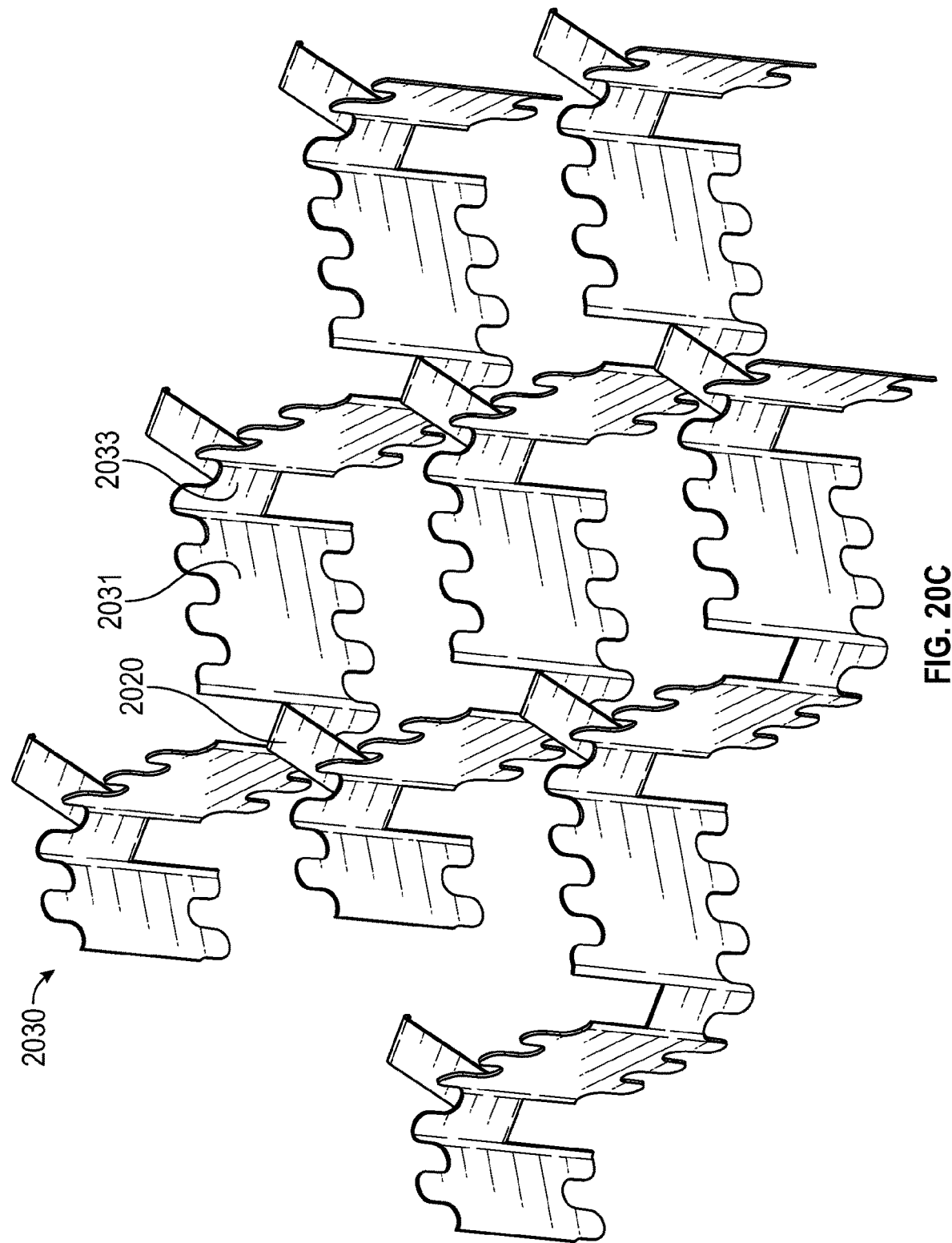
FIGS. 20C-20E are a three-quarter, front, side, and top-down views, respectively, a portion of a sheet into which the slit pattern of FIG. 8A has been formed when the material is exposed to tension.
Figure 20D:
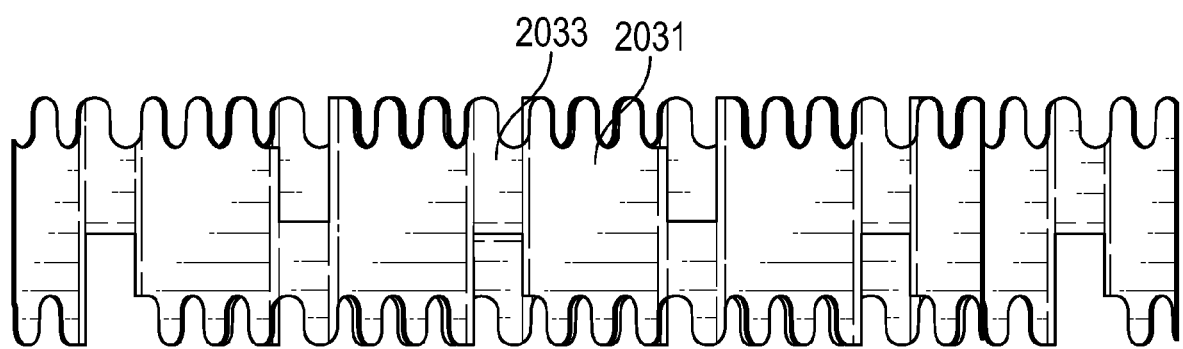
Figure 20E:
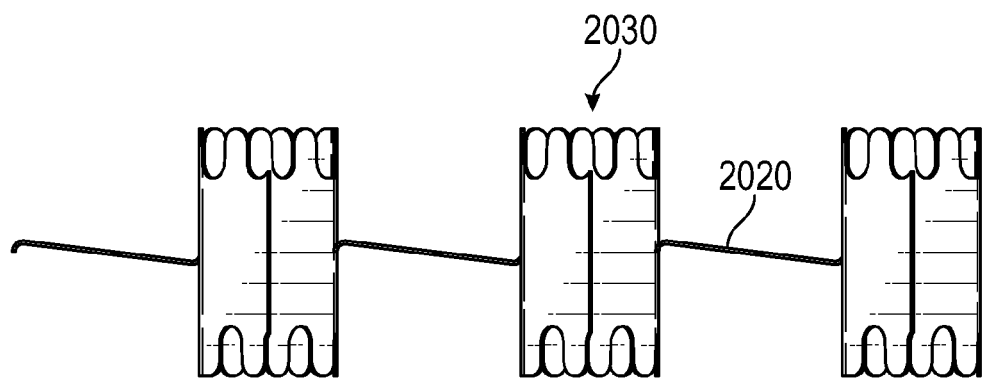

Yet another compound slit pattern in a sheet of material 2000 is depicted in FIGS. 20A-20B, which is similar to the pattern of FIG. 9A except that the interlocking structures or features have a somewhat different shape. The transverse portion 2025 of each of the slits defines a curved line. In particular, the transverse portions 2025 of the slits in a row 2012 generally define an undulating wave or a sine wave that is interrupted by axial beams 2020 between each of the slits 2010. FIGS. 20C-20E show a sheet of material with the compound slit pattern of FIGS. 20A-20B when the material is expanded after being placed under tension in the tension axis.

Figure 10A:
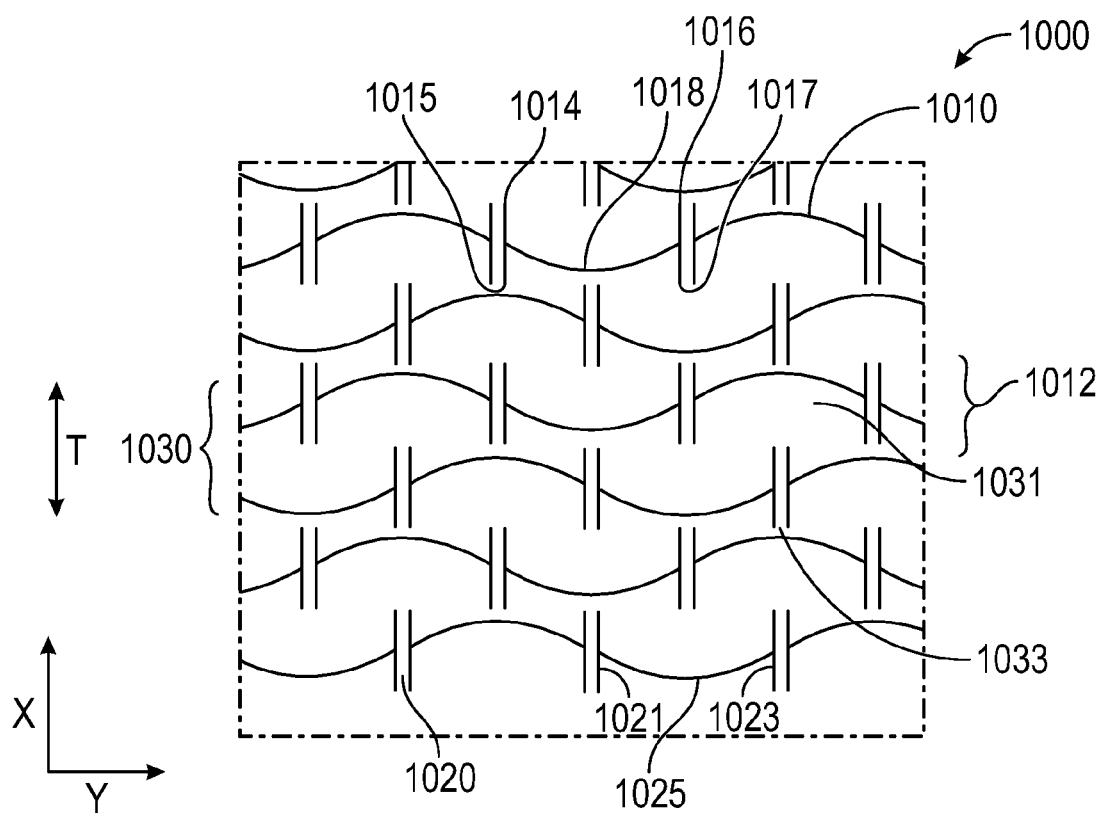
FIG. 10A is a top view schematic drawing of an exemplary compound slit pattern.
Figure 10B:
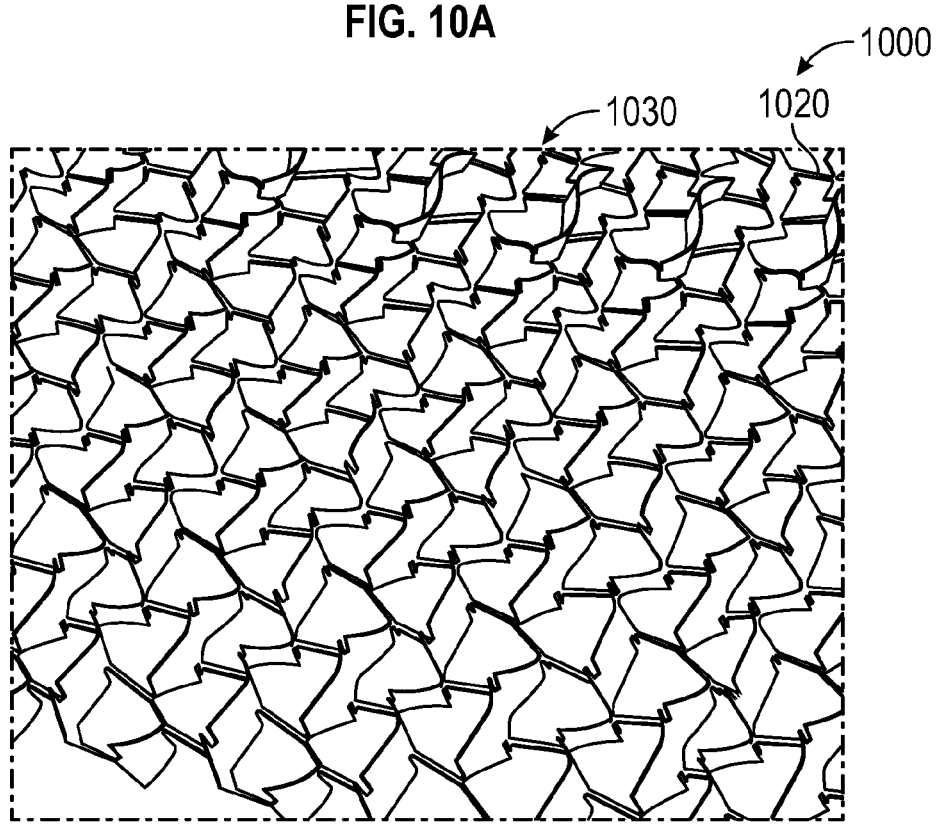
FIGS. 10B-10D show the pattern of FIG. 10A cut into a material and deployed along the tension axis shown from the perspective, a view approximately 45 degrees from the axial direction aligned with the tension axis, nearly top, and nearly side views, respectively.
Figure 10C:
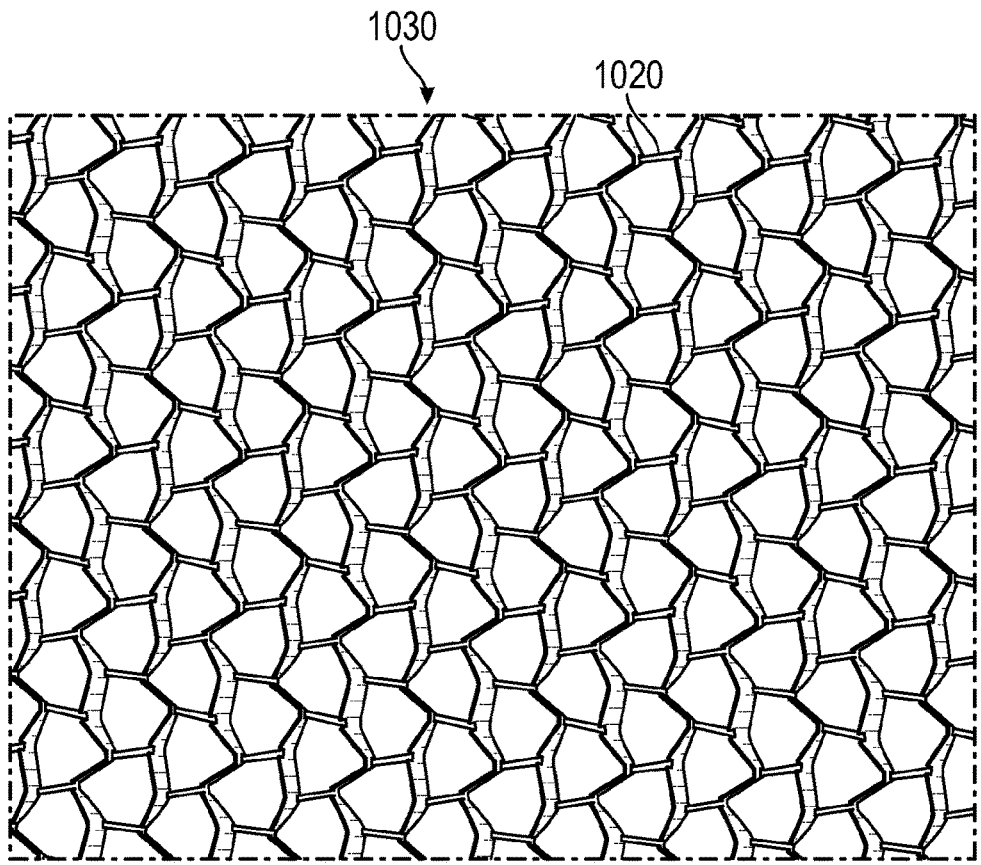
Figure 10D:
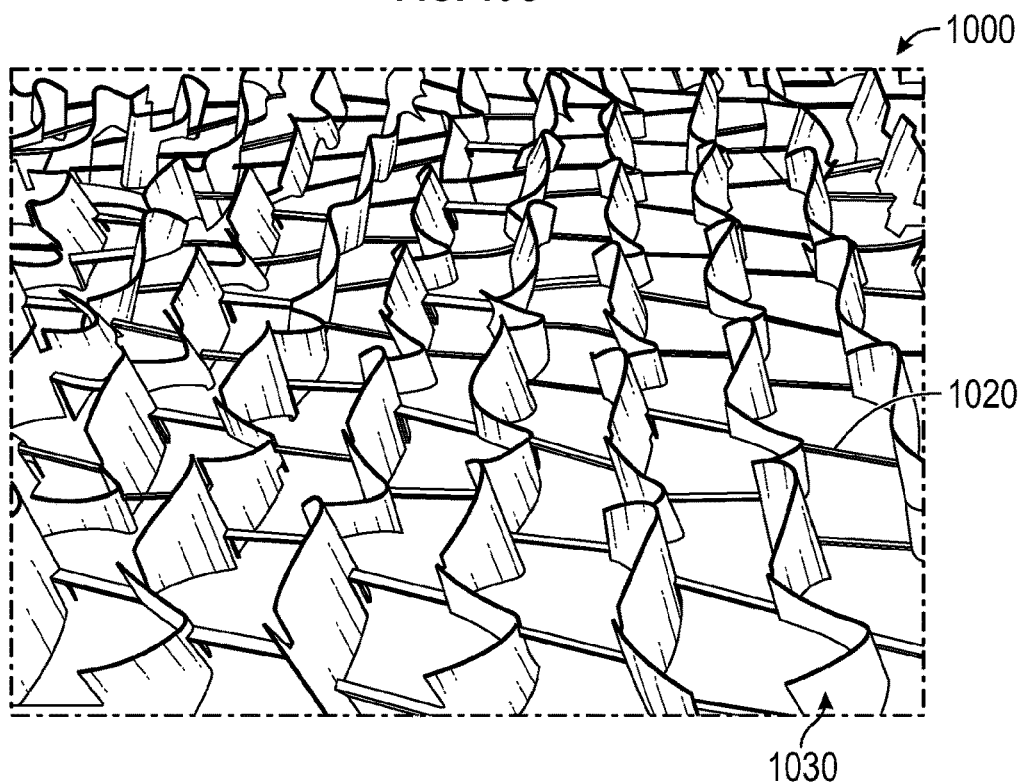

FIG. 10A is a top view schematic drawing of another exemplary compound slit pattern in a sheet of material 1000 that is substantially similar to the compound slit pattern of FIG. 8A except that the transverse slit portions 1025 cumulatively define an oscillation wave form. FIGS. 10B-10D show the compound slit pattern of FIG. 10A formed or cut into a material and then exposed to tension along tension axis T. The material deploys substantially as described above with respect to FIGS. 8A-8I.

A plurality of slits 1010 define rows of slits 1012 that are alternated along the axial length of the material 1000. Each slit 1010 has a first axial portion 1021, a second axial portion 1023 that is spaced from the first axial portion 1021 in the transverse direction y. A generally transverse portion 1025 that connects first and second axial portions 1021, 1023. Each slit 1010 includes four terminal ends: a first terminal end 1014, a second terminal end 1015, a third terminal end 1016, and a fourth terminal end 1017. Each slit 1010 has a midpoint 1018.

The first terminal end 1014 and the second terminal end 1015 are opposite terminal ends of a first axial portion 1021 of the slit 1010. The third terminal end 1016 and the fourth terminal end 1017 are opposite terminal ends of second axial portion 1023 of the slit 1010. The first terminal end 1014 is aligned with the second terminal end 1015 along an axis extending in the axial direction (which is colinear with axial portion 1021) and the third terminal end 1016 is aligned with the fourth terminal 1017 end along an axis in the axial direction (which is colinear with axial portion 1023). The first terminal end 1014 is aligned with the third terminal end 1016 along an axis in the transverse direction y, similar to examples previously depicted. The second terminal end 1015 is aligned with the fourth terminal 1017 end along an axis in the traverse direction, also similar to that which has been previously depicted. The space between directly adjacent slits 1010 in a row 1012 can be referred to an axial beam 1020 between adjacent slits 1010 in a row 1012. When exposed to tension, the beam 1020 between adjacent slits 1010 in a row 1012 is a non-rotating beam 1020 (visible in FIGS. 10B and 10D). The space bounded by the generally transverse portions 1025 subtracting the non-rotating beams 1020 defines a folding wall regions 1030a, 1030b.

Unlike previous embodiments, the folding wall regions 1030 are not a combination of generally rectangular regions. Rather, the folding wall regions are a combination of two regions, a first region 1031 being generally bound by (1) directly adjacent generally curved transverse portions 1025 of slits 1010 and (2) adjacent axial portions 1021 and 1023 on directly adjacent, opposing slits 1010. Axial beams 1020 are between adjacent slits 1010 in a single row 1012, more specifically, between the adjacent axial portions 1021 and 1023. Directly adjacent the beam 1020 is a second region 1033 which is the remaining region in the folding wall region 1030 bounded in the axial direction by a terminus of the beam 1020 and the generally transverse portion 1025. The second region 1033 is bounded in the transverse direction by the ends of the adjacent axial portions 1021 and 1023. Directly adjacent rows 1012 of slits 1010 are offset from one another in the transverse direction y.

In the embodiment of FIG. 10A, the tension axis T is substantially parallel to the axial direction x and substantially perpendicular to the transverse direction y. The tension axis is generally perpendicular to the direction of the rows 1012 of slits 1010. The tension axis is an axis along which tension can be provided to deploy the material into which the pattern 1000 has been formed, which creates the rotation and upward and downward movement of portions of the material.

In this example there are no transverse beams extending across the width of the sheet of material in the transverse direction y. Rather, in the current example, there are folding wall regions defined across the transverse width of the material 1000 that alternate along the axial length of the sheet of material 1000, similar to some previous embodiments.

Additional compound slit patterns are shown in, for example, U.S. Patent Application No. 62/952,815, assigned to the present assignee, the entirety of which is incorporated herein.

Any of the embodiments shown or described herein can be combined with other embodiments shown or described herein, including that any specific features, shapes, structures, or concepts shown or described herein can be combined with any of the other specific features, shapes, structures, or concepts shown or described herein. Those of skill in the art will appreciate that many changes may be made to the compound slit patterns, formation of the patterns into materials, and deployment of those materials while still falling within the scope of the present disclosure. For example, in embodiments showing a double slit pattern, the pattern could be a triple slit, quadruple slit, or other multi-slit pattern instead of a double slit pattern. Alternatively, the slit length, slit size, slit thickness, slit shape, row size or shape, transverse beam size or shape, and/or overlap beam size or shape can vary. Further, the degrees of offset or phase offset can vary from what is shown. The slit, row, or beam pitch can vary. The angle between the tension axis and slits can vary. The alignment of the pattern relative to the tension axis and/or sides of the material may vary. Some of these changes could change the deployment pattern.

Most of the slit patterns shown herein have regions that are described as moving or buckling either upward or downward relative to the original plane of the sheet when tension is applied. The distinction between upward and downward motion is an arbitrary description used for clarity to substantially match the accompanying figures. The samples could all be flipped over turning the downward motions into upward motions and vice versa. In addition, it is normal and expected for occasional inversions to occur where the regions of the sample will flip such that similar features which had moved upward in previous regions are now moving downward and vice versa. These inversions can occur for regions as small as a single slit, or large portions of the material. These inversions are random and natural, they are a result of natural variations in materials, manufacturing, and applied forces. Although some effort was made to produce regions of material without inversions, all samples were tested with the presence of these natural variations and it is believed that performance is not significantly affected by the number or location of inversions.

All of the slit patterns shown herein are shown as being generally perpendicular to the tension axis. While in many embodiments this can provide superior performance, any of the slit patterns shown or described herein can be rotated at an angle to the tension axis. Angles less than 45 degrees from the tension axis are preferred.

Further, all of the slit patterns shown herein include single slit that are out of phase with one another by approximately one half of the transverse spacing between directly adjacent slits (or 50% of the transverse spacing). However, the patterns may be out of phase by any desired amount including for example, one third of the transverse spacing, one quarter of the transverse spacing, one sixth of the transverse spacing, one eighth of the transverse spacing, etc. In some embodiments, the phase offset is less than 1 or less than three fourths, or less than one half of the transverse spacing of directly adjacent slits in a row. In some embodiments, the phase offset is more than one fiftieth, or more than one twentieth, or more than one tenth of the transverse spacing of directly adjacent slits in a row.

In some embodiments, the minimum phase offset is such that the terminal ends of slits in alternate rows intersect a line parallel to the tension axis through the terminal ends of slits in the adjacent rows. In some embodiments, the maximum phase offset is similarly limited by the creation of a continuous path of material. If the width of the slits orthogonal to the tension axis are constant for all slits and have a value w and the gap between slits orthogonal to the tension axis are constant and have a value g, then the minimum and maximum phase offsets are:

$$\text{minimum phase offset} = \frac{g}{w+g}, \text{maximum phase offset} = \frac{w}{w+g}$$

The present disclosure also relates to one or more articles or materials including any of the slit patterns described herein. Some exemplary materials into which the slit patterns described herein can be formed include, for example, paper (including cardboard, corrugated paper, coated or uncoated paper, kraft paper, cotton bond, recycled paper); plastic; woven and non-woven materials and/or fabrics; elastic materials (including rubber such as natural rubber, synthetic rubber, nitrile rubber, silicone rubber, urethane rubbers, chloroprene rubber, Ethylene Vinyl Acetate or EVA rubber); inelastic materials (including polyethylene and polycarbonate); polyesters; acrylics; and polysulphones. The article can be, for example, a material, sheet, film, or any similar construction.

"Paper" as used herein refers to woven or non-woven sheet-shaped products or fabrics (which may be folded, and may be of various thicknesses) made from cellulose (particularly fibers of cellulose, (whether naturally or artificially derived)) or otherwise derivable from the pulp of plant sources such as wood, corn, grass, rice, and the like. Paper includes products made from both traditional and non-traditional paper making processes, as well as materials of the type described above that have other types of fibers embedded in the sheet, for example, reinforcement fibers. Paper may have coatings on the sheet or on the fibers themselves. Examples of non-traditional products that are "paper" within the context of this disclosure include the material available under the trade designation TRINGA from PAPTIC (Espoo, Finland), and sheet forms of the material available under the trade designation SULAPAC.

Examples of thermoplastic materials that can be used include one or more of polyolefins (e.g., polyethylene (high density polyethylene (HDPE), medium density polyethylene (MDPE), low density polyethylene (LDPE), linear low density polyethylene (LLDPE)), metallocene polyethylene, and the like, and combinations thereof, polypropylene (e.g., atactic and syndiotactic polypropylene)), polyamides (e.g. nylon), polyurethane, polyacetal (such as Delrin), polyacrylates, and polyesters (such as polyethylene terephthalate (PET), polyethylene terephthalate glycol (PETG), and aliphatic polyesters such as polylactic acid), fluoroplastics (such as THV from 3M company, St. Paul, MN), and combinations thereof. Examples of thermoset materials can include one or more of polyurethanes, silicones, epoxies, melamine, phenol-formaldehyde resin, and combinations thereof. Examples of biodegradable polymers can include one or more of polylactic acid (PLA) (which as used herein is intended to encompass both poly(lactic acid) and poly (lactide)), polyglycolic acid (PGA) (which as used herein is intended to encompass both poly(glycolic acid) and poly (glycolide)), poly(caprolactone), copolymers of lactide and glycolide, poly(ethylene succinate), polyhydroxybutyrate, copolymers of two or more of lactic acid, glycolic acid, and caprolactone, polyhydroxyalkanoate, polyester urethane, degradable aliphatic-aromatic copolymers, poly(hydroxybutyrate), copolymers of hydroxybutyrate and hydroxyvalerate, poly(ester amide), and combinations thereof.

The material in which the single slit pattern is formed can be of any desired thickness. In some embodiments, the material has a thickness between about 0.001 inch (0.025 mm) and about 5 inches (127 mm). In some embodiments, the material has a thickness between about 0.01 inch (0.25 mm) and about 2 inches (51 mm). In some embodiments, the material has a thickness between about 0.1 inch (2.5 mm) and about 1 inch (25.4 mm). In some embodiments, the thickness is greater than 0.001 inch, or 0.01 inch, or 0.05 inch, or 0.1 inch, or 0.5 inch, or 1 inch, or 1.5 inches, or 2 inches, or 2.5 inches, or 3 inches (76.2 mm). In some embodiments, the thickness is less than 5 inches or 4 inches, or 3 inches (76.2 mm), or 2 inches, or 1 inch, or 0.5 inch, or 0.25 inch (6.35 mm), or 0.1 inch.

In some embodiments, where the material is paper, the thickness is between about 0.003 inch (0.076 mm) and about 0.010 inch (0.25 mm). In some embodiments where the material is plastic, the thickness is between about 0.005 inch (0.13 mm) and about 0.125 inch (3.2 mm).

In some embodiments, the slit or cut pattern extends through one or more of the edges of the sheet, film, or material, such as the axial edges of the material. In some embodiments, this allows the material to be of unlimited length and also to be deployed by tension, particularly when made with non-extensible materials. The amount of edge material is the area of material surrounding and not including the single slit pattern. In some embodiments, the amount of edge material, or down-web border, can be defined as the width of the rectangle whose long axis is parallel to the tension axis and is infinitely long and can be drawn on the substrate without overlapping or touching any slits. In some embodiments, the amount of edge material is less than 0.010 inch (0.25 mm) or less than 0.001 inch (0.025 mm). In some embodiments, the width of the down-web border is less than 0.010 inch (0.25 mm) or less than 0.001 inch (0.025 mm). In some embodiments, the amount of edge material is less than 5 times the thickness of the substrate. In some embodiments, the width of the down-web border is less than 5 times the thickness of the substrate.

Cross-web slabs can be defined as rectangular regions with a rectangle whose long axis is perpendicular to the tension axis and is infinitely long and whose width is some finite number and can be drawn on the substrate without overlapping or touching any slits or cuts. In some embodiments, cross-web slabs of any width may already exist within the article as an integral part of the pattern. In some embodiments, cross-web slabs of any width may be added to the ends of a finite length article to make the article easier to deploy. In some embodiments, cross-web slabs of any width may be added intermittently to a continuously patterned article.

In some embodiments, the distance between the farthest spaced terminal ends of a single slit (also referred to as the slit length) is between about 0.25 inch (6.35 mm) long and about 3 inches (76.2 mm) long, or between about 0.5 inch and about 2 inches, or between about 1 inch and about 1.5 inches. In some embodiments, the farthest distance between terminal ends of a single slit (also referred to as slit length) is between 50 times the substrate thickness and 1000 times the substrate thickness, or between 100 and 500 times the substrate thickness. In some embodiments, the slit length is less than 1000 times the substrate thickness, or less than 900 times, or less than 800 times, or less than 700 times, or less than 600 times, or less than 500 times, or less than 400 times, or less than 300 times, or less than 200 times, or less than 100 times the substrate thickness. In some embodiments, the slit length is greater than 50 times the substrate thickness, or greater than 100 times, or greater than 200 times, or greater than 300 times, or greater than 400 times, or greater than 500 times, or greater than 600 times, or greater than 700 times, or greater than 800 times, or greater than 900 times the substrate thickness.

Figure 21:
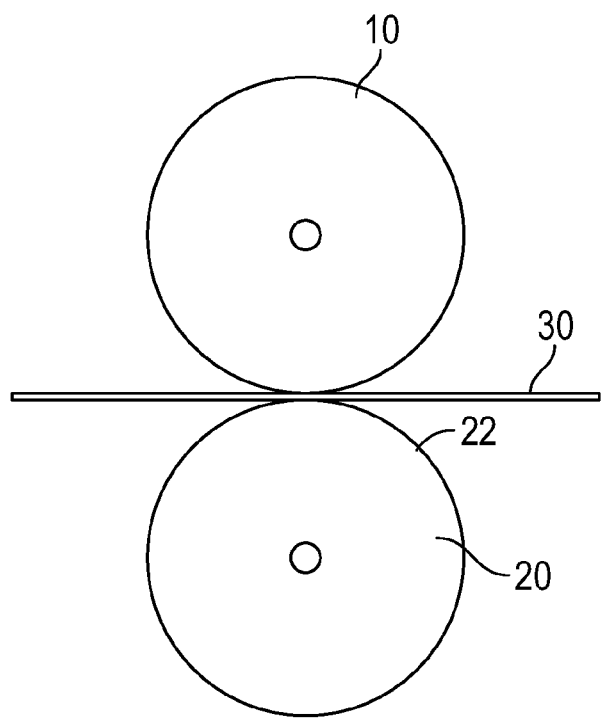
FIG. 21 is an example system for making materials consistent with the technology disclosed herein.

The slit patterns and articles described herein can be made in a number of different ways. For example, the slit patterns can be formed by extrusion, molding, laser cutting, water jetting, machining, stereolithography or other 3D printing techniques, laser ablation, photolithography, chemical etching, rotary die cutting, stamping, other suitable negative or positive processing techniques, or combinations thereof. In particular, with reference to FIG. 21, paper or another sheet material 30 can be fed into a nip consisting of a rotary die 20 and an anvil 10. In this example the material 30 is stored in a roll configuration where the material is rolled around a central axis that may include or may omit a central core. The rotary die 20 has cutting surfaces 22 on it that correspond to the slit pattern desired to be cut into the sheet material 30. The die 20 cuts through the material 30 in desired places and forms the slit pattern described herein. The same process can be used with a flat die and flat anvil.

The articles and materials described herein can be used in various ways. In one embodiment, the two dimensional sheet, material, or article has tension applied along the tension axis, which causes the slits to form the openings and/or folding walls and/or motions described herein. In some embodiments, the tension is applied by hand or with a machine.

The present disclosure describes articles that begin as a flat sheet but deploy into a three-dimensional construction upon the application of force/tension. In some embodiments, such constructions form energy absorbing structures. The patterns, articles, and constructions described herein have a large number of potential uses, at least some of which are described herein.

One exemplary use is to protect objects for shipping or storage. As stated above, existing shipping materials have a variety of drawbacks including, for example, they occupy too much space when stored before use (e.g., bubble wrap, packing peanuts) and thus increase the cost of shipping; they require special equipment to manufacture (e.g., inflatable air bags); they are not always effective (e.g., crumpled paper); and/or they are not widely recyclable (e.g., bubble wrap, packing peanuts, inflatable air bags). The tension-activated, expanding films, sheets, and articles described herein can be used to protect items during shipping without any of the above drawbacks. When made of sustainable materials, the articles described herein are effective and sustainable. Because the articles described herein are flat when manufactured, shipped, sold, and stored and only become three-dimensional when activated with tension/force by the user, these articles are more effective and efficient at making the best use of storage space and minimizing shipping/transit/packaging costs. Retailers and users can use relatively little space to house a product that will expand to 10 or 20 or 30 or 40 or more times its original size. Further, the articles described herein are simple and highly intuitive for use. The user merely pulls the product off the roll or takes flat sheets of product, applies tension across the article along the tension axis (which can be done by hand or with a machine), and then wraps the product around an item to be shipped. In many embodiments, no tape is needed because the interlocking features enable the product to interlock with another layer of itself.

In some embodiments, the slit patterns described herein create packaging materials and/or cushioning films that provide advantages over the existing offerings. For example, in some embodiments, the packaging materials and/or cushioning films of the present disclosure provide enhanced cushioning or product protection. In some embodiments, the packaging materials and/or cushioning films of the present disclosure provide similar or enhanced cushioning or product protection when compared to the existing offerings but are recyclable and/or more sustainable or environmentally friendly than existing offerings. In some embodiments, the packaging materials and/or cushioning films of the present disclosure provide similar or enhanced cushioning or product protection when compared to the existing offerings but can be expanded and wrapped around an item to be shipped. Constructions that hold their shape once tension is applied can be preferred because they may eliminate the need for tape to hold the material in place for many applications.

The following examples describe some exemplary constructions and methods of constructing various embodiments within the scope of the present application. The following examples are intended to be illustrative, but are not intended to limit the scope of the present application.

EXAMPLES

Compression Energy Test

The compression energy test was used to measure the energy absorbing ability of the samples prepared according to an Example or Comparative Example described below. For compression testing, a 36-inches (0.91 m) long and 7.5-inches (19 cm) wide sample comprising the desired slit patterns was obtained. One end of the sample was fixed on a flat surface such as a table top using an adhesive tape. Then, the sample was stretched to its full deployment elongation. The full deployment elongation of a sample is defined as the length that a sample can be stretched without tearing and with maximum out-of-plane rotation of any flap regions and/or folding wall regions relative to the plane of the material. Then, holding the non-taped end of the stretched sample to one of the long edges of a 6-inches (15.24 cm) wide and 8-inches (20.32 cm) long rectangular frame, the sample was wound around the frame along its long axis. The winding of the sample was done by "walking" the frame forward, end over end (i.e., rotating the frame 180-degrees around its long axis at a time) towards the fixed end of the sample. When the frame has been walked to the fixed end, the taped-down section of the material was carefully removed while maintaining the full deployment elongation of the test sample. The frame was disassembled and removed to form the test sample. The test samples when prepared as described here generally were shaped like "pillows".

The compression energy testing was carried out using an MTS load frame [MTS Criterion Model C43 104E, from Mechanical Testing Systems Corporation, Eden Prairie, MN]. The test samples ("pillows") were placed on a bottom platen large enough to hold the sample and the sample was compressed from the top using a 1.50-inch (3.81 cm) diameter foot. The compression speed was 1.0 mm/s and the maximum force was 1000 lbs [4450 N]. Force vs. displacement information along with the time stamp for each data point at a rate of 100 data points per second was recorded. Two samples for each Example/Comparative Example was tested. The average compression energy required (i.e., average total energy absorbed) to crush the samples for each Example/Comparative Example was calculated by integrating the force vs. displacement data for each sample and the average of the two samples were reported.

Comparative Example 1

Comparative Example 1 was shipping packaging material obtained from Amazon.com under trade designation "GEAMI WRAPPAK EX". The brown paper portion, comprising the slit patterns, was used as the Comparative Example 1. "GEAMI WRAPPAK EX" is thought to be made by Ranpak Corporation, Painesville, Ohio. The slit pattern of Comparative Example 1 is that shown in FIG. 1A.

Comparative Example 2

Comparative Example 2 was shipping packaging material obtained from HexcelPack LLC., [Botsford, CT] under trade designation "HEXCELWRAP".

Comparative Examples 3-4 and Example 1

Comparative Examples 3-4 and Example 1 samples were prepared by laser cutting a slit pattern on a substrate. The substrate was a white paper obtained from Boise Paper, Lake Forest, IL. The paper is made from 100% virgin fibers with a basis weight of about 82 g/m2 when measured according to test method TAPPI T410 om-13, a thickness of about 0.0048 inch (0.12 mm) when measured according to test method TAPPI T411 om-10, a tear strength when measured according to test method T414 om-12 of about 50 g/ply in the machine direction and about 60 g/ply in the cross direction. The above referred test methods are provided by the Technical Association of the Pulp and Paper Industry (TAPPI), Atlanta, GA. The laser cutting method involved using a Model XLS 10.150D laser cutter (obtained from Universal Laser Systems, Inc., Scottsdale, AZ) cutting at 80-100% power with the z height set to 0. A default setting of "continuous cast acrylic" was used.

Figure 11:
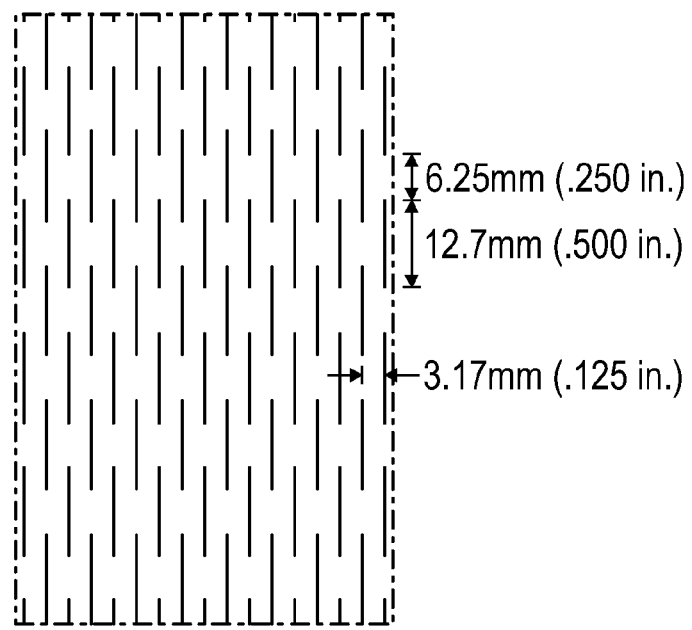
FIGS. 11-19 are schematic drawings used in making materials and/or articles discussed in the Examples.
Figure 12:
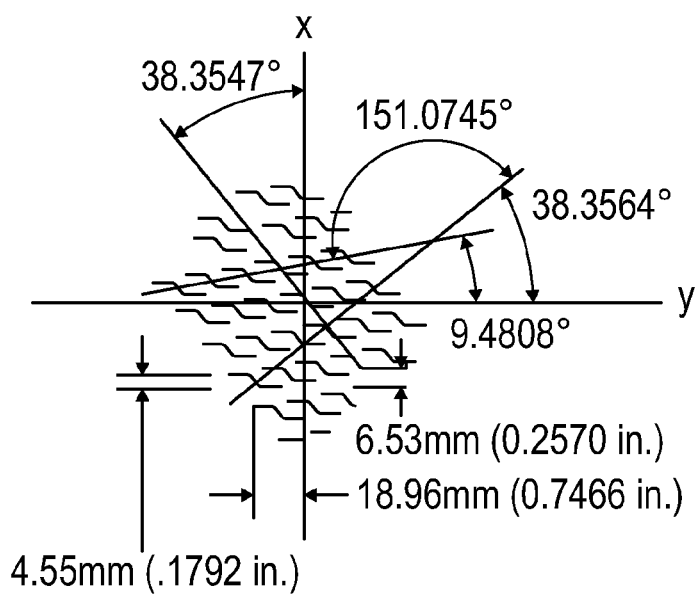
Figure 13:
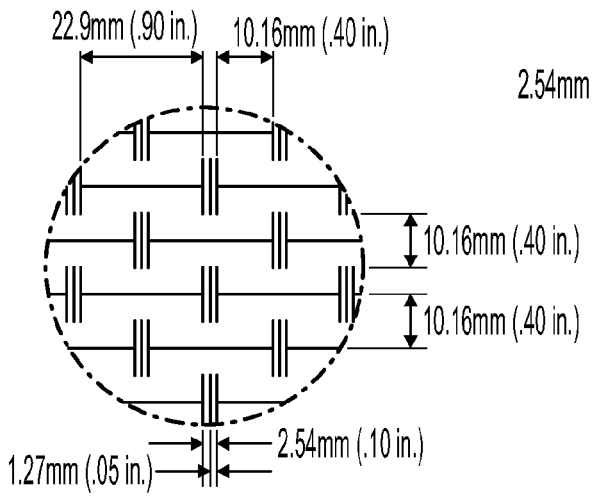

The slit pattern shown in FIG. 11 was used to form Comparative Example 3. The slit pattern of Comparative Example 3 was duplicative of that of Comparative Example 1. The slit pattern shown in FIG. 12 was used to form Comparative Example 4. The slit pattern of Comparative Example 4 is the slit pattern shown in FIG. 8D of U.S. Pat. No. 8,613,993 (to David M. Kuchar). The slit pattern shown in FIG. 13 was used to form Example 1.

Examples 2-6

Example 2-6 samples were prepared by laser cutting a slit pattern on a substrate. The substrate was a brown paper obtained from Uline, Pleasant Prairie, WI under trade designation "5-7051". It is made from 100% recycled paper with a basis weight of about 125 g/m$^2$ when measured according to test method TAPPI T410 om-13, a thickness of about 0.0075" (0.19 mm) when measured according to test method TAPPI T411 om-10, a tear strength when measured according to test method T414 om-12 of about 100 g/ply in the machine direction and about 135 g/ply in the cross direction. The laser cutting method involved using a Model XLS 10.150D laser cutter (obtained from Universal Laser Systems, Inc., Scottsdale, AZ) cutting at 80-100% power with the z height set to 0. A default setting of "continuous cast acrylic" was used.

Figure 14:
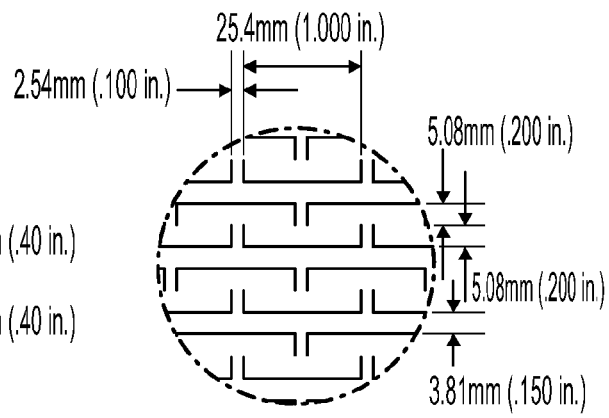
Figure 15:
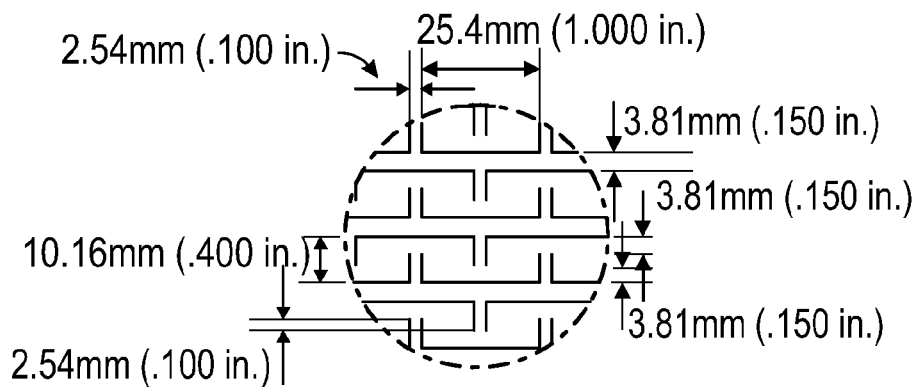
Figure 16:
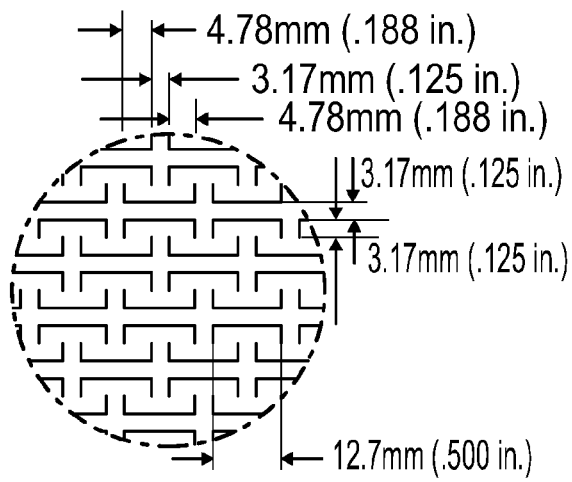
Figure 17:
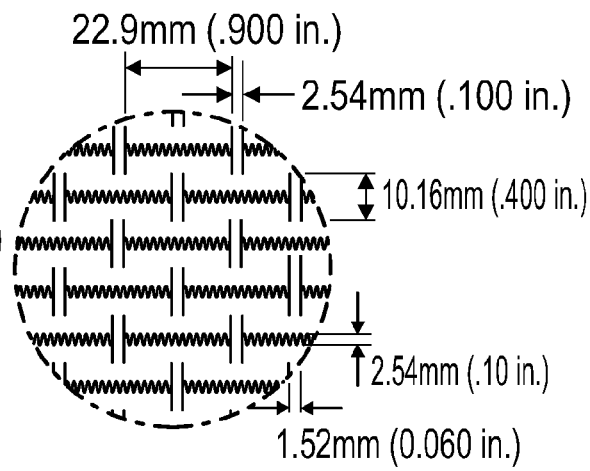
Figure 18:
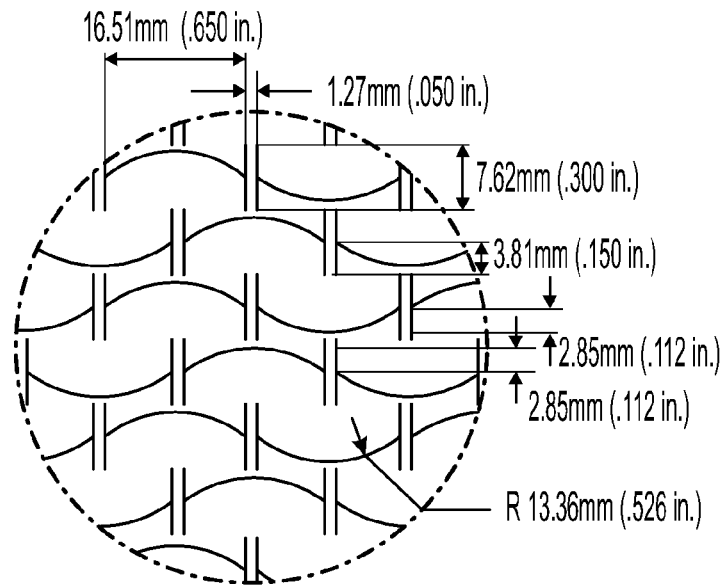

The slit pattern shown in FIG. 14 was used to form Example 2. The slit pattern shown in FIG. 15 was used to form Example 3. The slit pattern shown in FIG. 16 was used to form Example 4. The slit pattern shown in FIG. 17 was used to form Example 5. The slit pattern shown in FIG. 18 was used to form Example 6.

Example 7

Example 7 sample was prepared by rotary die cutting a slit pattern on a substrate. The substrate was a brown paper described above in Examples 2-6. The rotary die cutting method involved using custom-made, flexible rotary dies made specifically for this slit pattern. The dies had a blade angle of 74.00 degrees and a cylinder undercut of 0.0240 inches (0.61 mm). The flexible die was mounted onto a magnetic cylinder, held in a frame, and pressed against a blank die with enough force to fully cut through the paper.

Figure 19:
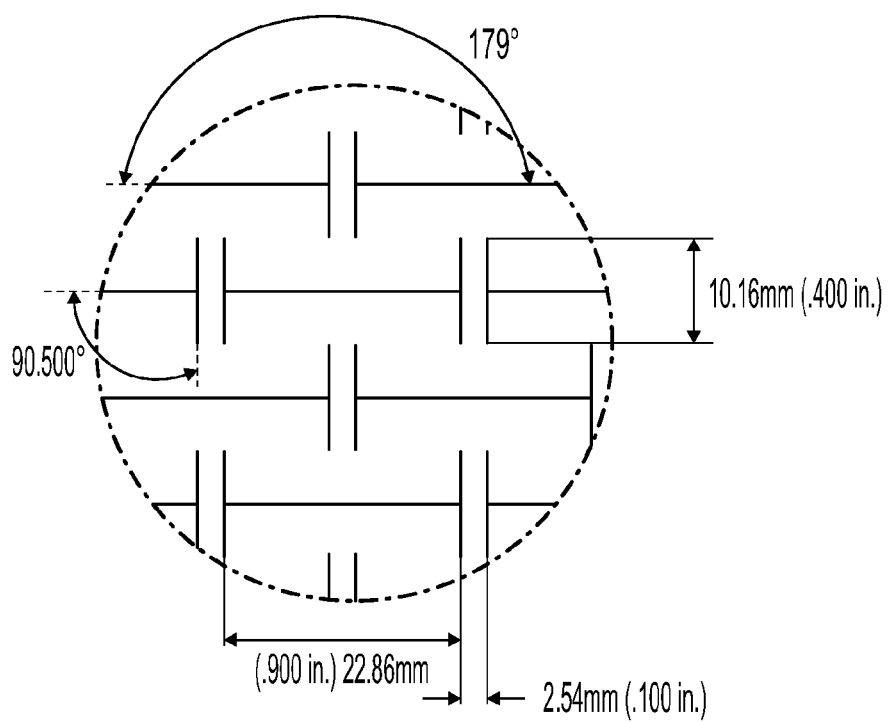

The slit pattern shown in FIG. 19 was used to form Example 7.

Comparative Examples 1-4 and Examples 1-7 samples were tested according to the Compression Energy Test provided above. Average Compression Energy for each of Comparative Examples 1-4 and Examples 1-7 are summarized in Table 1, below.

TABLE 1

Compression Energy Test Results

|  | Average Compression Energy (Joules) |
| --- | --- |
| Comp. Ex. 1 | 1.86 |
| Comp. Ex. 2 | 1.39 |
| Comp. Ex. 3 | 1.66 |
| Comp. Ex. 4 | 1.49 |
| Example 1 | 3.13 |
| Example 2 | 4.76 |
| Example 3 | 4.05 |
| Example 4 | 2.28 |
| Example 5 | 4.79 |
| Example 6 | 2.49 |
| Example 7 | 3.65 |

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on the corresponding objects.

The above description is intended to be illustrative, and not restrictive. For example, the above-described embodiments (or one or more aspects thereof) may be used in combination with each other. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention can be determined with reference to the appended claims, along with the full scope of equivalents to which such claims are entitled.

The recitation of all numerical ranges by endpoint is meant to include all numbers subsumed within the range (i.e., the range 1 to 10 includes, for example, 1, 1.5, 3.33, and 10).

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Those having skill in the art will appreciate that many changes may be made to the details of the above-described embodiments and implementations without departing from the underlying principles thereof. Further, various modifications and alterations of the present disclosure will become apparent to those skilled in the art without departing from the spirit and scope of the disclosure. The scope of the present application should, therefore, be determined only by the following claims and equivalents thereof.

What is claimed is:

1. An expanding material having a pretensioned state defining a pretensioned plane, comprising:
a material defining a plane having an axial direction and a transverse direction that is orthogonal to the axial direction, including a plurality of slits each having a curved transverse portion in the transverse direction between terminal ends that each extend in the axial direction, such that when a threshold amount of tension is applied to the material along a tension axis of the material, a plurality of regions of the material rotate at least 90° relative to the pretensioned plane.

2. The expanding material of claim 1, wherein the material is substantially planar in its pretensioned state, prior to application of tension along the tension axis.

3. The expanding material of claim 1, wherein at least some of the slits include at least one of hook, loop, sine-wave, square-wave, triangle-wave, and cross-slit.

4. The expanding material of claim 1, wherein the slits are arranged in rows, wherein the rows are generally perpendicular to the tension axis.

5. The expanding material of claim 1, wherein each slit has a transverse length and each of the slits in the plurality of slits are offset from one another in adjacent rows by 75% or less of the transverse length of the slit.

6. The expanding material of claim 1, wherein the slits are arranged in rows of slits and each of the slits have a slit shape and slit orientation and wherein the slit shape or the slit orientation varies within a row of slits.

7. The expanding material of claim 1, wherein the slits are arranged in rows and the slits have a slit shape and slit orientation and wherein slit shape or slit orientation varies in adjacent rows.

8. The expanding material of claim 1, wherein the curved transverse portion is an oscillating wave pattern.

9. A die capable of forming the plurality of slits of claim 1.

10. A packaging material comprising an expanding material of claim 1.

11. The packaging material of claim 10, wherein the expanding material is in a roll configuration.

12. The packaging material of claim 10, wherein the expanding material is one or more individual sheets.

13. The packaging material of claim 12, further comprising an envelope having the expanding material disposed in the envelope.

14. A method of making the expanding material of claim 1, comprising:
   forming a plurality of slits in the material by at least one of extrusion, molding, laser cutting, water jetting, machining, stereolithography, laser ablation, photolithography, chemical etching, rotary die cutting, stamping, or combinations thereof.

15. A method of using the expanding material of claim 1, comprising:
   applying tension to the expanding material along a tension axis to cause the material to expand.

16. An expanding material comprising:
   a sheet defining a plane having an axial direction and a transverse direction; and
   a plurality of slits through the sheet,
   wherein the plurality of slits define a first plurality of beams extending in the axial direction,
   wherein the first plurality of beams form a first column extending across the sheet in the axial direction,
   wherein the plurality of slits comprises a first group of slits each having a curved transverse portion that is positioned axially between beams in the first plurality of beams and at least one axial portion that is connected to the curved transverse portion and is generally parallel to the axial direction,
   wherein the plurality of slits define a second plurality of beams extending in the axial direction,
   wherein the second plurality of beams form a second column extending across the sheet in the axial direction, and the second plurality of beams are spaced from the first plurality of beams in the transverse direction,
   wherein the plurality of slits comprises a second group of slits each having a curved transverse portion that is positioned axially between beams in the second plurality of beams and at least one axial portion that is connected to the curved transverse portion and is generally parallel to the axial direction, and
   wherein each beam of the first plurality of beams has a terminus that is aligned with a terminus of a beam of the second plurality of beams along a transverse axis.

17. The expanding material of claim 16, wherein the axial portion of each slit in the first group of slits defines the second plurality of beams.

18. The expanding material of claim 16, wherein the axial portion of each slit in the second group of slits defines the first plurality of beams.

19. The expanding material of claim 16, further comprising a first plurality of slits of the plurality of slits, wherein the first plurality of slits forms a first row extending across the sheet in the transverse direction, and wherein a first beam in the first plurality of beams comprises material between adjacent slits in the first row.

20. The expanding material of claim 16, wherein the curved transverse portion is an oscillating wave pattern.

* * * * *